US006995826B2

(12) United States Patent
Kubo et al.

(10) Patent No.: US 6,995,826 B2
(45) Date of Patent: Feb. 7, 2006

(54) LIQUID CRYSTAL DISPLAY DEVICE

(75) Inventors: Masumi Kubo, Ikoma (JP); Akihiro Yamamoto, Yamatokoriyama (JP); Takashi Ochi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 57 days.

(21) Appl. No.: 10/845,605

(22) Filed: May 14, 2004

(65) Prior Publication Data
US 2005/0001964 A1    Jan. 6, 2005

(30) Foreign Application Priority Data
May 16, 2003  (JP)  .............................. 2003-139156
May 16, 2003  (JP)  .............................. 2003-139157

(51) Int. Cl.
*G02F 1/1337*    (2006.01)
(52) U.S. Cl. ...................................... 349/130; 349/129
(58) Field of Classification Search ................ 349/129, 349/130
See application file for complete search history.

(56) References Cited

U.S. PATENT DOCUMENTS

| 5,926,244 | A  | 7/1999 | Takeda |
| 6,384,889 | B1 | 5/2002 | Miyachi et al. |
| 6,661,488 | B1 | 12/2003 | Takeda et al. |
| 6,710,825 | B2 | 3/2004 | Kubo et al. |
| 6,717,645 | B2 | 4/2004 | Shimoshikiryou et al. |
| 6,721,024 | B1 | 4/2004 | Kishimoto et al. |
| 6,812,986 | B2 * | 11/2004 | Takatori et al. ............. 349/141 |
| 2002/0036740 | A1 | 3/2002 | Kubo et al. |
| 2002/0075436 | A1 | 6/2002 | Kubo et al. |
| 2003/0107695 | A1 | 6/2003 | Kubo et al. |
| 2004/0041770 | A1 | 3/2004 | Kubo et al. |

FOREIGN PATENT DOCUMENTS

JP            6-301063        10/1994

* cited by examiner

*Primary Examiner*—James A. Dudek
(74) *Attorney, Agent, or Firm*—Nixon & Vanderhye P.C.

(57) ABSTRACT

A liquid crystal display device includes a plurality of picture element regions each including a first electrode provided on one side of a first substrate that is closer to a liquid crystal layer and a second electrode provided on a second substrate so as to oppose the first electrode via the liquid crystal layer therebetween. The first electrode includes, in each picture element region, a solid portion including a plurality of unit solid portions, whereby the liquid crystal layer takes a substantially vertical alignment in the absence of an applied voltage between the first electrode and the second electrode, and forms a liquid crystal domain taking a radially-inclined orientation in a region corresponding to each unit solid portion of the first electrode by an inclined electric field produced around the unit solid portion in response to a voltage applied between the first electrode and the second electrode. Each unit solid portion includes four acute angle corner portions that are pointing respectively in upward, downward, leftward and rightward directions of a display plane.

44 Claims, 22 Drawing Sheets

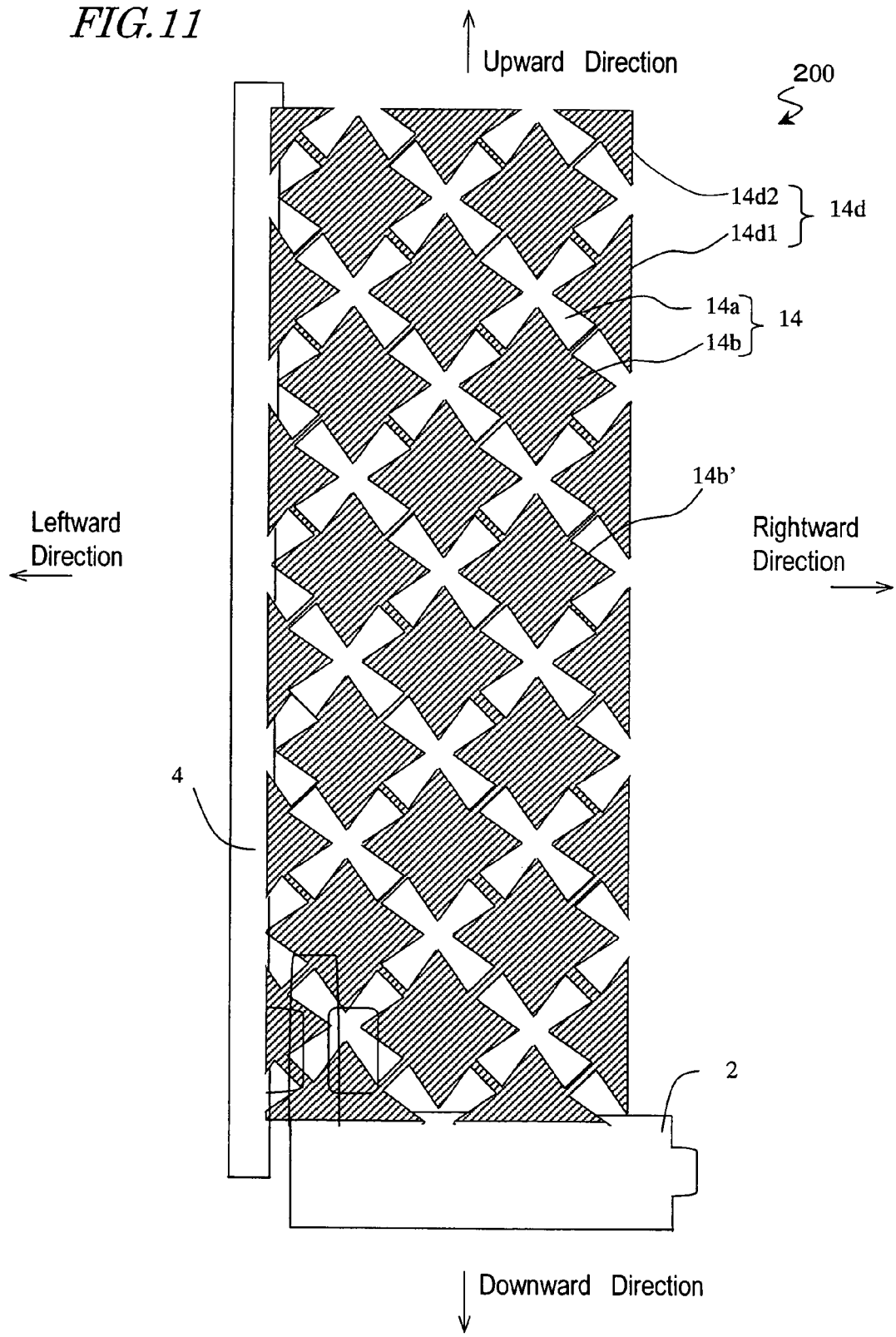

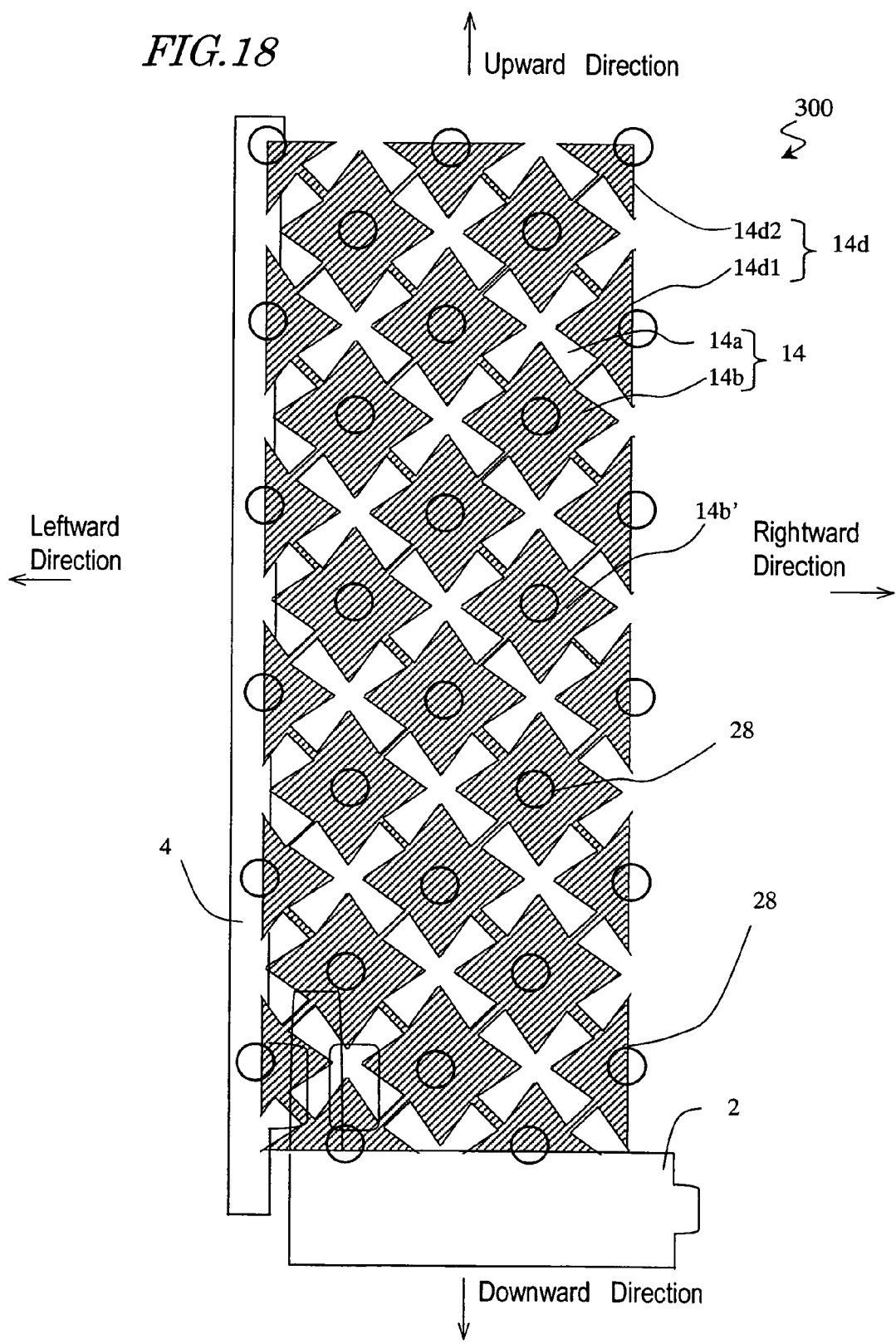

LIQUID CRYSTAL DISPLAY DEVICE

FIELD OF THE INVENTION

Certain example embodiments of the present invention relate to a liquid crystal display (LCD) device, and more particularly to a liquid crystal display device having a wide viewing angle characteristic and being capable of producing a high quality display.

BACKGROUND OF THE INVENTION

In recent years, liquid crystal display devices, which are thin and light in weight, have been used as personal computer displays and PDA (personal digital assistance) displays. However, conventional twist nematic (TN) type and super twist nematic (STN) type liquid crystal display devices have a narrow viewing angle. Various technical developments have been undertaken to solve the problem.

A typical technique for improving the viewing angle characteristic of a TN or STN type liquid crystal display device is to add an optical compensation plate(s) thereto. Another approach is to employ a transverse electric field mode in which a horizontal electric field with respect to the substrate plane is applied across the liquid crystal layer. Transverse electric field mode liquid crystal display devices have been attracting public attention and have been mass-produced in recent years. Still another technique is to employ a DAP (deformation of vertical aligned phase) mode in which a nematic liquid crystal material having a negative dielectric anisotropy is used as a liquid crystal material and a vertical alignment film is used as an alignment film. This is a type of ECB (electrically controlled birefringence) mode, in which the transmittance is controlled by using the birefringence of liquid crystal molecules.

While the transverse electric field mode is an effective approach to improve the viewing angle, the production process thereof imposes a significantly lower production margin than that of a normal TN type device, whereby it is difficult to realize stable production of the device. This is because the display brightness or the contrast ratio is significantly influenced by variations in the gap between the substrates or a shift in the direction of the transmission axis (polarization axis) of a polarization plate with respect to the orientation axis of the liquid crystal molecules. It requires further technical developments to be able to precisely control these factors and thus to realize stable production of the device.

In order to realize a uniform display without display non-uniformity with a DAP mode liquid crystal display device, an alignment control is often necessary. An alignment control can be provided by, for example, subjecting the surface of an alignment film to an alignment treatment by rubbing. However, when a vertical alignment film is subjected to a rubbing treatment, rubbing streaks are likely to appear in the displayed image, and it is typically not suitable for mass-production.

In view of this, there has been proposed in the art another approach wherein a predetermined electrode structure including openings and a solid portion is employed for one of a pair of electrodes opposing each other via the liquid crystal layer therebetween, so that a plurality of liquid crystal domains each taking a radially-inclined orientation are formed in the openings and the solid portion each by an inclined electric field produced at an edge portion of the opening (e.g., see Japanese Laid-Open Patent Publication No. 2003-043525). With this approach, a liquid crystal domain having a radially-inclined orientation can be formed stably and with a high degree of continuity, thereby improving viewing angle characteristics and display quality.

However, as liquid crystal display devices are becoming more and more widespread, display characteristic requirements for a liquid crystal display device have been increasing, and there has been a demand for further improvements in display characteristics such as the display brightness and the response speed.

SUMMARY OF EXAMPLE EMBODIMENTS OF THE INVENTION

It is therefore an object of certain example embodiments of this invention to provide a liquid crystal display device having a wide viewing angle characteristic and/or desirable display characteristics.

In certain example embodiments of this invention, an inventive liquid crystal display device according to a first aspect of the present invention includes: a first substrate; a second substrate; and a liquid crystal layer provided between the first substrate and the second substrate, wherein: a plurality of picture element regions are defined by a first electrode provided on one side of the first substrate that is closer to the liquid crystal layer and a second electrode provided on the second substrate so as to oppose the first electrode via at least the liquid crystal layer therebetween; the first electrode includes, in each of the plurality of picture element regions, a solid portion including a plurality of unit solid portions, whereby the liquid crystal layer takes a substantially vertical alignment in the absence of an applied voltage in at least certain areas between the first electrode and the second electrode, and forms respective liquid crystal domains taking radially-inclined orientations in respective regions corresponding to each of the plurality of unit solid portions of the first electrode inclined electric fields produced around the unit solid portions in response to a voltage applied between the first electrode and the second electrode; and each of the plurality of unit solid portions includes four acute angle corner portions that are pointing respectively in upward, downward, leftward and rightward directions of a display plane.

In an example embodiment of this invention, the liquid crystal display device further includes a pair of polarization plates opposing each other via at least the liquid crystal layer therebetween, wherein a transmission axis of one of the pair of polarization plates is generally parallel to an up-down direction of the display plane, and a transmission axis of the other one of the pair of polarization plates is generally parallel to a left-right direction of the display plane.

In an example embodiment of this invention, a shape of each of the plurality of unit solid portions has rotational symmetry.

In an example embodiment of this invention, a shape of each of the plurality of unit solid portions is a generally star shape having four-fold rotational symmetry.

In an example embodiment of this invention, the plurality of unit solid portions have substantially the same shape and substantially the same size, and form at least one unit lattice having rotational symmetry.

In an example embodiment of this invention, the solid portion of the first electrode further includes a plurality of sub-unit solid portions each having substantially the same shape as a portion of the unit solid portion; and the plurality of sub-unit solid portions are arranged along a periphery of each of the plurality of picture element regions.

In an example embodiment of this invention, the plurality of sub-unit solid portions include at least one first sub-unit solid portion having a shape generally corresponding to one half of the unit solid portion.

In an example embodiment of this invention, the plurality of sub-unit solid portions include at least one second sub-unit solid portion having a shape generally corresponding to one quarter of the unit solid portion.

In an example embodiment of this invention, the plurality of sub-unit solid portions form at least one unit lattice having rotational symmetry in a complementary manner together with at least one of the plurality of unit solid portions.

In an example embodiment of this invention, the plurality of sub-unit solid portions together form an integral multiple of the shape of the unit solid portion.

In an example embodiment of this invention, the second substrate includes, in a region corresponding to each of the plurality of sub-unit solid portions, an orientation-regulating structure that exerts an orientation-regulating force upon liquid crystal molecules of the liquid crystal layer at least in the presence of an applied voltage between the first electrode and the second electrode; and a direction of orientation regulation by the orientation-regulating structure is aligned with a direction of orientation regulation by an inclined electric field produced around each of the plurality of sub-unit solid portions.

In an example embodiment of this invention, the orientation-regulating structure exerts an orientation-regulating force even in the absence of an applied voltage between the first electrode and the second electrode.

In an example embodiment of this invention, the orientation-regulating structure is a protrusion protruding from the second substrate into the liquid crystal layer.

In an example embodiment of this invention, in each of the plurality of picture element regions, the first electrode further includes at least one opening, and the liquid crystal layer forms a liquid crystal domain taking a radially-inclined orientation also in a region corresponding to the at least one opening by the inclined electric field in response to a voltage applied between the first electrode and the second electrode.

In an example embodiment of this invention, the at least one opening includes a plurality of openings having substantially the same shape and substantially the same size, and at least one of the plurality of openings forms at least one unit lattice having rotational symmetry.

In an example embodiment of this invention, a shape of each of the at least one of the plurality of openings has rotational symmetry.

In an example embodiment of this invention, the first substrate further includes a dielectric layer provided on one side of the first electrode that is away from the liquid crystal layer, and a third electrode opposing at least a portion of the at least one opening of the first electrode via the dielectric layer.

In an example embodiment of this invention, the first substrate further includes a switching element provided corresponding to each of the plurality of picture element regions; and the first electrode is a picture element electrode provided for each of the plurality of picture element regions and switched ON and OFF by the switching element, and the second electrode is at least one counter electrode opposing the plurality of picture element electrodes.

Another example inventive liquid crystal display device according to the first aspect of the present invention includes: a first substrate; a second substrate; and a liquid crystal layer provided between the first substrate and the second substrate, wherein: a plurality of picture element regions are defined by a first electrode provided on one side of the first substrate that is closer to the liquid crystal layer and a second electrode provided on the second substrate so as to oppose the first electrode via the liquid crystal layer therebetween; the liquid crystal layer takes a substantially vertical alignment in the absence of an applied voltage in at least certain areas between the first electrode and the second electrode; the first electrode includes, in each of the plurality of picture element regions, a plurality of generally star-shaped conductive portions each having four acute angle corner portions; and the four corner portions of each of the plurality of conductive portions are pointing respectively in upward, downward, leftward and rightward directions of a display plane.

In an example embodiment of this invention, the liquid crystal display device further includes a pair of polarization plates opposing each other via the liquid crystal layer therebetween, wherein a transmission axis of one of the pair of polarization plates is generally parallel to an up-down direction of the display plane, and a transmission axis of the other one of the pair of polarization plates is generally parallel to a left-right direction of the display plane.

An example inventive liquid crystal display device according to a second aspect of the present invention includes: a first substrate; a second substrate; and a liquid crystal layer provided between the first substrate and the second substrate, wherein a plurality of picture element regions are defined in the liquid crystal display device, the liquid crystal display device further including: a picture element electrode provided on one side of the first substrate that is closer to the liquid crystal layer for each of the plurality of picture element regions; a counter electrode provided on the second substrate so as to oppose the picture element electrode via the liquid crystal layer therebetween; a switching element electrically connected to the picture element electrode; and a scanning line and a signal line at least one of which is provided on the first substrate, wherein: the picture element electrode includes, in each of the plurality of picture element regions, a solid portion including a plurality of unit solid portions, whereby the liquid crystal layer takes a substantially vertical alignment in the absence of an applied voltage in at least certain areas between the picture element electrode and the counter electrode, and forms respective liquid crystal domains taking radially-inclined orientations in respective regions corresponding to each of the plurality of unit solid portions by inclined electric fields produced around each of the plurality of unit solid portions of the picture element electrode in response to a voltage applied between the picture element electrode and the counter electrode; each of the plurality of unit solid portions includes four acute angle corner portions that are pointing respectively in upward, downward, leftward and rightward directions of a display plane; and at least one of the scanning line and the signal line extends while being bent a plurality of times in each of the plurality of picture element regions so that any elongated segment thereof is inclined with respect to an up-down direction and a left-right direction of the display plane.

In an example embodiment of this invention, each segment of the at least one of the scanning line and the signal line is inclined by about 45° with respect to the up-down direction and the left-right direction of the display plane.

In an example embodiment of this invention, both the scanning line and the signal line are provided on the first substrate.

In an example embodiment of this invention, at least some of the plurality of unit solid portions that are arranged along a periphery of each of the plurality of picture element regions are arranged in the up-down direction and/or the left-right direction of the display plane at a predetermined pitch; and the at least one of the scanning line and the signal line includes a plurality of bent portions arranged in the up-down direction and/or the left-right direction of the display plane at about one half of the predetermined pitch.

In an example embodiment of this invention, at least one of the scanning line and the signal line extends closely parallel to an outer periphery of the picture element electrode defined by the at least some of the plurality of unit solid portions.

In an example embodiment of this invention, the liquid crystal display device further includes a pair of polarization plates opposing each other via the liquid crystal layer therebetween, wherein a transmission axis of one of the pair of polarization plates is generally parallel to the up-down direction of the display plane, and a transmission axis of the other one of the pair of polarization plates is generally parallel to the left-right direction of the display plane.

In an example embodiment of this invention, a shape of each of the plurality of unit solid portions has rotational symmetry.

In an example embodiment of this invention, a shape of each of the plurality of unit solid portions is a generally star shape having four-fold rotational symmetry.

In an example embodiment of this invention, the plurality of unit solid portions have substantially the same shape and substantially the same size, and form at least one unit lattice having rotational symmetry.

In an example embodiment of this invention, the picture element electrode further includes at least one opening, and the liquid crystal layer forms a liquid crystal domain taking a radially-inclined orientation also in a region corresponding to the at least one opening by the inclined electric field in response to a voltage applied between the picture element electrode and the counter electrode.

In an example embodiment of this invention, the at least one opening includes a plurality of openings having substantially the same shape and substantially the same size, and at least one of the plurality of openings forms at least one unit lattice having rotational symmetry.

In an example embodiment of this invention, a shape of each of the at least one of the plurality of openings has rotational symmetry.

In an example embodiment of this invention, the first substrate further includes a dielectric layer provided on one side of the first electrode that is away from the liquid crystal layer, and a third electrode opposing at least a portion of the at least one opening of the first electrode via the dielectric layer.

In an example embodiment of this invention, the second substrate includes, in a region corresponding to each of the plurality of unit solid portions, an orientation-regulating structure that exerts an orientation-regulating force for orienting liquid crystal molecules of the liquid crystal layer into a radially-inclined orientation at least in the presence of an applied voltage between the picture element electrode and the counter electrode.

In an example embodiment of this invention, the orientation-regulating structure is provided in a region in the vicinity of a center of each of the plurality of unit solid portions.

In an example embodiment of this invention, in the liquid crystal domain formed corresponding to each of the plurality of unit solid portions, a direction of orientation regulation by the orientation-regulating structure is aligned with a direction of the radially-inclined orientation formed by the inclined electric field.

In an example embodiment of this invention, the orientation-regulating structure exerts an orientation-regulating force even in the absence of an applied voltage between the picture element electrode and the counter electrode.

In an example embodiment of this invention, the orientation-regulating structure is a protrusion protruding from the counter substrate into (or toward) the liquid crystal layer.

Another example inventive liquid crystal display device according to the second aspect of the present invention includes: a first substrate; a second substrate; and a liquid crystal layer provided between the first substrate and the second substrate, wherein a plurality of picture element regions are defined in the liquid crystal display device, the liquid crystal display device further including: a picture element electrode provided on one side of the first substrate that is closer to the liquid crystal layer for each of the plurality of picture element regions; a counter electrode provided on the second substrate so as to oppose the picture element electrode via the liquid crystal layer therebetween; a switching element electrically connected to the picture element electrode; and a scanning line and a signal line at least one of which is provided on the first substrate, wherein: the liquid crystal layer takes a substantially vertical alignment in the absence of an applied voltage in at least certain areas between the picture element electrode and the counter electrode; the picture element electrode includes a plurality of generally star-shaped conductive portions each having four acute angle corner portions that are pointing respectively in upward, downward, leftward and rightward directions of a display plane; and the at least one of the scanning line and the signal line provided on the first substrate extends while being bent a plurality of times in each of the plurality of picture element regions so that any segment thereof is inclined with respect to an up-down direction and a left-right direction of the display plane.

In an example embodiment of this invention, each segment of the at least one of the scanning line and the signal line is inclined by about 45° with respect to the up-down direction and the left-right direction of the display plane.

In an example embodiment of this invention, both the scanning line and the signal line are provided on the first substrate.

In an example embodiment of this invention, at least some of the plurality of conductive portions that are arranged along a periphery of each of the plurality of picture element regions are arranged in the up-down direction and/or the left-right direction of the display plane at a predetermined pitch; and the at least one of the scanning line and the signal line includes a plurality of bent portions arranged in the up-down direction and/or the left-right direction of the display plane at about one half of the predetermined pitch.

In an example embodiment of this invention, at least one of the scanning line and the signal line extends closely parallel to an outer periphery of the picture element electrode defined by the at least some of the plurality of conductive portions.

In an example embodiment of this invention, the liquid crystal display device further includes a pair of polarization plates opposing each other via the liquid crystal layer therebetween, wherein a transmission axis of one of the pair of polarization plates is generally parallel to the up-down direction of the display plane, and a transmission axis of the other one of the pair of polarization plates is generally parallel to the left-right direction of the display plane.

Functions of certain example aspects of the present invention will now be described.

In the liquid crystal display device according to a first example aspect of the present invention, one of a pair of electrodes for applying a voltage across the liquid crystal layer of a picture element region includes a solid portion including a plurality of unit solid portions. The liquid crystal layer takes a substantially vertical alignment in the absence of an applied voltage, and forms a plurality of liquid crystal domains by inclined electric fields produced around the plurality of unit solid portions in the presence of an applied voltage, each of the plurality of liquid crystal domains taking a radially-inclined orientation. Thus, the outer shape of one of the pair of electrodes is defined so that inclined electric fields are produced around the plurality of unit solid portions to form a plurality of liquid crystal domains each taking a radially-inclined orientation in response to a voltage applied between the pair of electrodes. Typically, the liquid crystal layer is made of a liquid crystal material having a negative dielectric anisotropy, and the orientation of the liquid crystal layer is controlled by vertical alignment layers (e.g., vertical alignment films) provided at least on the opposing sides thereof.

The liquid crystal domains are formed by the inclined electric fields in regions corresponding to the unit solid portions, and the orientation of each liquid crystal domain changes according to the applied voltage, thereby producing a display. Since each liquid crystal domain takes a radially-inclined orientation, and takes an orientation having a high degree of rotational symmetry, there is little viewing angle dependence of the display quality, and thus a wide viewing angle characteristic is realized.

Herein, a portion of an electrode where a conductive film exists is referred to as a "solid portion", and a portion of the solid portion that produces an electric field for forming a single liquid crystal domain is referred to as a "unit solid portion". Each solid portion is typically made of a continuous conductive film.

In the liquid crystal display device of an example embodiment of the present invention, each of the unit solid portions has four acute angle corner portions, whereby the existence probability of the liquid crystal molecules that are oriented in a particular azimuth angle direction can be increased (or decreased) while keeping a high degree of rotational symmetry for the existence probabilities of the liquid crystal molecules oriented in various azimuth angle directions. In other words, a high directionality can be introduced in the existence probabilities of the liquid crystal molecules.

Specifically, since the four acute angle corner portions are pointing respectively in the upward, downward, leftward and rightward directions of the display plane, the existence probabilities of the liquid crystal molecules that are oriented parallel to these directions, i.e., those that are oriented parallel to the up-down direction or the left-right direction of the display plane, can be decreased relatively. Moreover, the existence probabilities of the liquid crystal molecules that are oriented in a direction between these directions, i.e., the upper right-lower left direction or the lower right-upper left direction of the display plane, can be increased relatively. Note that in the present specification, the 12 o'clock direction, the 6 o'clock direction, the 3 o'clock direction and the 9 o'clock direction of the display plane will be referred to as the "upward", "downward", "rightward" and "leftward" directions, respectively.

Thus, a bright display can be realized in an arrangement where the transmission axis of one of the pair of polarization plates opposing each other via the liquid crystal layer therebetween is generally parallel to the up-down direction of the display plane while the transmission axis of the other polarization plate is generally parallel to the left-right direction of the display plane. Since a high directionality is introduced in the existence probabilities of the liquid crystal molecules as described above, it is possible to relatively decrease the existence probabilities of the liquid crystal molecules that are oriented generally parallel or perpendicular to the transmission axis, i.e., the liquid crystal molecules that give substantially no phase difference to the incident light, and it is possible to relatively increase the existence probabilities of the liquid crystal molecules that are oriented generally parallel to a direction inclined by 45° with respect to the transmission axis, i.e., the liquid crystal molecules that give a substantial phase difference to the incident light.

In an arrangement where a pair of polarization plates are arranged so that the transmission axis of one polarization plate is parallel to the up-down direction of the display plane while the transmission axis of the other polarization plate is parallel to the left-right direction of the display plane, there is only a little deterioration in the black display quality from an inclined viewing angle. Thus, according to an example embodiment of the present invention, it is possible to realize a bright display while suppressing the deterioration in the display quality from an inclined viewing angle.

Furthermore, when each of the four corner portions of the unit solid portion is provided with an acute angle, the total length of the sides of an electrode along which an inclined electric field is produced can easily be increased, whereby the inclined electric field can act upon more liquid crystal molecules, thus obtaining a high response speed. Moreover, when each of the four corner portions is provided with an acute angle, the distance from an electrode side to a liquid crystal molecule within the unit solid portion can be shortened, whereby it is possible to efficiently regulate the orientation of the liquid crystal molecules within the unit solid portion, thus obtaining a desirable response characteristic. An "acute angle corner portion" as used herein refers not only to a corner portion where two straight lines make an angle less than 90° therebetween, but also to a corner portion where a curved line and a straight line, or two curved lines, make an angle less than 90° therebetween (i.e., the angle between the tangential lines of the two lines at the intersection thereof is less than 90°). Moreover, the corner portion may alternatively have no vertex.

As described above, in an arrangement where a pair of polarization plates opposing each other via the liquid crystal layer therebetween are arranged so that the transmission axis of one polarization plate is generally parallel to the up-down direction of the display plane while the transmission axis of the other polarization plate is generally parallel to the left-right direction of the display plane, it is possible to decrease the deterioration in the black display quality from an inclined viewing angle (a direction inclined from the display plane normal direction). The deterioration in the black display quality (i.e., black state) (specifically, light leakage) when viewed from an inclined viewing angle is due to the apparent relationship between the transmission axes shifting from being perpendicular (with the angle between the transmission axes exceeding 90°) as the pair of polarization plates in a crossed-Nicols arrangement are viewed from an inclined viewing angle. However, with such a transmission axis arrangement as described above, the transmission axes will stay apparently perpendicular to each other when the viewing angle is inclined in the up-down direction or the left-right direction, and it is often the case when viewing the display plane that the viewing angle is inclined in the up-down direction or the left-right direction of the display plane.

As the shape of each unit solid portion has rotational symmetry (as viewed in the substrate normal direction) in certain example embodiments, it is possible to increase the stability of the radially-inclined orientation of the liquid crystal domain formed in a region corresponding to the unit solid portion. In order to reduce the viewing angle dependence of the liquid crystal domain, it is preferred that the shape of the unit solid portion has a high degree of rotational symmetry (preferably at least two-fold rotational symmetry, and more preferably at least four-fold rotational symmetry).

The shape of the unit solid portion is, for example, a generally star shape obtained by bending or curving each side of a rectangular shape inwardly. The generally star-shaped unit solid portion preferably has two-fold rotational symmetry (with a two-fold rotational symmetry axis) and more preferably has four-fold rotational symmetry (with a four-fold rotational symmetry axis).

As the plurality of unit solid portions have substantially the same shape and substantially the same size, and form at least one unit lattice having rotational symmetry, a plurality of liquid crystal domains can be arranged with a high degree of symmetry for each unit lattice, whereby it is possible to improve the viewing angle dependence of the display quality. Moreover, by dividing the entire picture element region into unit lattices, it is possible to stabilize the orientation of the liquid crystal layer across the entire picture element region. For example, the plurality of unit solid portions may be arranged so that the centers of the unit solid portions form a square lattice. Note that where each picture element region is divided by an opaque element such as a storage capacitance line, a unit lattice can be arranged for each region contributing to the display.

The electrode having a solid portion including a plurality of unit solid portions may further include at least one opening. When openings are provided in the electrode, as compared with a case where the unit solid portions are formed only by defining the outer shape of the electrode, it is possible to easily form a large number of unit solid portions and to easily form a large number of liquid crystal domains in each picture element region.

As openings are provided, it is possible to form a liquid crystal domain taking a radially-inclined orientation also in each region corresponding to an opening by an inclined electric field produced around a unit solid portion, i.e., at the edge portion of an opening. The liquid crystal domain formed in the unit solid portion and the liquid crystal domain formed in the opening are both formed by an inclined electric field as described above, whereby these liquid crystal domains are alternately formed adjacent to each other, and the orientation of the liquid crystal molecules is essentially continuous between the adjacent liquid crystal domains. Therefore, no disclination line is formed along the boundary between the liquid crystal domain formed in the opening and the liquid crystal domain formed in the adjacent solid portion, and the display quality is not deteriorated by such a disclination line, and the stability of the orientation of the liquid crystal molecules is high.

When the liquid crystal molecules take a radially-inclined orientation not only in a region corresponding to the solid portion of the electrode but also in a region corresponding to the opening, a stable orientation is realized with a high degree of continuity of the orientation of the liquid crystal molecules, thereby obtaining a uniform display without significant display non-uniformity. Particularly, in order to realize a desirable response characteristic (i.e., a high response speed), the inclined electric field for controlling the orientation of the liquid crystal molecules may act upon many liquid crystal molecules, which requires that the total area of the open region (the total length of the edge portion thereof) be large. When a liquid crystal domain having a stable radially-inclined orientation is formed corresponding to the opening, it is possible to suppress the deterioration of the display quality (occurrence of display non-uniformity) even if the total area of the open region is increased in order to improve the response characteristic.

Note that as long as a liquid crystal domain taking a radially-inclined orientation is formed so as to correspond to the solid portion (unit solid portion), a continuity of the orientation of the liquid crystal molecules in each picture element region is ensured, thereby stabilizing the radially-inclined orientation of the liquid crystal domain formed so as to correspond to the solid portion, even when a liquid crystal domain formed so as to correspond to an opening does not take a radially-inclined orientation. Particularly, when the area of an opening is small, the opening has only a little contribution to the display, and thus the display quality will not deteriorate significantly even if a liquid crystal domain taking a radially-inclined orientation is not formed in a region corresponding to the opening.

When at least some of the plurality of openings have substantially the same shape and substantially the same size, and form at least one unit lattice having rotational symmetry, a plurality of liquid crystal domains can be arranged with a high degree of symmetry for each unit lattice, whereby it is possible to improve the viewing angle dependence of the display quality. Moreover, by dividing the entire picture element region into unit lattices, it is possible to stabilize the orientation of the liquid crystal layer across the entire picture element region. For example, openings may be arranged so that the centers of the openings form a square lattice. Note that where each picture element region is divided by an opaque element such as a storage capacitance line, a unit lattice can be arranged for each region contributing to the display.

When the shape of each of at least some of the plurality of openings (typically those forming a unit lattice) has rotational symmetry (as viewed in the substrate normal direction), it is possible to increase the stability of the radially-inclined orientation of the liquid crystal domain formed in the opening. In order to reduce the viewing angle dependence of the liquid crystal domain, it is preferred in certain embodiments that the shape of the unit solid portion has a high degree of rotational symmetry (preferably at least two-fold rotational symmetry, and more preferably at least four-fold rotational symmetry).

For example, the opening may be generally cross-shaped or generally rhombus-shaped. Alternatively, the shape of the opening may be a circular digon (an almond-like shape) made up of two arcs (typically minor arcs).

With the electrode structure where openings are provided in one of a pair of electrodes, a sufficient voltage may not be applied across the liquid crystal layer in regions corresponding to the openings and a sufficient retardation change may not be obtained, thereby decreasing the light efficiency. In view of this, a dielectric layer may be provided on one side of the electrode with openings that is away from the liquid crystal layer, with an additional electrode being provided so as to at least partially oppose the openings of the upper electrode via the dielectric layer therebetween (i.e., a two-layer electrode may be employed), whereby it is possible to apply a sufficient voltage across the liquid crystal layer in regions corresponding to the openings, thereby improving the light efficiency and the response characteristic.

Typically, a picture element region has a rectangular shape made up of two sides parallel to the up-down direction of the display plane and two sides parallel to the left-right direction of the display plane. Therefore, in a case where the four acute angle corner portions of the unit solid portion are pointing respectively in the upward, downward, leftward and rightward directions of the display plane, the unit solid portions cannot easily be arranged near the periphery of the picture element region at a density equal to that in the central portion of the picture element region, whereby it is difficult to form liquid crystal domains corresponding to the solid portion at a high density near the periphery of the picture element region.

In a case where the solid portion of the electrode includes a plurality of sub-unit solid portions each having substantially the same shape as a portion of the unit solid portion, and the plurality of sub-unit solid portions are arranged along the periphery of the picture element region, an inclined electric field is produced also around the sub-unit solid portion in response to a voltage applied across the liquid crystal layer, and a liquid crystal domain can be formed also in a region corresponding to the sub-unit solid portion by the inclined electric field. Therefore, it is possible to obtain a stable orientation entirely across the picture element region. Moreover, since the sub-unit solid portions are arranged along the periphery of the picture element region, it is possible to increase the area ratio of the solid portion in the picture element region. Therefore, it is possible to increase the area (as viewed in the substrate normal direction) of the liquid crystal layer that is directly influenced by the electric field produced by the electrode, thereby improving the effective aperture ratio (transmittance). Thus, a brighter display is realized. As described above, by arranging the sub-unit solid portions along the periphery of the picture element region, liquid crystal domains corresponding to the solid portion can also be formed near the periphery of the picture element region at a high density, thereby obtaining a stable orientation entirely across the picture element region and realizing a brighter display.

The plurality of sub-unit solid portions may include a sub-unit solid portion having a shape generally corresponding to one half of the unit solid portion, and/or may include a sub-unit solid portion having a shape generally corresponding to one quarter of the unit solid portion. The sub-unit solid portions having a shape generally corresponding to one half of the unit solid portion can suitably be arranged in regions along each side of the picture element region. The sub-unit solid portions having a shape generally corresponding to one quarter of the unit solid portion can suitably be arranged in regions along each corner of the picture element region.

In order to reduce the viewing angle dependence of the display quality, it is preferred that each liquid crystal domain has rotational symmetry entirely across the picture element region, and that a liquid crystal domain formed near the periphery of the picture element region has rotational symmetry together with at least one adjacent liquid crystal domain formed in the central portion of the picture element region. Thus, it is preferred that each of the sub-unit solid portions has rotational symmetry together with at least one of the unit solid portions (e.g., the sub-unit solid portions form at least one unit lattice in a complementary manner together with at least one of the unit solid portions).

Moreover, in order to reduce the viewing angle dependence of the display quality, it is preferred that the plurality of sub-unit solid portions in each picture element region together form an integral multiple of the shape of the unit solid portion.

However, since the sub-unit solid portion has a shape corresponding to a portion of the unit solid portion, a liquid crystal domain formed corresponding to the sub-unit solid portion may not have an orientation as stable as that of a liquid crystal domain formed corresponding to the unit solid portion.

When the substrate opposing the substrate having the electrode including the solid portion includes, in a region corresponding to the sub-unit solid portion, an orientation-regulating structure that exerts an orientation-regulating force upon liquid crystal molecules of the liquid crystal layer at least in the presence of an applied voltage, and the direction of orientation regulation by the orientation-regulating structure is aligned with the direction of orientation regulation by an inclined electric field, it is possible to improve the orientation stability of the liquid crystal domain formed in the sub-unit solid portion.

While the effect of stabilizing the orientation can be obtained as long as the orientation-regulating structure exerts an orientation-regulating force at least in the presence of an applied voltage, there is obtained a further advantage that the orientation can be stabilized irrespective of the level of the applied voltage if an arrangement such that the orientation-regulating force is exerted even in the absence of an applied voltage is employed.

The orientation-regulating structure may be, for example, a protrusion(s) protruding into (or toward) the liquid crystal layer. Such a protrusion is capable of exerting an orientation-regulating force even in the absence of an applied voltage. Moreover, such a protrusion can be produced by a simple process, and is thus preferable also in terms of the production efficiency.

The liquid crystal display device of an example embodiment of the present invention may be, for example, an active matrix type liquid crystal display device including a switching element such as a TFT (thin film transistor) for each picture element region, wherein the electrode including unit solid portions described above is a picture element electrode that is switched ON and OFF by the switching element, and the other electrode is at least one counter electrode opposing a plurality of picture element electrodes. Thus, by providing unit solid portions in one of a pair of substrates opposing each other via the liquid crystal layer therebetween, it is possible to realize a stable radially-inclined orientation. Specifically, the liquid crystal display device can be produced by employing a production method known in the art while modifying the photomask so that unit solid portions of an intended shape are formed and arranged in an intended arrangement in the process of patterning a conductive film into picture element electrodes. Of course, the plurality of unit solid portions may also or instead be formed in the counter electrode.

In addition to the features of the liquid crystal display device according to the first aspect of the present invention, the liquid crystal display device according to an example of the second aspect of the present invention has a feature that one of the scanning line and the signal line that is provided on a substrate on which the picture element electrode is provided (the active matrix substrate) extends while being bent a plurality of times so that any elongated segment thereof is inclined with respect to the up-down direction and the left-right direction of the display plane (i.e., extends in a zigzag pattern). Therefore, the unit solid portion whose corner portions are pointing respectively in the upward, downward, leftward and rightward directions of the display plane can be arranged near the periphery of the picture element region at a density generally equal to that in the central portion of the picture element region. Therefore, in the presence of an applied voltage, liquid crystal domains corresponding to the solid portion can be formed near the periphery of the picture element region at a density generally equal to that in the central portion of the picture element region, thereby obtaining a stable orientation entirely across the picture element region. Moreover, since the unit solid portions can be arranged near the periphery of the picture element region at a density generally equal to that in the central portion of the picture element region, it is possible to increase the area ratio of the solid portion in the picture element region. Therefore, it is possible to increase the area (as viewed in the substrate normal direction) of the liquid crystal layer that is directly influenced by the electric field produced by the electrode, thereby improving the effective aperture ratio (transmittance). Thus, a brighter display is realized.

In order to efficiently utilize the picture element region, i.e., to efficiently arrange the unit solid portions near the periphery of the picture element region, at least one of the lines that is bent (i.e., at least one of the scanning line and the signal line provided on the active matrix substrate) extends closely parallel to the outer periphery of the picture element electrode, which is defined by some of the unit solid portions that are present along the periphery of the picture element region.

Typically, the unit solid portions that are present along the periphery of the picture element region are arranged in the up-down direction and/or the left-right direction of the display plane at a predetermined pitch. Therefore, by forming the bent line so that a plurality of bent portions thereof are arranged in the up-down direction and/or the left-right direction of the display plane at about one half of the predetermined pitch, the bent line can easily be extended closely parallel to the outer periphery of the picture element electrode.

For example, the bent line can be bent a plurality of times so that each segment thereof is inclined by from about 30 to 60 degrees (more preferably about 45°) with respect to the up-down direction and the left-right direction of the display plane. Of course, the inclination angle is not limited thereto. Since the outer periphery of the picture element electrode is defined by the unit solid portions that are present along the periphery of the picture element region, the inclination angle can suitably be adjusted according to the shape of the unit solid portions so that the bent line extends closely parallel to the outer periphery of the picture element electrode.

In a case where the switching element electrically connected to the picture element electrode is a three-terminal active element such as a thin film transistor (TFT), both of the scanning line and the signal line are provided on the active matrix substrate. In a case where the switching element is a two-terminal active element such as an MIM (Metal Insulator Metal) element, one of the scanning line and the signal line is provided on the active matrix substrate and the other line may be provided on the substrate (the counter substrate) opposing the active matrix substrate. In either case, functions and effects as described above can be obtained by bending at least the line provided on the active matrix substrate.

The substrate (the counter substrate) opposing the substrate having the picture element electrodes may include, in a region corresponding to each of the plurality of unit solid portions, an orientation-regulating structure that exerts an orientation-regulating force for orienting liquid crystal molecules of the liquid crystal layer into a radially-inclined orientation at least in the presence of an applied voltage. Then, at least in the presence of an applied voltage, the orientation-regulating force from the electrode having unit solid portions and that from the orientation-regulating structure act upon the liquid crystal molecules in the liquid crystal domain, thereby stabilizing the radially-inclined orientation of the liquid crystal domain and suppressing the deterioration in the display quality due to the application of a stress on the liquid crystal layer (e.g., occurrence of an after image phenomenon).

When the orientation-regulating structure is provided in a region in the vicinity of the center of each of the plurality of unit solid portions, it is possible to fix the position of the central axis of the radially-inclined orientation, thereby effectively improving the resistance of the radially-inclined orientation to the stress.

When the direction of orientation regulation by the orientation-regulating structure is aligned with the direction of the radially-inclined orientation formed by the inclined electric field in the liquid crystal domain formed corresponding to the unit solid portion, the continuity and the stability of the orientation increase, thereby improving the display quality and the response characteristic.

While the effect of stabilizing the orientation can be obtained as long as the orientation-regulating structure exerts an orientation-regulating force at least in the presence of an applied voltage, there is obtained a further advantage that the orientation can be stabilized irrespective of the level of the applied voltage if an arrangement such that the orientation-regulating force is exerted even in the absence of an applied voltage is employed. Since even a relatively weak orientation-regulating force of an orientation-regulating structure gives an intended effect, even a small structure with respect to the size of a picture element can still stabilize the orientation sufficiently. Therefore, any of various structures may be employed for the orientation-regulating structure because the orientation-regulating structure is only required to exert an orientation-regulating force that is weaker than that from the picture element electrode having unit solid portions.

The orientation-regulating structure may be, for example, a protrusion(s) protruding from the substrate into the liquid crystal layer. Such a protrusion is capable of exerting an orientation-regulating force even in the absence of an applied voltage. Moreover, such a protrusion can be produced by a simple process, and is thus preferable also in terms of the production efficiency. Alternatively, the orientation-regulating structure may include a horizontal orientation surface provided on one side of the substrate that is closer to the liquid crystal layer. Alternatively, the orientation-regulating structure may be an opening(s) provided in the electrode. These structures can be produced by a method known in the art.

BRIEF DESCRIPTION OF THE DRAWINGS

FIG. 1A and FIG. 1B schematically illustrate a structure of one picture element region of a liquid crystal display device 100 according to an example embodiment of the present invention, wherein FIG. 1A is a plan view, and FIG. 1B is a cross-sectional view taken along line 1B–1B' of FIG. 1A.

Each of FIG. 3A to FIG. 3D schematically illustrates the relationship between an electric force line and an orientation of a liquid crystal molecule.

Figure 4A:
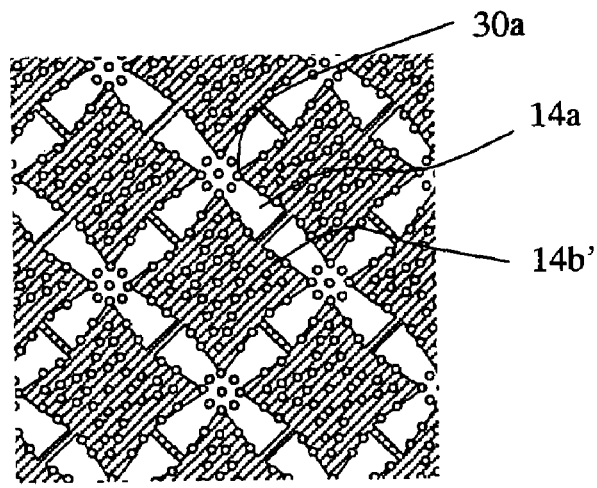
Figure 4B:
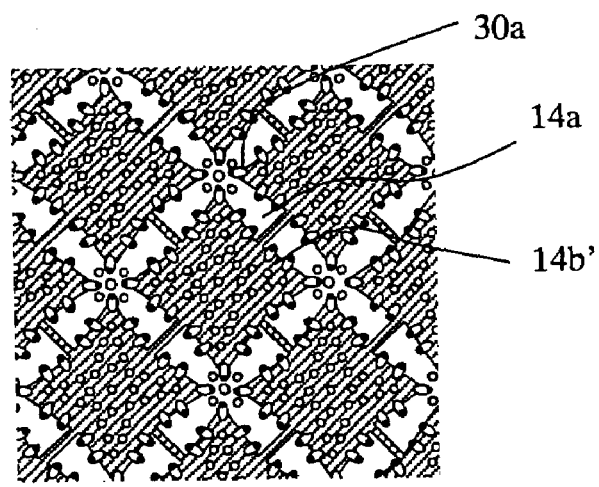
Figure 4C:
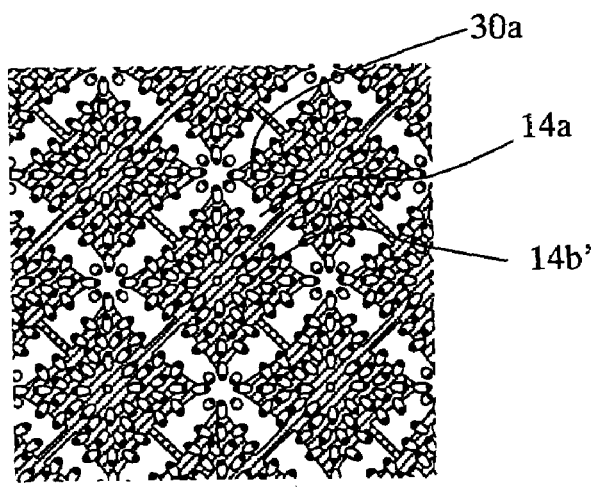

Each of FIG. 4A to FIG. 4C schematically illustrates an orientation of liquid crystal molecules in the liquid crystal display device 100 as viewed in a substrate normal direction.

Figure 5:
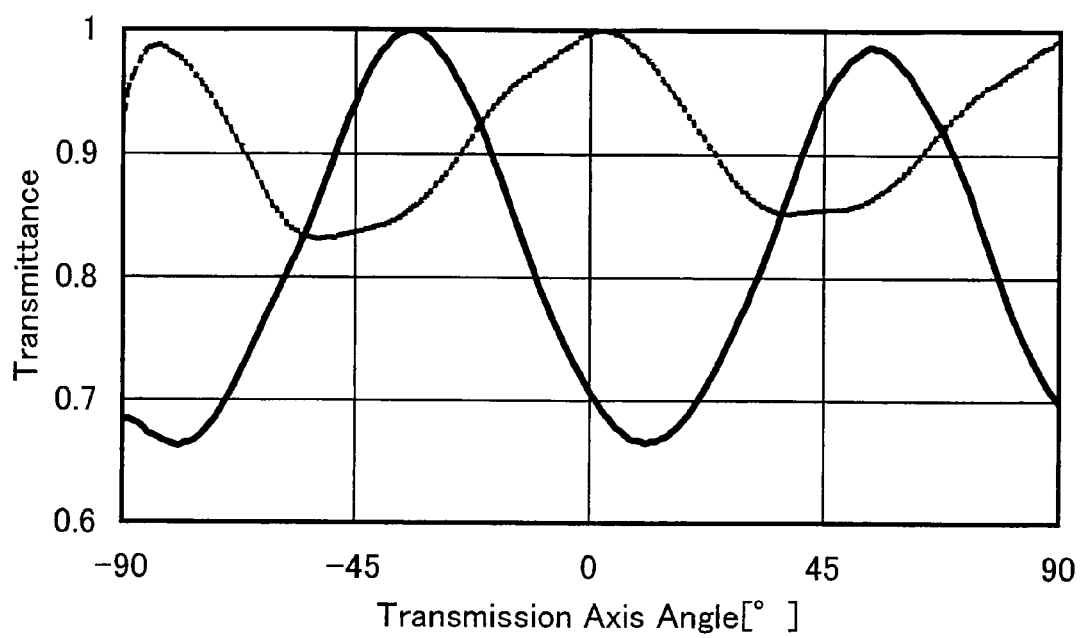

FIG. 5 is a graph showing the relationship between the transmission axis angle of the polarization plate and the transmittance ratio.

Figure 6:
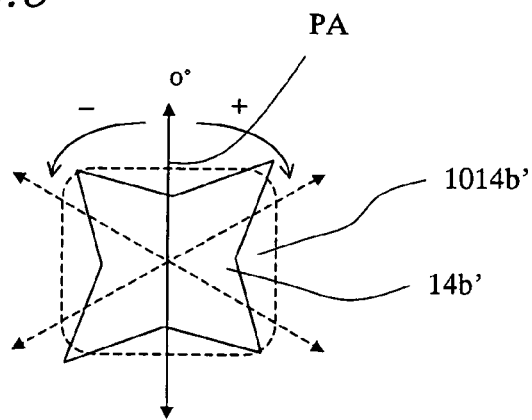

FIG. 6 illustrates the relationship between the polarization axis angle and the directions in which corner portions of a unit solid portion are pointing.

Figure 7A:
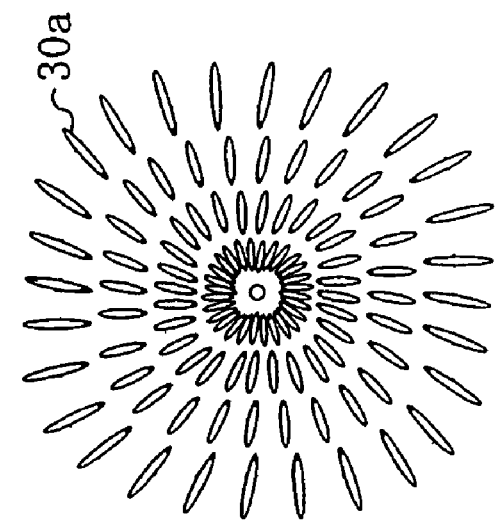
Figure 7B:
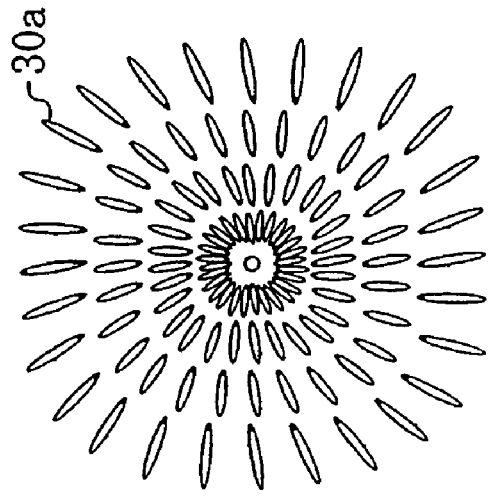
Figure 7C:
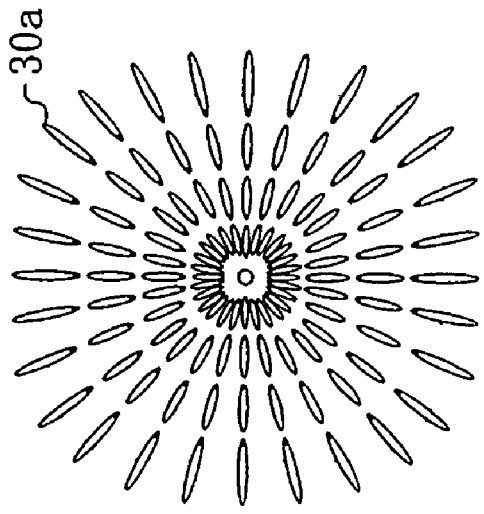

FIG. 7A to FIG. 7C schematically illustrate exemplary radially-inclined orientations of liquid crystal molecules.

Figure 8A:
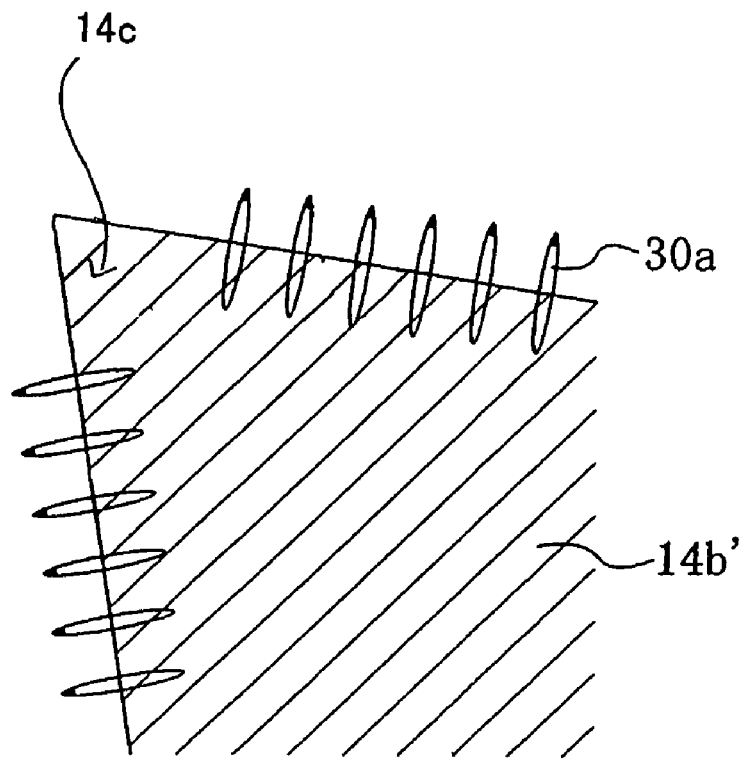
Figure 8B:
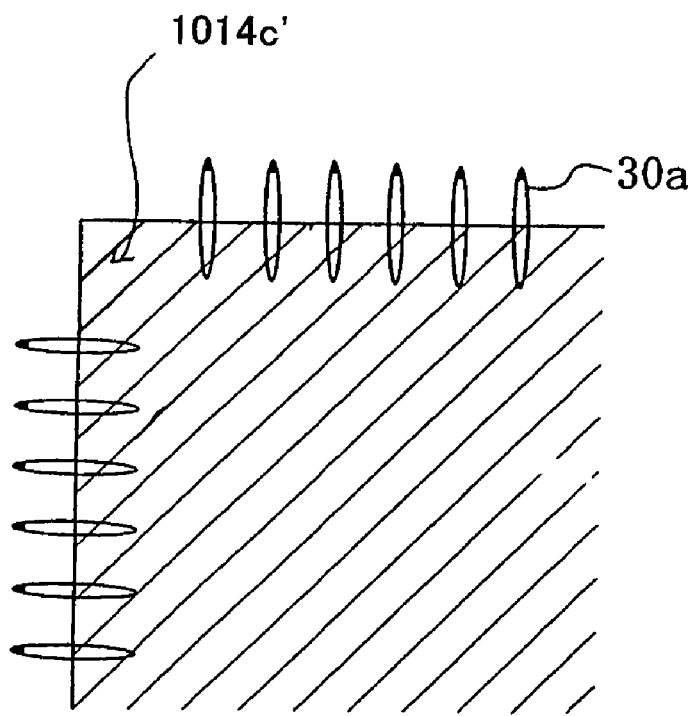

FIG. 8A and FIG. 8B illustrate a function obtained by providing a corner portion of a unit solid portion with an acute angle.

Figure 9A:
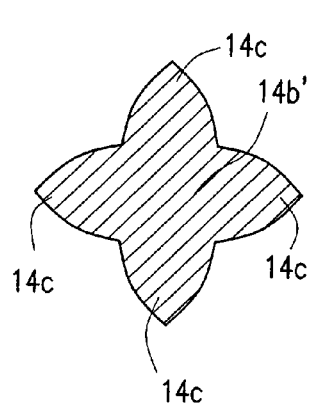
Figure 9B:
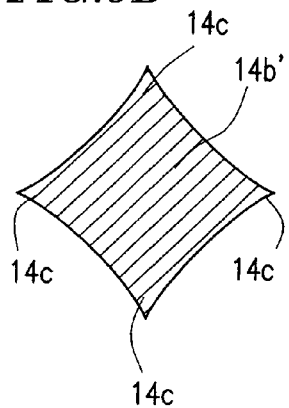
Figure 9C:
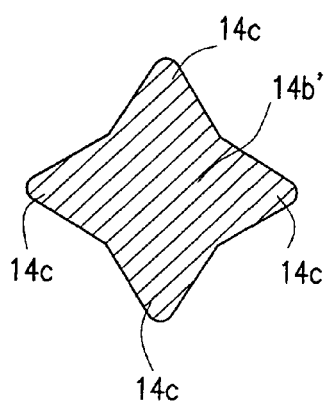

FIG. 9A to FIG. 9C are plan views schematically illustrating examples of unit solid portions used in the liquid crystal display device according to an example embodiment of the present invention.

Figure 10:
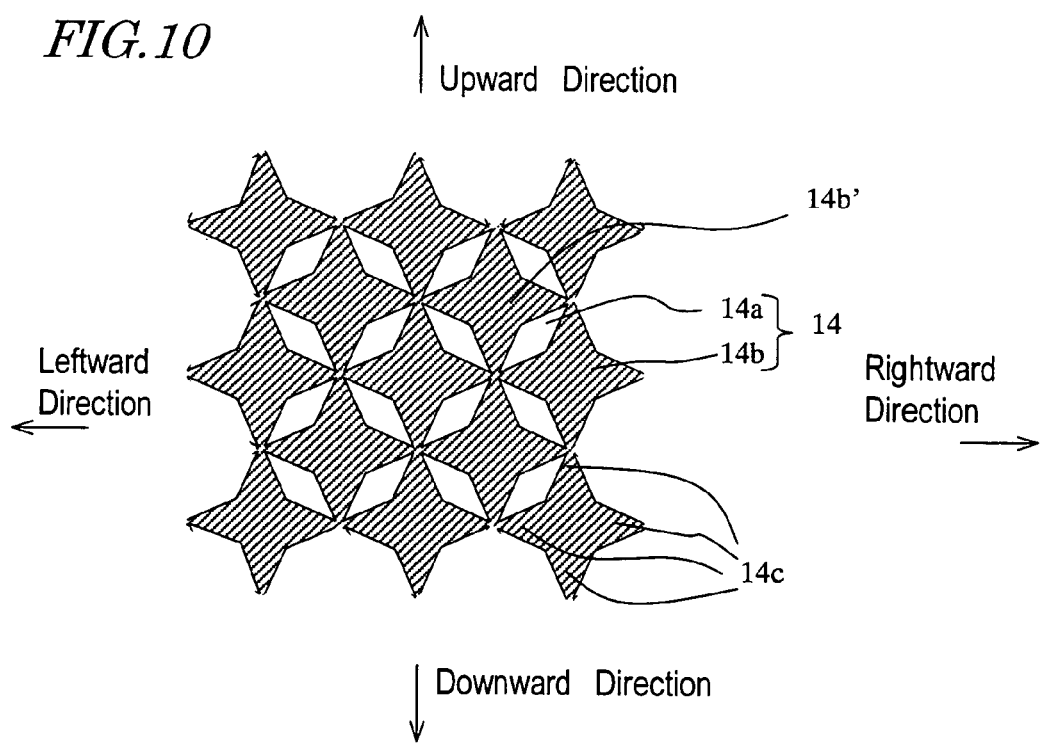

FIG. 10 is a plan view schematically illustrating another picture element electrode used in the liquid crystal display device according to an example embodiment of the present invention.

FIG. 11 is a plan view schematically illustrating a structure of one picture element region of another liquid crystal display device 200 according to an example embodiment of the present invention.

Figure 12:
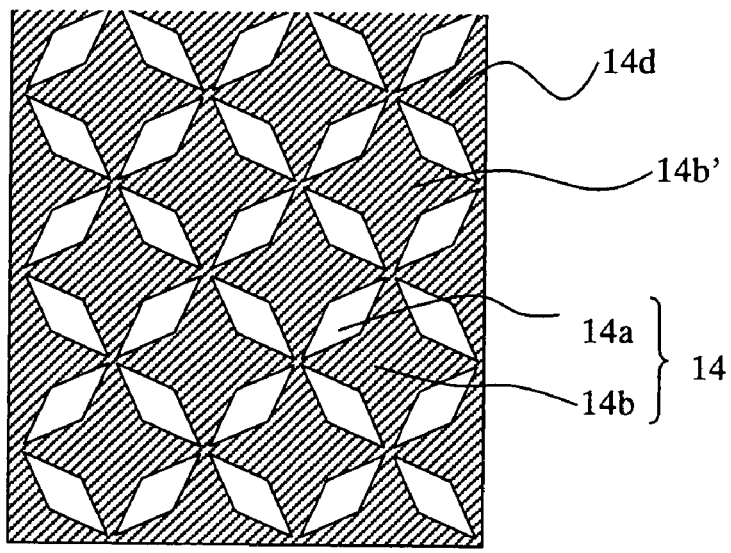

FIG. 12 is a plan view schematically illustrating another picture element electrode used in the liquid crystal display device 200.

Figure 13A:
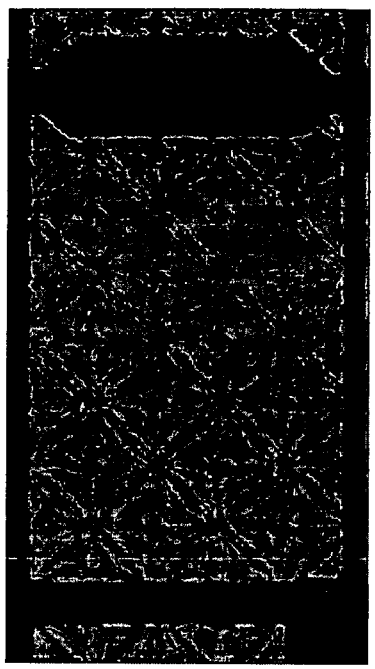
Figure 13B:

FIG. 13A and FIG. 13B are polarizing microscope images of a picture element region of a liquid crystal display device having a picture element electrode illustrated in FIG. 12, wherein FIG. 13A is a polarizing microscope image in a white display (in the presence of an applied voltage of 6.2 V), and FIG. 13B is a polarizing microscope image in an intermediate gray level display (in the presence of an applied voltage of 3.0 V).

Figure 14A:
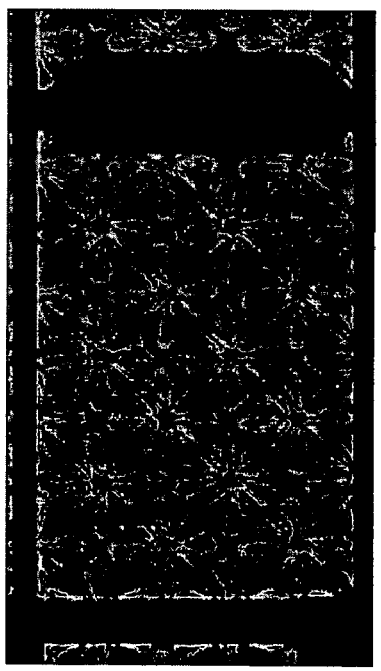
Figure 14B:

FIG. 14A and FIG. 14B are polarizing microscope images of a picture element region of a comparative liquid crystal display device, wherein FIG. 14A is a polarizing microscope image in a white display (in the presence of an applied voltage of 6.2 V), and FIG. 14B is a polarizing microscope image in an intermediate gray level display (in the presence of an applied voltage of 3.0 V).

Figure 15:
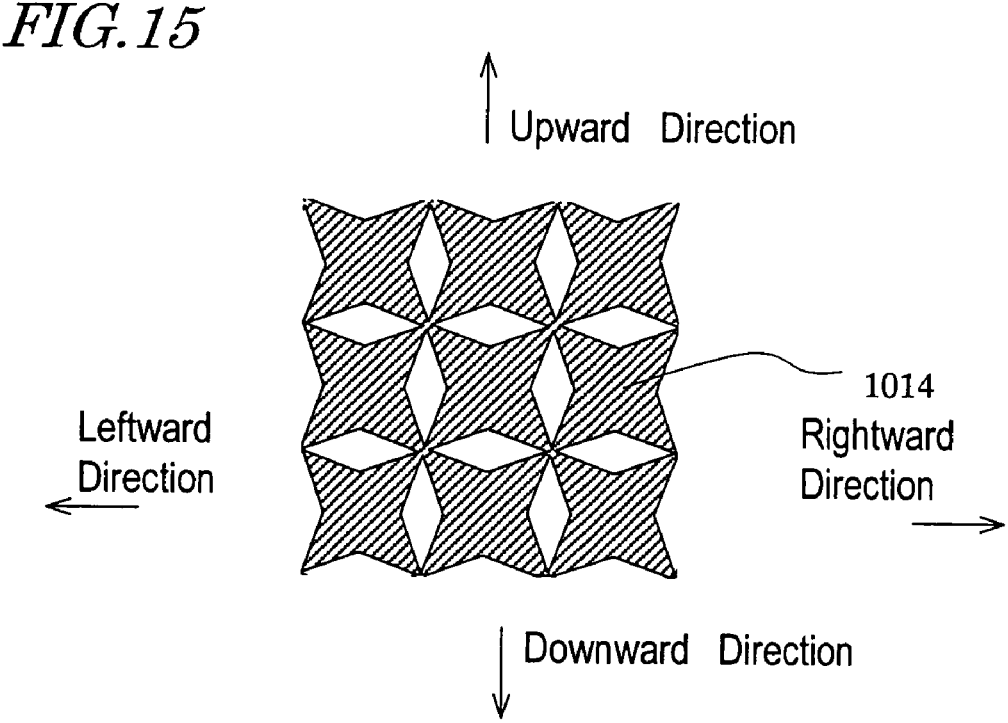

FIG. 15 is a plan view schematically illustrating a picture element electrode of a comparative liquid crystal display device.

Figure 16A:
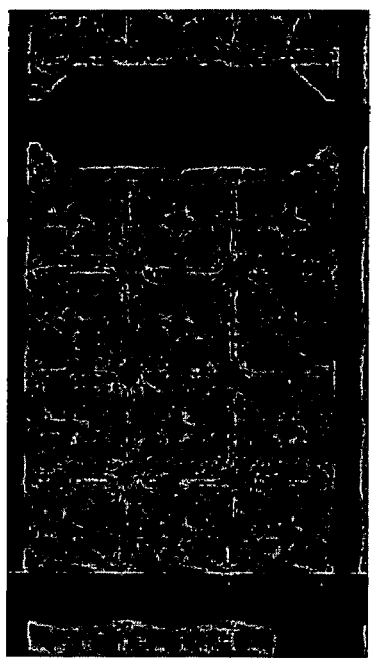
Figure 16B:

FIG. 16A and FIG. 16B are polarizing microscope images of a picture element region of a comparative liquid crystal display device, wherein FIG. 16A is a polarizing microscope image in a white display (in the presence of an applied voltage of 6.2 V), and FIG. 16B is a polarizing microscope image in an intermediate gray level display (in the presence of an applied voltage of 3.0 V).

Figure 17A:
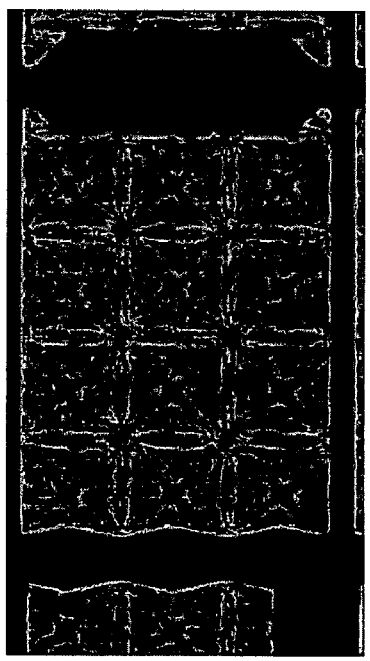
Figure 17B:

FIG. 17A and FIG. 17B are polarizing microscope images of a picture element region of a comparative liquid crystal display device, wherein FIG. 17A is a polarizing microscope image in a white display (in the presence of an applied voltage of 6.2 V), and FIG. 17B is a polarizing microscope image in an intermediate gray level display (in the presence of an applied voltage of 3.0 V).

FIG. 18 is a plan view schematically illustrating a structure of one picture element region of still another liquid crystal display device 300 according to an example embodiment of the present invention.

FIG. 19A to FIG. 19D each schematically illustrate a counter substrate 300b including an orientation-regulating structure 28.

Figure 20A:
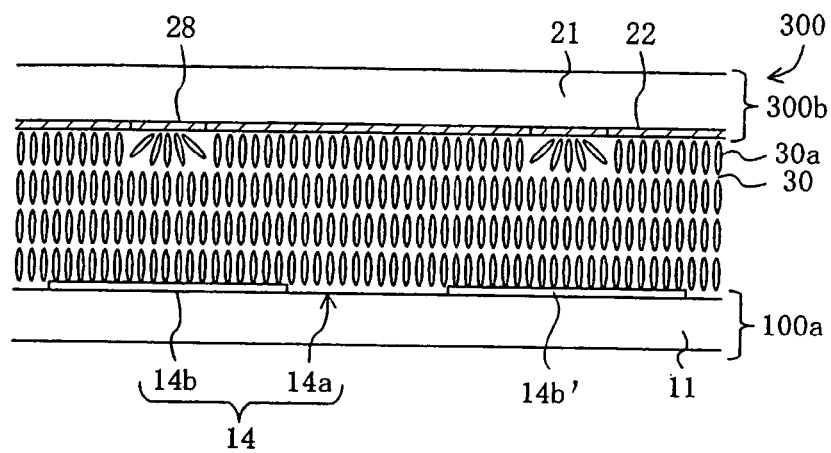
Figure 20B:
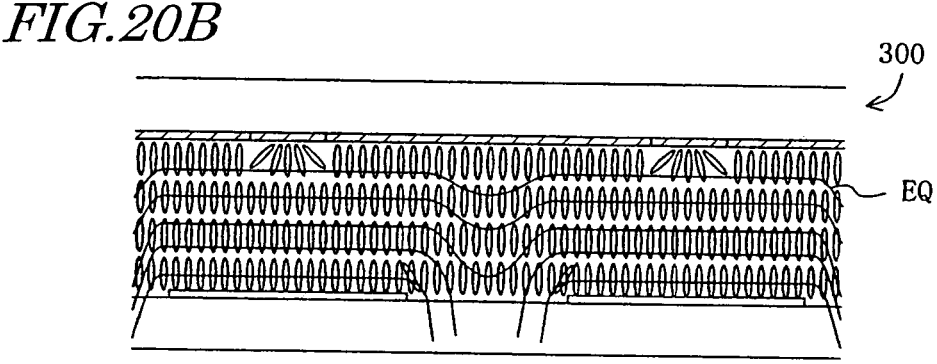
Figure 20C:
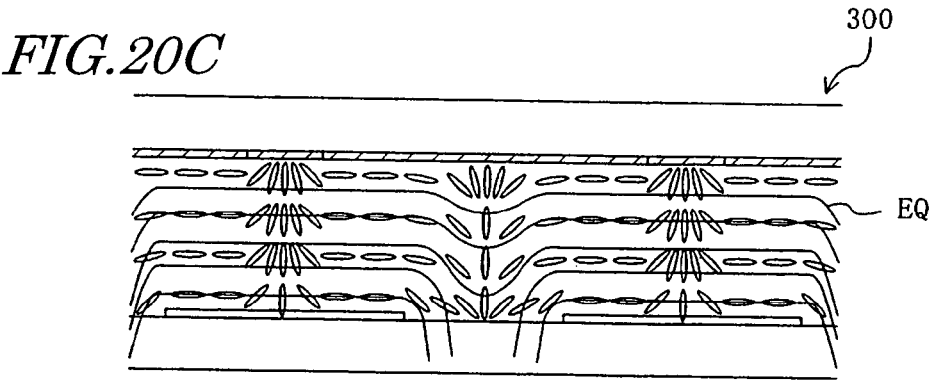

FIG. 20A to FIG. 20C are cross-sectional views schematically illustrating one picture element region of the liquid crystal display device 300, wherein FIG. 20A illustrates a state in the absence of an applied voltage, FIG. 20B illustrates a state where an orientation has just started to change (initial ON state), and FIG. 20C illustrates a steady state.

Figure 21:
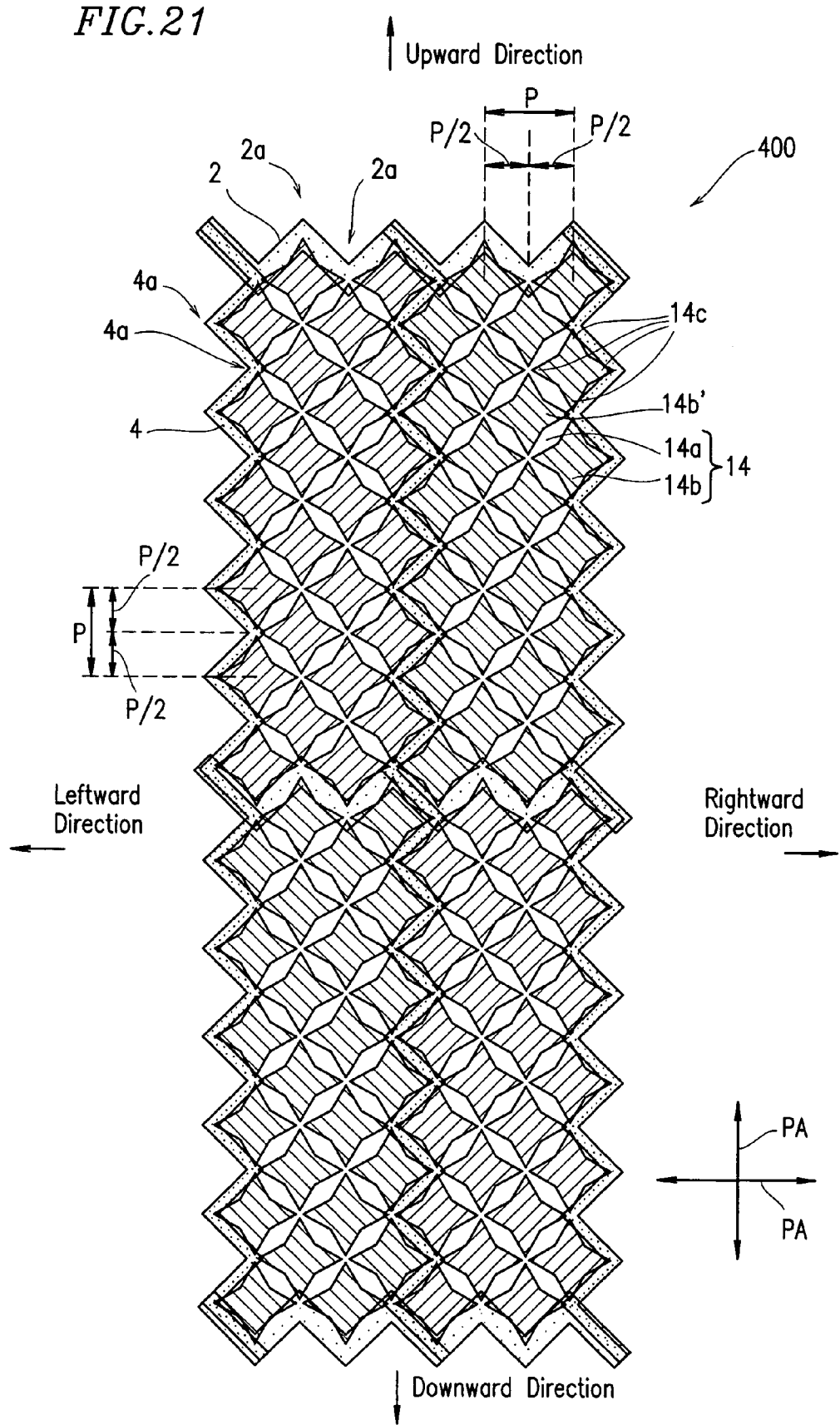

FIG. 21 is a plan view schematically illustrating a structure of four picture element regions of still another liquid crystal display device 400 according to an example embodiment of the present invention.

Figure 22:
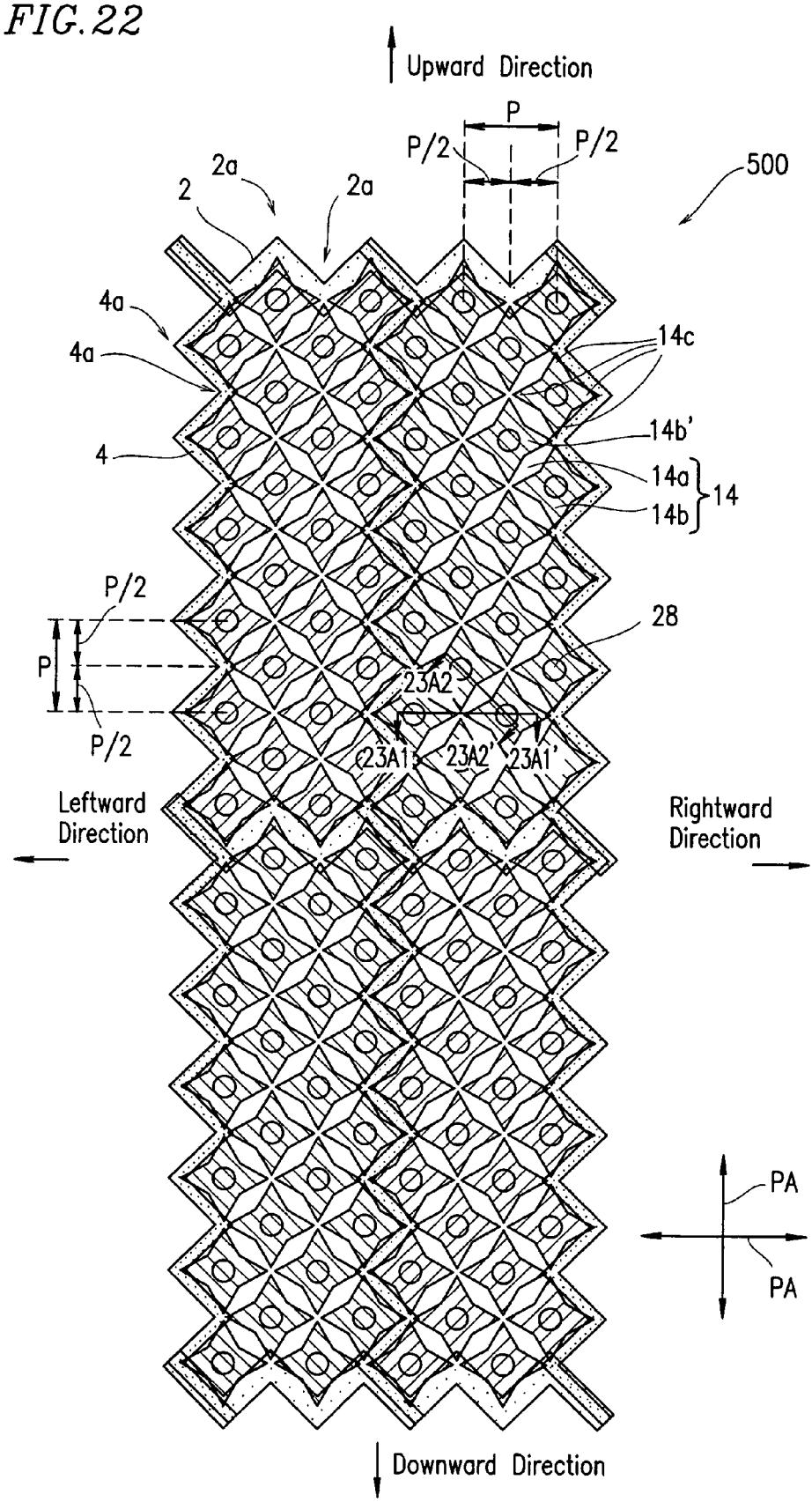

FIG. 22 is a plan view schematically illustrating a structure of four picture element regions of still another liquid crystal display device 500 according to an example embodiment of the present invention.

Figure 23A:
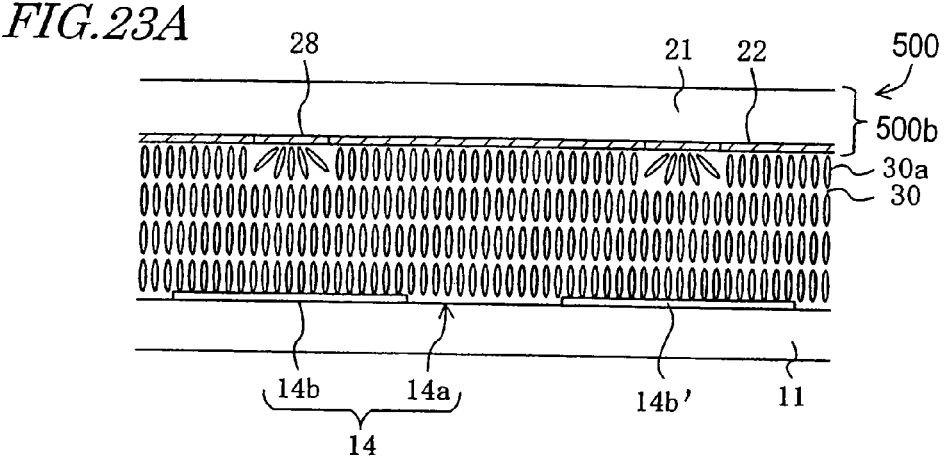
Figure 23B:
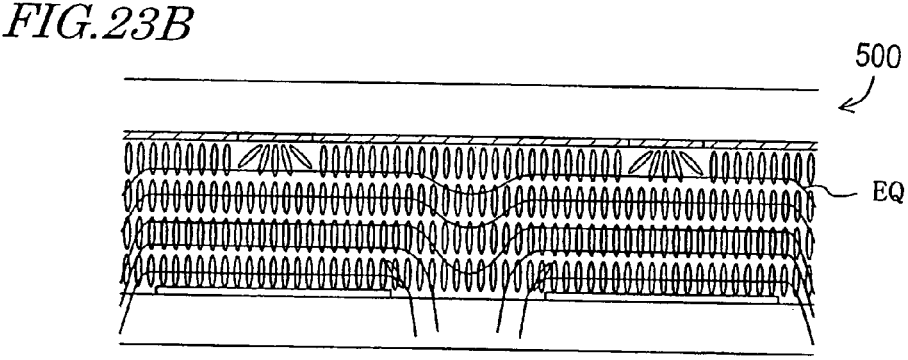
Figure 23C:
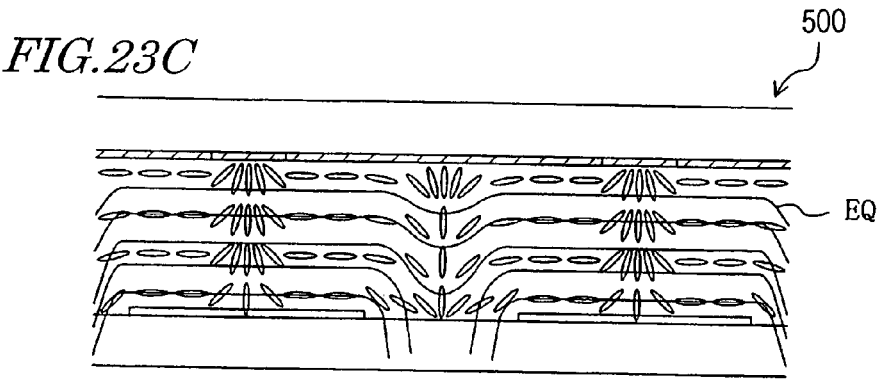

FIG. 23A to FIG. 23C are cross-sectional views schematically illustrating one picture element region of the liquid crystal display device 500, wherein FIG. 23A illustrates a state in the absence of an applied voltage, FIG. 23B illustrates a state where an orientation has just started to change (initial ON state), and FIG. 23C illustrates a steady state.

Figure 24A:
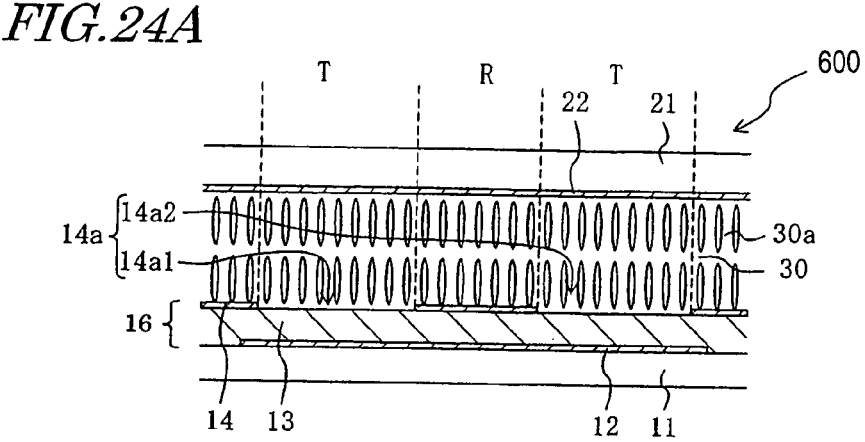
Figure 24B:
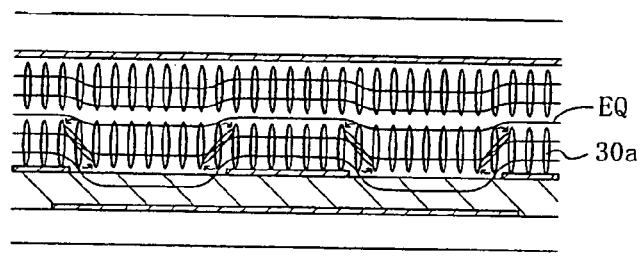
Figure 24C:
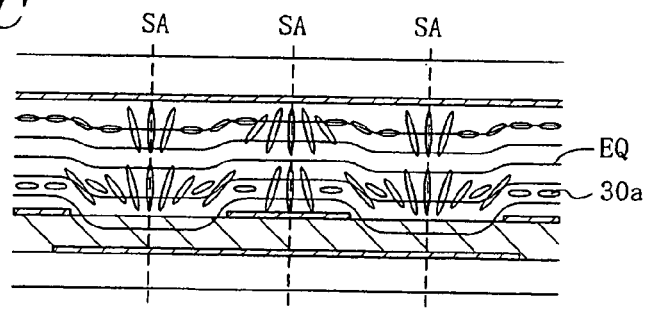

FIG. 24A to FIG. 24C are cross-sectional views schematically illustrating one picture element region of a liquid crystal display device 600 having a two-layer electrode, wherein FIG. 24A illustrates a state in the absence of an applied voltage, FIG. 24B illustrates a state where an orientation has just started to change (initial ON state), and FIG. 24C illustrates a steady state.

Figure 25A:
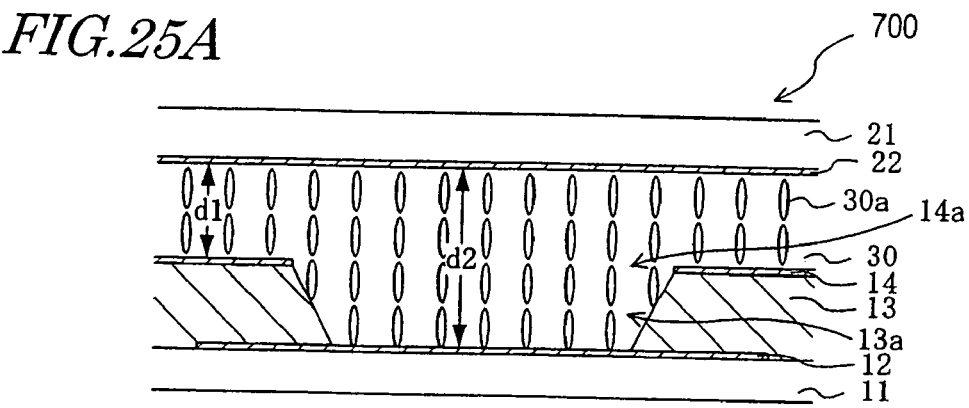
Figure 25B:
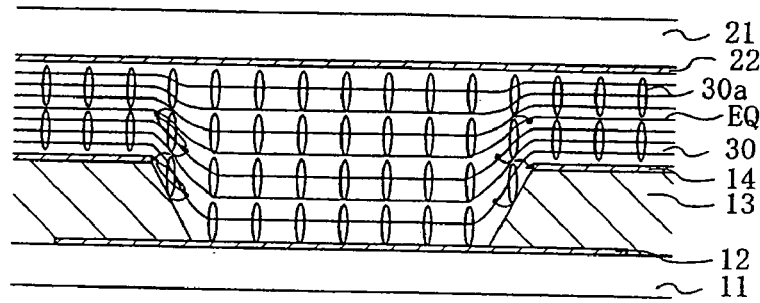
Figure 25C:
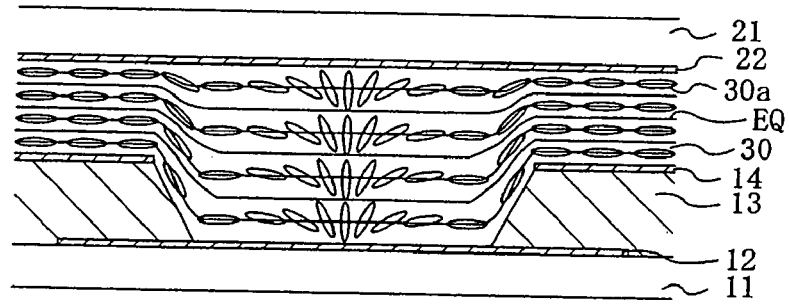

FIG. 25A to FIG. 25C are cross-sectional views schematically illustrating one picture element region of another liquid crystal display device 700 having a two-layer electrode, wherein FIG. 25A illustrates a state in the absence of an applied voltage, FIG. 25B illustrates a state where an orientation has just started to change (initial ON state), and FIG. 25C illustrates a steady state.

Figure 26:
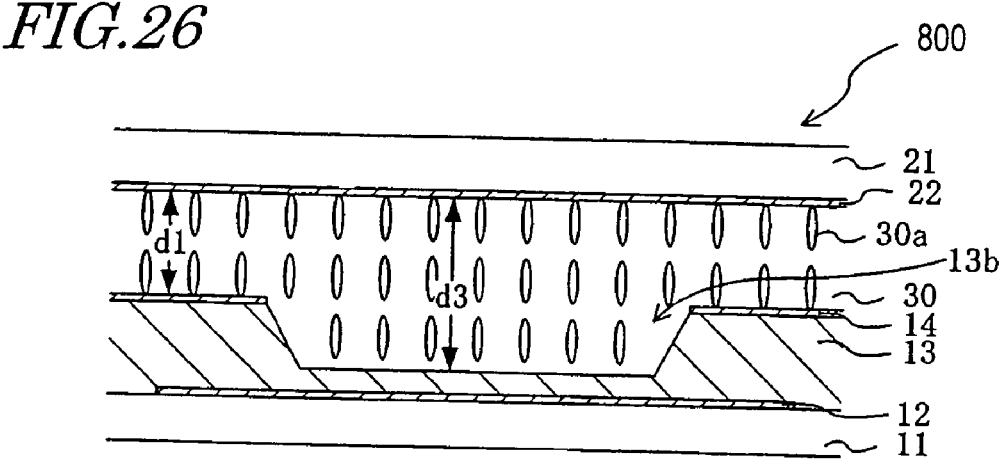

FIG. 26 is a cross-sectional view schematically illustrating one picture element region of still another liquid crystal display device 800 having a two-layer electrode.

DESCRIPTION OF EXAMPLE EMBODIMENTS

Example embodiments of the present invention will now be described with reference to the drawings.

Embodiment 1

First, the electrode structure of the liquid crystal display device of example embodiments of the present invention and the function thereof will be described. The liquid crystal display device has desirable display characteristics and thus can be suitably used as an active matrix type liquid crystal display device. An example embodiment of the present invention will now be described with respect to an active matrix type liquid crystal display device using thin film transistors (TFTs). The present invention is not limited thereto, but may alternatively be used with an active matrix type liquid crystal display device using an MIM structure, or a passive matrix type liquid crystal display device. Moreover, while the embodiment of the present invention will be described with respect to a transmission type liquid crystal display device, the present invention is not limited thereto, but may alternatively be used with a reflection type liquid crystal display device or even a transmission-reflection liquid crystal display device to be described later.

Note that in the present specification, a region of a liquid crystal display device corresponding to a "picture element", which is the minimum unit of display, will be referred to as a "picture element region". In a color liquid crystal display device, R, G and B "picture elements" for example correspond to one "pixel". In an active matrix type liquid crystal display device, a picture element region is defined by a picture element electrode and a counter electrode opposing the picture element electrode. In a passive matrix type liquid crystal display device, a picture element region is defined as a region where one of column electrodes arranged in a stripe pattern crosses one of row electrodes also arranged in a stripe pattern perpendicular to the column electrodes. In an arrangement with a black matrix, a picture element region is a portion of each region across which a voltage is applied according to the intended display state that corresponds to an opening of the black matrix.

Figure 1A:
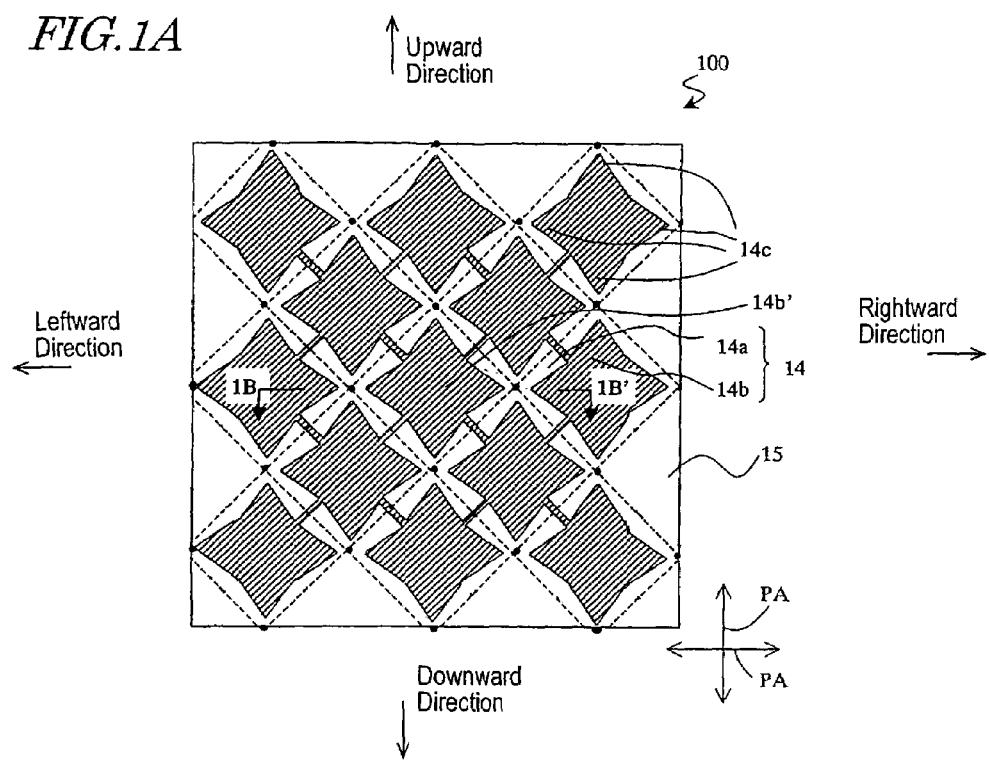
Figure 1B:
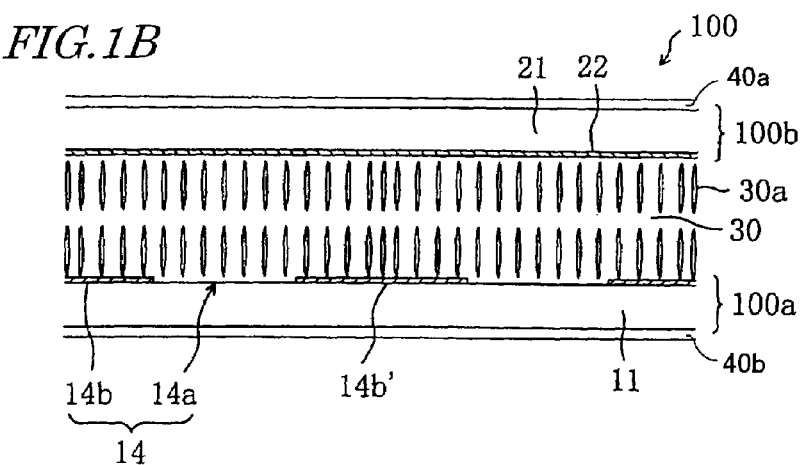

The structure of one picture element region of a liquid crystal display device 100 according to the present embodiment will be described with reference to FIG. 1A and FIG. 1B. In the following description, a color filter and a black matrix are omitted for the sake of simplicity. Moreover, in subsequent figures, each element having substantially the same function as the corresponding element in the liquid crystal display device 100 will be denoted by the same reference numeral and will not be further described below. FIG. 1A is a plan view as viewed in the substrate normal direction, and FIG. 1B is a cross-sectional view taken along line 1B–1B' of FIG. 1A. FIG. 1B illustrates a state where no voltage is applied across a liquid crystal layer.

The liquid crystal display device 100 includes an active matrix substrate (hereinafter referred to as a "TFT substrate") 100a, a counter substrate (referred to also as a "color filter substrate") 100b, and a liquid crystal layer 30 provided between the TFT substrate 100a and the counter substrate 100b. Liquid crystal molecules 30a of the liquid crystal layer 30 have a negative dielectric anisotropy, and are aligned vertical to the surface of a vertical alignment film (not shown), as illustrated in FIG. 1B, in the absence of an applied voltage across the liquid crystal layer 30 by virtue of the vertical alignment film, as a vertical alignment layer provided on one surface of each of the TFT substrate 100a and the counter substrate 100b that is closer to the liquid crystal layer 30. This state is described as the liquid crystal layer 30 being in a vertical alignment. Note, however, that the liquid crystal molecules 30a of the liquid crystal layer 30 in a vertical alignment may slightly incline from the normal to the surface of the vertical alignment film (the surface of the substrate) depending upon the type of vertical alignment film or the type of liquid crystal material used. Generally, a vertical alignment is defined as a state where the axis of the liquid crystal molecules (referred to also as the "axial orientation") is oriented at an angle of about 85° or more with respect to the surface of the vertical alignment film. Moreover, vertical alignment films may at certain locations be provided over non-flat structures such as spacers, polymer walls, electrode edges, and/or the like, so that liquid crystal molecules adjacent thereto are not vertically aligned relative to the substrate surface.

The TFT substrate 100a of the liquid crystal display device 100 includes a transparent substrate (e.g., a glass substrate) 11 and a picture element electrode 14 provided on the surface of the transparent substrate 11. The counter substrate 100b includes a transparent substrate (e.g., a glass substrate) 21 and a counter electrode 22 provided on the surface of the transparent substrate 21. The orientation of the liquid crystal layer 30 changes for each picture element region according to the voltage applied between the picture element electrode 14 and the counter electrode 22, which are arranged so as to oppose each other via at least the liquid crystal layer 30. A display is produced by utilizing a phenomenon that the polarization or amount of light passing through the liquid crystal layer 30 changes along with the change in the orientation of the liquid crystal layer 30.

The liquid crystal display device 100 includes a pair of polarization plates 40a and 40b opposing each other via the liquid crystal layer 30 therebetween and arranged so that their respective transmission axes (indicated by arrows PA in FIG. 1A) are perpendicular to each other (i.e., a crossed-Nicols arrangement), and displays an image in a normally black (NB) mode. Thus, the liquid crystal display device 100 produces a black display with the liquid crystal layer 30 in a substantially vertical alignment and the pair of polarization plates 40a and 40b in a crossed-Nicols arrangement. Therefore, while a desirable black display is observed when the black display of the liquid crystal display device 100 is viewed in the direction normal to the display plane, light leakage may occur to deteriorate the black display quality when it is viewed in a direction inclined from the display plane normal direction (hereinafter referred to as an "inclined viewing angle").

A cause of the light leakage from an inclined viewing angle is that the transmission axes of the pair of polarization plates 40a and 40b in a crossed-Nicols arrangement are no longer apparently perpendicular to each other (with the angle between the transmission axes exceeding 90°) when viewed from an inclined viewing angle. The deterioration in the display quality due to the light leakage can be suppressed by arranging the polarization plates 40a and 40b so that one polarization axis PA is substantially parallel to the up-down direction of the display plane and the other polarization axis PA is substantially parallel to the left-right direction of the display plane, as illustrated in FIG. 1A. With such an arrangement, the transmission axes will stay apparently perpendicular to each other when the viewing angle is inclined in the up-down direction or the left-right direction, and it is often the case when viewing the display plane that the viewing angle is inclined in the up-down direction or the left-right direction of the display plane. Note that in the present specification, the 12 o'clock direction, the 6 o'clock direction, the 3 o'clock direction and the 9 o'clock direction of the display plane will be referred to as the "upward", "downward", "rightward" and "leftward" directions, respectively.

The picture element electrode 14 of the liquid crystal display device 100 includes a plurality of openings 14a and a solid portion 14b. Each opening 14a is a portion of the picture element electrode 14 formed from a conductive film (e.g., an ITO film) where the conductive film is removed, and the solid portion 14b is a portion thereof where the conductive film exists (the remaining portion other than the openings 14a). While a plurality of openings 14a are formed in each picture element electrode, the solid portion 14b is basically a single continuous portion of a conductive film.

The openings 14a are arranged so that the respective centers thereof form a square lattice as shown in FIG. 1A for example, and a portion 14b' of the solid portion 14b that is substantially surrounded by four openings 14a whose respective centers are located at the four lattice points that form one unit lattice is referred to as a "unit solid portion". The unit solid portion 14b' has a generally star shape having four vertices with a four-fold rotation axis at the center thereof (i.e., the shape has four-fold rotational symmetry). The openings 14*a* are each generally cross-shaped with a four-fold rotation axis at the center thereof, and have substantially the same shape and substantially the same size. Note that the solid-line peripheral square in FIG. 1A represents the region (the outer shape thereof) corresponding to a conventional picture element electrode formed from a single conductive layer.

When a voltage is applied between the picture element electrode 14 having such a structure as described above and the counter electrode 22, inclined electric fields are produced around (near the periphery of) the unit solid portions 14*b'*, i.e., at the edge portions of the openings 14*a*, thereby producing a plurality of liquid crystal domains each having a radially-inclined orientation. A liquid crystal domain is produced in each region corresponding to the opening 14*a* and in each region corresponding to the unit solid portion 14*b'*.

The outer shape of the picture element electrode 14 is defined so that the solid portion 14*b* includes portions other than the unit solid portions 14*b'* substantially surrounded by the openings 14*a* that have substantially the same size and substantially the same shape as those of the unit solid portions 14*b'*, and a liquid crystal domain is formed in each region corresponding to such a portion. For example, at the upper right hand portion of FIG. 1A, unit solid portion 14*b* is not surround on all sides by four cross-shaped openings 14*a*. In the present specification, these portions are also referred to as "unit solid portions". Thus, each portion of the solid portion 14*b* that produces an electric field forming one liquid crystal domain is referred to as a "unit solid portion".

Therefore, the solid portion 14*b* of the picture element electrode 14 includes a plurality of unit solid portions 14*b'*, more specifically, those substantially surrounded by the openings 14*a*, those substantially surrounded by an open region (a region around the picture element electrode 14 where a conductive film is not formed) 15 of the TFT substrate 100*a*, and those substantially surrounded by the open region 15 and the opening 14*a*.

These generally star-shaped unit solid portions 14*b'* have substantially the same shape and substantially the same size. In other words, the picture element electrode 14 includes a plurality of generally star-shaped conductive portions. Adjacent unit solid portions 14*b'* are connected to each other so that the unit solid portions 14*b'* together form the solid portion 14*b* functioning substantially as a single conductive film.

While each picture element region includes a plurality of openings 14*a* in the illustrated example, a plurality of liquid crystal domains can be formed in a picture element region by providing only one opening therein. For example, assuming that a square region made up of four unit regions each being delimited by a broken line in FIG. 1A is a picture element electrode, the picture element electrode includes only one opening 14*a* and four unit solid portions 14*b'* surrounding the opening 14*a*, but five liquid crystal domains each taking a radially-inclined orientation will be formed in the presence of an applied voltage.

Moreover, a plurality of liquid crystal domains can be formed in a picture element region without forming any opening 14*a*. For example, assuming that a rectangular region made up of two adjacent unit regions each being delimited by a broken line in FIG. 1A is a picture element electrode, the picture element electrode only includes two unit solid portions 14*b'* and no opening 14*a*, but two liquid crystal domains each taking a radially-inclined orientation will be formed in the presence of an applied voltage. Thus, as long as the picture element electrode includes unit solid portions such that a plurality of liquid crystal domains are formed each taking a radially-inclined orientation in the presence of an applied voltage (in other words, as long as the picture element electrode has such an outer shape), it is possible to obtain a sufficient degree of continuity in the orientation of the liquid crystal molecules in each picture element region, thereby realizing a stable radially-inclined orientation in each liquid crystal domain formed corresponding to the unit solid portion 14*b'*.

Figure 2A:
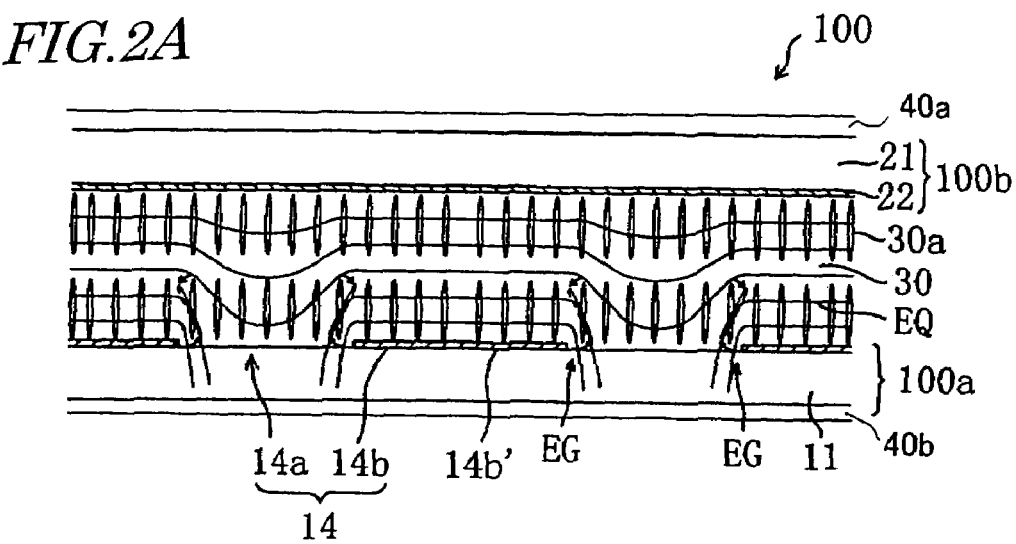
FIG. 2A and FIG. 2B illustrate a liquid crystal layer 30 of the liquid crystal display device 100 in the presence of an applied voltage thereacross, wherein FIG. 2A schematically illustrates a state where an orientation has just started to change (initial ON state), and FIG. 2B schematically illustrates a steady state.
Figure 2B:
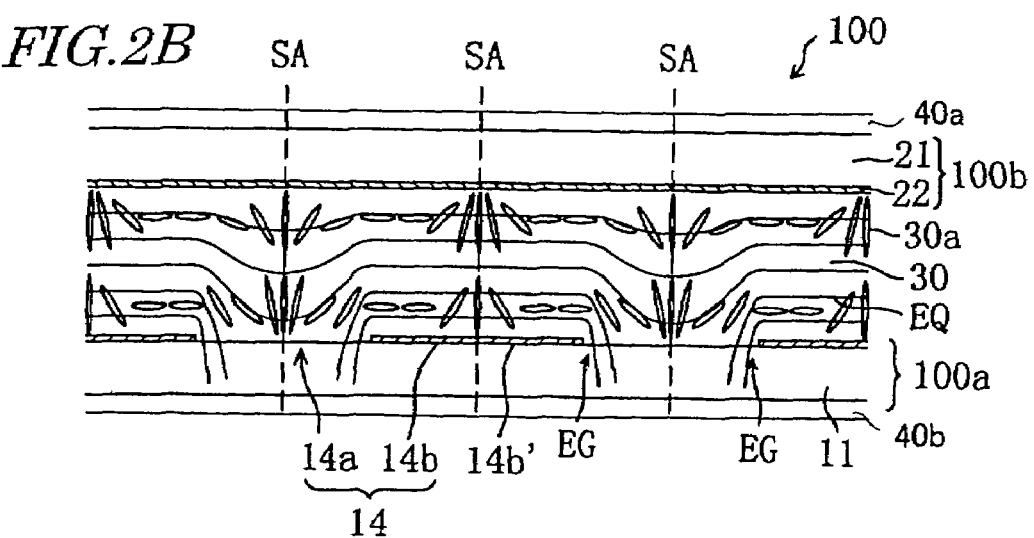

The mechanism by which liquid crystal domains are formed by an inclined electric field as described above will be described with reference to FIG. 2A and FIG. 2B. Each of FIG. 2A and FIG. 2B illustrates the liquid crystal layer 30 illustrated in FIG. 1B with a voltage being applied thereacross. FIG. 2A schematically illustrates a state where the orientation of the liquid crystal molecules 30*a* has just started to change (initial ON state) according to the voltage applied across the liquid crystal layer 30. In other words, FIG. 2A illustrates a voltage above the threshold voltage starting to be applied. FIG. 2B schematically illustrates a state where the orientation of the liquid crystal molecules 30*a* has changed and become steady according to the applied voltage. Curves EQ in FIG. 2A and FIG. 2B denote equipotential lines.

When the picture element electrode 14 and the counter electrode 22 are at the same potential (e.g., a state where no voltage, or a voltage below the threshold voltage, is applied across the liquid crystal layer 30), the liquid crystal molecules 30*a* in each picture element region are aligned substantially vertical to the surfaces of the substrates 11 and 21, as illustrated in FIG. 1B.

When a voltage is applied across the liquid crystal layer 30, a potential gradient represented by the equipotential lines EQ shown in FIG. 2A (perpendicular to the electric force line) is produced. The equipotential lines EQ are parallel to the surface of the solid portion 14*b* and the counter electrode 22 in the liquid crystal layer 30 located between the solid portion 14*b* of the picture element electrode 14 and the counter electrode 22, and drop in a region corresponding to the opening 14*a* of the picture element electrode 14. An inclined electric field represented by an inclined portion of the equipotential lines EQ is produced in the liquid crystal layer 30 above an edge portion EG of the opening 14*a* (the peripheral portion of and within the opening 14*a* including the boundary thereof).

A torque acts upon the liquid crystal molecules 30*a* having a negative dielectric anisotropy so as to direct the axial orientation of the liquid crystal molecules 30*a* to be parallel to the equipotential lines EQ (perpendicular to the electric force line). Therefore, the liquid crystal molecules 30*a* above the right edge portion EG in FIG. 2A incline (rotate) clockwise and the liquid crystal molecules 30*a* above the left edge portion EG incline (rotate) counterclockwise as indicated by arrows in FIG. 2A. As a result, the liquid crystal molecules 30*a* above the edge portions EG are oriented parallel to the corresponding portions of the equipotential lines EQ.

Referring to FIG. 3A to FIG. 3D, the change in the orientation of the liquid crystal molecules 30*a* will now be described in greater detail.

Figure 3A:
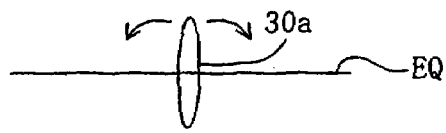

When an electric field is produced in the liquid crystal layer 30, a torque acts upon the liquid crystal molecules 30*a* having a negative dielectric anisotropy so as to direct the axial orientation thereof to be parallel or substantially parallel to an equipotential line EQ. As illustrated in FIG. 3A, when an electric field represented by an equipotential line EQ perpendicular to the axial orientation of the liquid crystal molecule 30a is produced, either a torque urging the liquid crystal molecule 30a to incline clockwise or a torque urging the liquid crystal molecule 30a to incline counterclockwise occurs with the same probability. Therefore, the liquid crystal layer 30 between the pair of parallel plate-shape electrodes opposing each other has some liquid crystal molecules 30a that are subject to a clockwise torque and some other liquid crystal molecules 30a that are subject to a counterclockwise torque. As a result, the transition to the intended orientation according to the voltage applied across the liquid crystal layer 30 may not proceed smoothly.

Figure 3B:
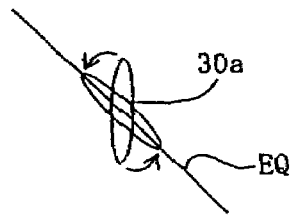
Figure 3C:
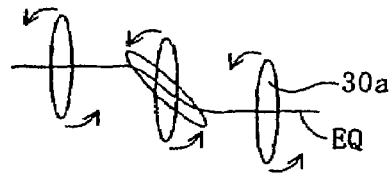
Figure 3D:
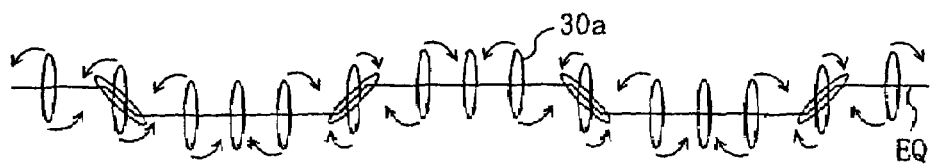

When an electric field represented by a portion of the equipotential lines EQ inclined with respect to the axial orientation of the liquid crystal molecules 30a (an inclined electric field) is produced at the edge portion EG of the open region 15 of the liquid crystal display device 100 of the present invention, as illustrated in FIG. 2A, the liquid crystal molecules 30a incline in whichever direction (the counterclockwise direction in the illustrated example) that requires less rotation for the liquid crystal molecules 30a to be parallel to the equipotential line EQ, as illustrated in FIG. 3B. The liquid crystal molecules 30a in a region where an electric field represented by an equipotential line EQ perpendicular to the axial orientation of the liquid crystal molecules 30a is produced incline in the same direction as the liquid crystal molecules 30a located on the inclined portion of the equipotential lines EQ so that the orientation thereof is continuous (in conformity) with the orientation of the liquid crystal molecules 30a located on the inclined portion of the equipotential lines EQ as illustrated in FIG. 3C. As illustrated in FIG. 3D, when an electric field such that the equipotential line EQ forms a continuous concave/convex pattern is applied, the liquid crystal molecules 30a located on a flat portion of the equipotential line EQ are oriented so as to conform with the orientation direction defined by the liquid crystal molecules 30a located on adjacent inclined portions of the equipotential line EQ. The phrase "being located on an equipotential line EQ" as used herein means "being located within an electric field that is represented by the equipotential line EQ".

The change in the orientation of the liquid crystal molecules 30a, starting from those that are located on the inclined portion of the equipotential lines EQ, proceeds as described above and reaches a steady state, which is schematically illustrated in FIG. 2B. The liquid crystal molecules 30a located around the central portion of the opening 14a are influenced substantially equally by the respective orientations of the liquid crystal molecules 30a at the opposing edge portions EG of the opening 14a, and therefore retain their orientation perpendicular to the equipotential lines EQ. The liquid crystal molecules 30a away from the center of the opening 14a incline by the influence of the orientation of other liquid crystal molecules 30a at the closer edge portion EG, thereby forming an inclined orientation that is symmetric about the center SA of the opening 14a. The orientation as viewed in a direction perpendicular to the display plane of the liquid crystal display device 100 (a direction perpendicular to the surfaces of the substrates 11 and 21) is a state where the liquid crystal molecules 30a have a radial axial orientation (not shown) about the center of the opening 14a. In the present specification, such an orientation will be referred to as a "radially-inclined orientation". Moreover, a region of the liquid crystal layer 30 that takes a radially-inclined orientation about a single center will be referred to as a "liquid crystal domain".

A liquid crystal domain in which the liquid crystal molecules 30a take a radially-inclined orientation is formed also in a region corresponding to the unit solid portion 14b' substantially surrounded by the openings 14a. The liquid crystal molecules 30a in a region corresponding to the unit solid portion 14b' are influenced by the orientation of the liquid crystal molecules 30a at each edge portion EG of the opening 14a so as to take a radially-inclined orientation that is symmetric about the center SA of the unit solid portion 14b' (corresponding to the center of a unit lattice formed by the openings 14a). Moreover, when a voltage is applied across the liquid crystal layer 30, an inclined electric field is produced at the edge portion of the open region 15, as at the edge portion EG of the opening 14a, whereby a liquid crystal domain in which the liquid crystal molecules 30a take a radially-inclined orientation is formed also in a region corresponding to the unit solid portion 14b' substantially surrounded by the open region 15 and in a region corresponding to the unit solid portion 14b' substantially surrounded by the open region 15 and the opening 14a.

The radially-inclined orientation in a liquid crystal domain formed in the unit solid portion 14b' and the radially-inclined orientation formed in the opening 14a are continuous with each other (no disclination line formed therebetween), and are both in conformity with the orientation of the liquid crystal molecules 30a at the edge portion EG of the opening 14a. The liquid crystal molecules 30a in the liquid crystal domain formed in the opening 14a are oriented in the shape of a cone that spreads upwardly (toward the substrate 100b), and the liquid crystal molecules 30a in the liquid crystal domain formed in the unit solid portion 14b' are oriented in the shape of a cone that spreads downwardly (toward the substrate 100a). As described above, the radially-inclined orientation in a liquid crystal domain formed in the opening 14a and that in a liquid crystal domain formed in the unit solid portion 14b' are continuous with each other. Therefore, no disclination line (orientation defect) is formed along the boundary therebetween, thereby preventing a decrease in the display quality due to occurrence of a disclination line.

In order to improve the viewing angle dependence, which is a display quality of a liquid crystal display device, in all azimuth angles, the existence probabilities of the liquid crystal molecules 30a oriented in various azimuth angle directions preferably have rotational symmetry in each picture element region. Therefore, it is preferred that all liquid crystal domains formed in the entire picture element region are rotationally symmetrically arranged. Note, however, that it is not necessary to attain the rotational symmetry in the entire picture element region but the liquid crystal layer of the picture element region is formed as a collection of liquid crystal domains rotationally symmetrically arranged (e.g., a plurality of liquid crystal domains arranged in a square lattice pattern). Therefore, all the plurality of openings 14a formed in the picture element region need not be necessarily rotationally symmetrically arranged in the entire picture element region as far as they are expressed as a collection of openings rotationally symmetrically arranged (for example, a plurality of openings disposed in the square lattice arrangement). This also applies to the arrangement of the unit solid portions 14b' substantially surrounded by a plurality of openings 14a. Moreover, since it is preferred that the shape of each liquid crystal domain has rotational symmetry, it is preferred that the shape of each opening 14a and the shape of each unit solid portion 14b' have rotational symmetry.

Note that a sufficient voltage may not be applied across the liquid crystal layer 30 around the central portion of the opening 14a, whereby the liquid crystal layer 30 around the central portion of the opening 14a does not contribute to the display. In other words, even if the radially-inclined orientation of the liquid crystal layer 30 around the central portion of the opening 14a is disturbed to some extent (e.g., even if the central axis is shifted from the center of the opening 14a), the display quality may not be decreased. Therefore, the advantages of the present embodiment can be obtained as long as each liquid crystal domain formed corresponding to the unit solid portion 14b' has rotational symmetry.

As described above with reference to FIG. 2A and FIG. 2B, the picture element electrode 14 of the liquid crystal display device 100 includes a plurality of openings 14a and produces, in the liquid crystal layer 30 in the picture element region, an electric field represented by equipotential lines EQ having inclined portions. The liquid crystal molecules 30a having a negative dielectric anisotropy in the liquid crystal layer 30, which are in a substantially vertical alignment in the absence of an applied voltage, change the orientation direction thereof, with the change in the orientation of those liquid crystal molecules 30a located on the inclined portion of the equipotential lines EQ serving as a trigger. Thus, a liquid crystal domain having a stable radially-inclined orientation is formed in the opening 14a and in the solid portion 14b. A display is produced by the change in the orientation of the liquid crystal molecules in the liquid crystal domain according to the voltage applied across the liquid crystal layer.

The shape (as viewed in the substrate normal direction) and arrangement of the openings 14a of the picture element electrode 14 of the liquid crystal display device 100 of the present embodiment will be described.

The display characteristics of a liquid crystal display device exhibit an azimuth angle dependence due to the orientation (optical anisotropy) of the liquid crystal molecules. In order to reduce the azimuth angle dependence of the display characteristics, it is preferred that the liquid crystal molecules are oriented in all azimuth angles with substantially the same probability. More preferably, the liquid crystal molecules in each picture element region are oriented in all azimuth angles with substantially the same probability (note that in the liquid crystal display device 100, the liquid crystal molecules 30a are not oriented in all azimuth angles with exactly the same probability, as will be described later). Therefore, the opening 14a preferably has a shape such that liquid crystal domains are formed so that the liquid crystal molecules 30a in each picture element region are oriented in all azimuth angles with substantially the same probability. More specifically, the shape of the opening 14a preferably has rotational symmetry (more preferably at least two-fold rotational symmetry) about a symmetry axis extending through the center of each opening 14a (in the normal direction), and it is preferred that a plurality of openings 14a are arranged in rotational symmetry. Moreover, the shape of the unit solid portion 14b' preferably has rotational symmetry, and it is preferred that the unit solid portions 14b' are arranged in rotational symmetry.

Note, however, that it is not necessary that all the openings 14a and the unit solid portions 14b' are rotationally symmetrically arranged across the entire picture element region, but the liquid crystal molecules can be oriented in all azimuth angles with substantially the same probability across each picture element region as long as the picture element region is made up of a collection of minimum units each being a square lattice (having symmetry with a four-fold rotation axis), for example, as illustrated in FIG. 1A.

The orientation of the liquid crystal molecules 30a when the generally cross-shaped openings 14a and the generally star-shaped unit solid portions 14b', both having rotational symmetry, are arranged in a square lattice pattern, as illustrated in FIG. 1A, will be described with reference to FIG. 4A to FIG. 4C.

Each of FIG. 4A to FIG. 4C schematically illustrates an orientation of the liquid crystal molecules 30a as viewed in the substrate normal direction. In figures, such as FIG. 4B and FIG. 4C, illustrating the orientation of the liquid crystal molecules 30a as viewed in the substrate normal direction, a black-spotted end of the liquid crystal molecule 30a drawn as an ellipse indicates that the liquid crystal molecule 30a is inclined so that the end is closer than the other end to the substrate on which the picture element electrode 14 having the openings 14a therein is provided. This similarly applies to all of the subsequent figures. A single unit lattice (formed by four openings 14a) in the picture element region illustrated in FIG. 1A will be described below. Cross-sectional views taken along the respective diagonals of FIG. 4A to FIG. 4C correspond to FIG. 1B, FIG. 2A and FIG. 2B, respectively, and FIG. 1B, FIG. 2A and FIG. 2B will also be referred to in the following description.

When the picture element electrode 14 and the counter electrode 22 are at the same potential, i.e., in a state where no voltage is applied across the liquid crystal layer 30, the liquid crystal molecules 30a whose orientation direction is regulated by the vertical alignment layer (not shown) provided on one side of each of the TFT substrate 100a and the counter substrate 100b that is closer to the liquid crystal layer 30 in a flat area take a vertical alignment as illustrated in FIG. 4A.

When an electric field is applied across the liquid crystal layer 30 so as to produce an electric field represented by equipotential lines EQ shown in FIG. 2A, a torque acts upon the liquid crystal molecules 30a having a negative dielectric anisotropy so as to direct the axial orientation thereof to be parallel to the equipotential lines EQ. As described above with reference to FIG. 3A and FIG. 3B, for the liquid crystal molecules 30a under an electric field represented by equipotential lines EQ perpendicular to the molecular axis thereof, the direction in which the liquid crystal molecules 30a are to incline (rotate) is not uniquely defined (FIG. 3A), whereby the orientation change (inclination or rotation) does not easily occur. In contrast, for the liquid crystal molecules 30a placed under equipotential lines EQ inclined with respect to the molecular axis of the liquid crystal molecules 30a, the direction of inclination (rotation) is uniquely defined, whereby the orientation change easily occurs. Therefore, as illustrated in FIG. 4B, the liquid crystal molecules 30a start inclining from the edge portion of the opening 14a where the molecular axis of the liquid crystal molecules 30a is inclined with respect to the equipotential lines EQ. Then, the surrounding liquid crystal molecules 30a incline so as to conform with the orientation of the already-inclined liquid crystal molecules 30a at the edge portion of the opening 14a, as described above with reference to FIG. 3C. Then, the axial orientation of the liquid crystal molecules 30a becomes stable as illustrated in FIG. 4C (radially-inclined orientation).

As described above, when the shape of the opening 14a has rotational symmetry, the liquid crystal molecules 30a in the picture element region successively incline, starting from the edge portion of the opening 14a toward the center of the opening 14a upon application of a voltage. As a result, there is obtained an orientation in which those liquid crystal molecules 30a around the center of the opening 14a, where the respective orientation-regulating forces from the liquid crystal molecules 30a at the edge portions are in equilibrium, remain in a vertical alignment with respect to the substrate plane, while the surrounding liquid crystal molecules 30a are inclined in a radial pattern about those liquid crystal molecules 30a around the center of the opening 14a, with the degree of inclination gradually increasing away from the center of the opening 14a.

The liquid crystal molecules 30a in a region corresponding to the generally star-shaped unit solid portion 14b' also incline so as to conform with the orientation of the liquid crystal molecules 30a that have been inclined by an inclined electric field produced at the edge portion of the opening 14a and/or the open region 15. As a result, there is obtained an orientation in which those liquid crystal molecules 30a around the center of the unit solid portion 14b', where the respective orientation-regulating forces from the liquid crystal molecules 30a at the edge portions are in equilibrium, remain in a vertical alignment with respect to the substrate plane, while the surrounding liquid crystal molecules 30a are inclined in a radial pattern about those liquid crystal molecules 30a around the center of the unit solid portion 14b', with the degree of inclination gradually increasing away from the center of the unit solid portion 14b'.

As described above, when liquid crystal domains in each of which the liquid crystal molecules 30a take a radially-inclined orientation are arranged in a square lattice pattern across the entire picture element region, the existence probabilities of the liquid crystal molecules 30a of the respective axial orientations have rotational symmetry, whereby it is possible to realize a high-quality display without non-uniformity for any viewing angle. In order to reduce the viewing angle dependence of a liquid crystal domain having a radially-inclined orientation, the liquid crystal domain preferably has a high degree of rotational symmetry (preferably with at least a two-fold rotation axis, and more preferably with at least a four-fold rotation axis). Moreover, in order to reduce the viewing angle dependence for a picture element region as a whole, the liquid crystal domains formed in the picture element region are in an arrangement (e.g., a square lattice arrangement) made up of units (e.g., unit lattices) each having a high degree of rotational symmetry (preferably with at least a two-fold rotation axis, and more preferably with at least a four-fold rotation axis).

As described above, with the liquid crystal display device 100, liquid crystal domains each taking a radially-inclined orientation are formed with a high stability and a high degree of continuity, thereby improving the viewing angle characteristic.

Furthermore, in the liquid crystal display device 100, each unit solid portion 14b' of the picture element electrode 14 has four acute angle corner portions 14c, pointing respectively in the upward, downward, leftward and rightward directions of the display plane, as illustrated in FIG. 1A.

If the unit solid portion 14b' has four acute angle corner portions 14c, the existence probability of the liquid crystal molecules 30a that are oriented in a particular azimuth angle direction can be increased (or decreased) while keeping a high degree of rotational symmetry for the existence probabilities of the liquid crystal molecules 30a oriented in various azimuth angle directions. For example, the existence probability of the liquid crystal molecules 30a that are oriented in a particular azimuth angle direction can be increased (or decreased) as compared to a case where the shape of the unit solid portion 14b' is a generally circular shape or a generally rectangular shape. In other words, a high directionality can be introduced in the existence probabilities of the liquid crystal molecules 30a oriented in various azimuth angle directions.

Specifically, since the four acute angle corner portions 14c are pointing respectively in the upward, downward, leftward and rightward directions of the display plane, the existence probabilities of the liquid crystal molecules 30a that are oriented parallel to these directions, i.e., those that are oriented parallel to the up-down direction (the 12–6 o'clock direction) or the left-right direction (the 3–9 o'clock direction) of the display plane, can be decreased relatively. Moreover, the existence probabilities of the liquid crystal molecules 30a that are oriented in a direction between these directions, i.e., the upper right-lower left direction (the 1:30–7:30 direction) or the lower right-upper left direction (the 4:30–10:30 direction) of the display plane, can be increased relatively.

Thus, a bright display can be realized in an arrangement where the transmission axis of one of the polarization plates 40a and 40b is parallel to the up-down direction of the display plane while the transmission axis of the other polarization plate is parallel to the left-right direction of the display plane. Since a high directionality is introduced in the existence probabilities of the liquid crystal molecules 30a as described above, it is possible to relatively decrease the existence probabilities of the liquid crystal molecules 30a that are oriented generally perpendicular or parallel to the transmission axis of the polarization plate on the light receiving side, i.e., the liquid crystal molecules 30a that give substantially no phase difference to the incident light, and it is possible to relatively increase the existence probabilities of the liquid crystal molecules 30a that are oriented generally parallel to a direction inclined by about 45° with respect to the transmission axis of the polarization plate on the light receiving side, i.e., the liquid crystal molecules 30a that give a substantial phase difference to the incident light.

Note that the four corner portions of a typical rectangular picture element electrode point respectively in the upper right direction, the lower right direction, the upper left direction and the lower left direction of the display plane. However, providing the four acute angle corner portions 14c pointing respectively in these directions of the display plane would rather result in a dark display in the transmission axis arrangement shown in FIG. 1A. In contrast, in the liquid crystal display device 100 of an example embodiment of the present invention, the four acute angle corner portions 14c point in respective directions that are inclined by about 45° with respect to these directions (the upper right direction, the lower right direction, the upper left direction and the lower left direction) of the display plane, whereby a bright display is produced in the transmission axis arrangement shown in FIG. 1A (the arrangement for suppressing the deterioration in the display quality from an inclined viewing angle).

FIG. 5 is a graph showing the light transmittance (the transmittance in a white display) with respect to the relationship between the direction of the transmission axis of a polarization plate and the direction in which the corner portion 14c is pointing. Note that the transmission axis angle as used in FIG. 5 is 0° when the direction in which the corner portion 14c is pointing is at 45° to the transmission axis of the polarization plate 40a, as illustrated in FIG. 6. The transmission axis angle takes a positive value as the transmission axis is rotated clockwise, and a negative value as it is rotated counterclockwise. Moreover, FIG. 5 shows the transmittance ratio with the maximum transmittance being 1, and FIG. 5 also shows, as a reference, the transmittance obtained when using a unit solid portion (shown by a broken line in FIG. 6) 1014*b*' having a barrel-like shape (a generally rectangular shape with generally arc-shaped corner portions).

As can be seen from FIG. 5, when the unit solid portion has a barrel-like shape, the maximum transmittance is obtained when the transmission axis angle is substantially 0°. Thus, a bright display is realized when the direction in which the corner portion is pointing is at 45° to the transmission axis.

In contrast, if each corner portion 14*c* has an acute angle as in the present embodiment, generally the highest transmittance can be obtained for transmission axis angles of approximately 45° and −45° (i.e., 45 degrees absolute value, plus minus about 15 degrees), and only a low transmittance can be obtained near the transmission axis angle of 0°. Thus, it can be seen that a bright display can be realized if the direction in which the corner portion 14*c* is pointing generally or approximately coincides with the transmission axis. Therefore, it can be seen that where the transmission axis of one of the pair of polarization plates is generally parallel to the up-down direction of the display plane and the transmission axis of the other polarization plate is generally parallel to the left-right direction, a high transmittance is obtained when the four acute angle corner portions 14*c* are pointing respectively in the upward, downward, leftward and rightward directions of the display plane (e.g., see FIG. 1A).

Note that the angle at which the transmittance is maximized is slightly shifted from 45° or −45° in FIG. 5. This is because in the liquid crystal display device whose transmittance is shown in FIG. 5, the radially-inclined orientation of the liquid crystal molecules 30*a* is not a simple radially-inclined orientation as illustrated in FIG. 7A, but is a radially-inclined orientation having a counterclockwise or clockwise spiral pattern as illustrated in FIG. 7B or FIG. 7C, respectively.

With a simple radially-inclined orientation as illustrated in FIG. 7A, the transmittance is generally maximized at the angle of 45° and −45°. A radially-inclined orientation having a counterclockwise or clockwise spiral pattern as illustrated in FIG. 7B or FIG. 7C, respectively, is more stable than the simple radially-inclined orientation as illustrated in FIG. 7A. The spiral orientation is different from a normal twist orientation in which the orientation direction of the liquid crystal molecules 30*a* spirally changes along the thickness of the liquid crystal layer 30. In the spiral orientation, the orientation direction of the liquid crystal molecules 30*a* does not substantially change along the thickness of the liquid crystal layer 30 for a minute region. In other words, the orientation in a cross section (in a plane parallel to the layer plane) at any thickness of the liquid crystal layer 30 is as illustrated in FIG. 7B or FIG. 7C, with substantially no twist deformation along the thickness of the liquid crystal layer 30. For a liquid crystal domain as a whole, however, there may be a certain degree of twist deformation.

When a material obtained by adding a chiral agent to a nematic liquid crystal material having a negative dielectric anisotropy is used, the liquid crystal molecules 30*a* take a radially-inclined orientation of a counterclockwise or clockwise spiral pattern about the opening 14*a* and the unit solid portion 14*b*', as illustrated in FIG. 7B or FIG. 7C, respectively, in the presence of an applied voltage. Whether the spiral pattern is counterclockwise or clockwise is determined by the type of chiral agent used. Thus, by controlling the liquid crystal layer 30 in the opening 14*a* into a radially-inclined orientation of a spiral pattern in the presence of an applied voltage, the direction of the spiral pattern of the radially-inclined liquid crystal molecules 30*a* about other liquid crystal molecules 30*a* standing vertical to the substrate plane can be constant in all liquid crystal domains, whereby it is possible to realize a uniform display without display non-uniformity. Since the direction of the spiral pattern around the liquid crystal molecules 30*a* standing vertical to the substrate plane is definite, the response speed upon application of a voltage across the liquid crystal layer 30 is also improved. Moreover, when a large amount of a chiral agent is added, there occurs a twist deformation along the thickness of the liquid crystal layer 30 in the presence of a sufficient voltage applied across the liquid crystal layer 30, whereby a cross-shaped extinction pattern observed in an intermediate gray level display disappears, thus improving the transmittance.

Moreover, in the liquid crystal display device 100 of an example embodiment of the present invention, each corner portion 14*c* of the unit solid portion 14*b*' is provided with an acute angle (i.e., less than 90 degrees), thereby improving the response characteristic. The reason for this will now be described.

When each corner portion 14*c* of the unit solid portion 14*b*' is provided with an acute angle, as illustrated in FIG. 8A, the total length of the sides of an electrode along which an inclined electric field is produced is increased, whereby the inclined electric field can be acted upon more liquid crystal molecules 30*a*, as compared with a case where a right-angle corner portion 1014*c*' is used, as illustrated in FIG. 8B. Thus, the number of liquid crystal molecules 30*a* that initially start inclining in response to an electric field is increased in FIG. 8A when an acute angle is provided, thereby reducing the amount of time required for a radially-inclined orientation to be formed entirely across the picture element region. As a result, the response speed is improved.

Moreover, when each corner portion 14*c* is provided with an acute angle, the distance from an electrode side to the liquid crystal molecule 30*a* within the unit solid portion 14*b*' can be shortened, whereby it is possible to more efficiently regulate the orientation of the liquid crystal molecules 30*a* within the unit solid portion 14*b*'. This also leads to a desirable response characteristic. For example, if the unit solid portion has a rectangular shape, the liquid crystal molecules near the diagonal line between opposing corner portions are farther away from an electrode side. Therefore, those liquid crystal molecules are less influenced by the inclined electric field produced near the edge portion, and are slower to respond to the inclined electric field. In contrast, if each corner portion 14*c* of the unit solid portion 14*b*' is provided with an acute angle, the distance from an electrode side and the liquid crystal molecules 30*a* near the diagonal line is shortened, whereby the response of the liquid crystal molecules 30*a* near the diagonal line is improved, thus increasing the response speed.

Note that while the unit solid portion 14*b*' having the four acute angle corner portions 14*c* is made up substantially only of straight lines in the illustrated example, the shape of the unit solid portion 14*b*' is not limited thereto. As illustrated in FIG. 9A and FIG. 9B, the unit solid portion 14*b*' may alternatively include a curved line, and an "acute angle corner portion" as used herein refers not only to a corner portion where two straight lines make an angle less than 90° therebetween, but also to a corner portion where a curved line and a straight line, or two curved lines, make an angle less than 90° therebetween (i.e., the angle between the tangential lines of the two lines at the vicinity of the intersection thereof is less than 90°). Moreover, the corner portion 14c of the unit solid portion 14b' may alternatively have no vertex, as illustrated in FIG. 9C.

Moreover, the position of the branch portion (connection electrode) electrically connecting adjacent unit solid portions 14b' to each other in a given electrode is not limited to the position illustrated in FIG. 1A. In the example illustrated in FIG. 1A, the branch portion is provided to connect together inwardly-depressed portions of two unit solid portions 14b' opposing each other. Alternatively, adjacent unit solid portions 14b' may be connected together via their corner portions 14c, as illustrated in FIG. 10. In such a case, the opening 14a has a generally rhombus shape. Moreover, when the unit solid portions 14b' as illustrated in FIG. 9B are connected together via their corner portions 14c, the shape of the opening will generally be a circular digon (an almond-like shape) made up of two arcs (typically minor arcs).

The liquid crystal display device 100 as described above may employ the same arrangement as a vertical alignment layer inclusive type liquid crystal display device known in the art, and may be produced by a known production method, except that the picture element electrode 14 includes a plurality of unit solid portions 14b'.

Typically, a vertical alignment layer (not shown) is provided on one side of each of the picture element electrode 14 and the counter electrode 22 that is closer to the liquid crystal layer 30 so as to vertically align the liquid crystal molecules having a negative dielectric anisotropy relative to the vertical alignment layer. The liquid crystal material may be a nematic liquid crystal material having a negative dielectric anisotropy.

Embodiment 2

A liquid crystal display device 200 according to Embodiment 2 will now be described with reference to FIG. 11. In the liquid crystal display device 100 illustrated in FIG. 1, the solid portion 14b is made up only of the unit solid portions 14b'. In contrast, the solid portion 14b of the liquid crystal display device 200 in FIG. 11 includes sub-unit solid portions 14d along the periphery of the picture element region, each sub-unit solid portion 14d having substantially the same shape as a portion of the unit solid portion 14b' except that a portion thereof is cut off or missing. Note that FIG. 11 also shows a scanning line 2 and a signal line 4 electrically connected to a switching element for switching the picture element electrode 14 ON and OFF (the switching element is not labeled, but is located in the bottom left corner of FIG. 11).

As illustrated in FIG. 11, in the liquid crystal display device 200, the solid portion 14b of the picture element electrode 14 includes, in addition to the unit solid portions 14b', sub-unit solid portions 14d1 each having a shape generally corresponding to one half of the unit solid portion 14b', and sub-unit solid portions 14d2 each having a shape generally corresponding to one quarter of the unit solid portion 14b'. The sub-unit solid portions 14d1 are provided along the sides of the picture element region, and the sub-unit solid portions 14d2 are provided at the corners of the picture element region.

When a voltage is applied across the liquid crystal layer 30, an inclined electric field is produced also around each sub-unit solid portion 14d, and a liquid crystal domain is formed by the inclined electric field in a region corresponding to the sub-unit solid portion 14d. Therefore, in the liquid crystal display device 200, a stable orientation can be obtained entirely across the picture element region.

Moreover, in the liquid crystal display device 200, the sub-unit solid portions 14d are arranged along the periphery of the picture element region, whereby it is possible to increase the area ratio of the solid portion 14b in the picture element region. Therefore, it is possible to increase the area (as viewed in the substrate normal direction) of the liquid crystal layer 30 that is directly influenced by the electric field produced by the picture element electrode 14, thereby improving the effective aperture ratio (transmittance). Thus, a brighter display is realized.

Typically, a picture element region has a rectangular shape made up of two sides parallel to the up-down direction of the display plane and two sides parallel to the left-right direction of the display plane. Therefore, in a case where the four acute angle corner portions 14c are pointing respectively in the upward, downward, leftward and rightward directions of the display plane, if the solid portion 14b is made up only of the unit solid portions 14b', the unit solid portions 14b' cannot be arranged near the periphery of the picture element region at a density equal to that in the central portion of the picture element region, whereby it is difficult to form liquid crystal domains corresponding to the solid portion 14b at a high density near the periphery of the picture element region.

In contrast, if the sub-unit solid portions 14d are arranged along the periphery of the picture element region as illustrated in FIG. 11, it is possible to form liquid crystal domains corresponding to the solid portion 14b at a high density near the periphery of the picture element region, whereby it is possible to stabilize the orientation entirely across the picture element region and to realize a brighter display.

In order to reduce the viewing angle dependence of the display quality, it is preferred that the liquid crystal domains are rotationally symmetrically arranged entirely across the picture element region, and that the liquid crystal domains formed near the periphery of the picture element region are rotationally symmetrically arranged together with the liquid crystal domains formed in the central portion of the picture element region. Thus, it is preferred that the sub-unit solid portions 14d are rotationally symmetrically arranged together with at least one of the unit solid portions 14b' (e.g., the sub-unit solid portions 14d form at least one unit lattice in a complementary manner together with at least one of the unit solid portions 14b').

For the same purpose, it is preferred that the sub-unit solid portions 14d in each picture element region together form an integral multiple of the shape of the unit solid portion 14b'. With the liquid crystal display device 200, each picture element region includes thirteen sub-unit solid portions 14d1 each having a shape generally corresponding to one half of the unit solid portion 14b' and two sub-unit solid portions 14d2 each having a shape generally corresponding to one quarter of the unit solid portion 14b'. These sub-unit solid portions 14d together account for seven whole unit solid portions 14b'. Thus, a desirable viewing angle characteristic is obtained. Needless to say, the picture element region shown in FIG. 11 is repeated across the display screen as will be appreciated by those skilled in the art.

Of course, the pattern of a picture element electrode capable of providing effects as described above by arranging the sub-unit solid portions 14d along the periphery of the picture element region is not limited to the pattern of the picture element electrode 14 as illustrated in FIG. 11. For example, with the pattern illustrated in FIG. 10, similar effects can be obtained by arranging the sub-unit solid portions 14d along the periphery of the picture element region, as illustrated in FIG. 12.

Each of FIG. 13A and FIG. 13B is a polarizing microscope image showing the orientation of a picture element region in a case where the picture element electrode 14 illustrated in FIG. 12 is used. FIG. 13A is a polarizing microscope image in a white display (in the presence of an applied voltage of 6.2 V), and FIG. 13B is a polarizing microscope image in an intermediate gray level display (in the presence of an applied voltage of 3.0 V). Note that the transmission axes of the polarization plates extend respectively in the up-down direction and the left-right direction of the display plane (hereinafter, the transmission axis arrangement will be referred to also as a "+-shaped arrangement").

As can be seen from FIG. 13A and FIG. 13B, liquid crystal domains are formed not only in regions corresponding to the unit solid portions 14b' but also in regions corresponding to the sub-unit solid portions 14d along the periphery of the picture element region.

For the purpose of comparison, each of FIG. 14A and FIG. 14B shows a polarizing microscope image in a case where the picture element electrode 14 illustrated in FIG. 12 is used and where the transmission axes of the polarization plates extend respectively in the upper right-lower left direction and the upper left-lower right direction (hereinafter, the transmission axis arrangement will be referred to also as an "X-shaped arrangement").

As can be seen by comparing FIG. 13A and FIG. 13B with FIG. 14A and FIG. 14B, the "+-shaped arrangement" results in a brighter display than the "X-shaped arrangement" in a case where the four acute angle corner portions 14c are pointing respectively in the upward, downward, leftward and rightward directions of the display plane.

Each of FIG. 16A, FIG. 16B, FIG. 17A and FIG. 17B shows a polarizing microscope image when using a picture element electrode 1014 of a comparative example where the four acute angle corner portions are pointing respectively in the upper right, lower right, lower left and upper left directions of the display plane as illustrated in FIG. 15. FIG. 16A and FIG. 16B are polarizing microscope images where the transmission axes of the polarization plates are arranged in the "+-shaped arrangement", and FIG. 17A and FIG. 17B are polarizing microscope images where the transmission axes of the polarization plates are arranged in the "X-shaped arrangement".

As can be seen by comparing FIG. 16A and FIG. 16B with FIG. 17A and FIG. 17B, the "+-shaped arrangement" results in a darker display than the "X-shaped arrangement" when using the picture element electrode 1014 of the comparative example where the four corner portions are pointing respectively in the upper right, lower right, lower left and upper left directions of the display plane.

Embodiment 3

As described above in Embodiment 2, the display characteristics can be improved by arranging the sub-unit solid portions 14d along the periphery of the picture element region. However, since the sub-unit solid portion 14d has a shape corresponding to a portion of the unit solid portion 14b', a liquid crystal domain formed corresponding to the sub-unit solid portion 14d may not have an orientation as stable as that of a liquid crystal domain formed corresponding to the unit solid portion 14b'.

The orientation stability of a liquid crystal domain formed by the sub-unit solid portion 14d can be improved by providing an orientation-regulating structure in a region of the counter substrate corresponding to the sub-unit solid portion 14d.

FIG. 18 schematically illustrates a liquid crystal display device 300 of the present embodiment including an orientation-regulating structure 28 on the counter substrate (i.e., structure 28 is on the substrate opposite the substrate including the pixel electrode 14). As illustrated in FIG. 18, the counter substrate of the liquid crystal display device 300 includes the orientation-regulating structure 28 in each region corresponding to the unit solid portion 14b' of the picture element electrode 14 and in each region corresponding to the sub-unit solid portion 14d.

Each of FIG. 19A to FIG. 19D schematically illustrates a counter substrate 300b including an orientation-regulating structure 28. The orientation-regulating structures 28 illustrated in FIG. 19A to FIG. 19D exert an orientation-regulating force for orienting the liquid crystal molecules 30a of the liquid crystal layer 30 into a radially-inclined orientation at least in the presence of an applied voltage between the picture element electrode 14 and the counter electrode 22. The direction of orientation regulation by the orientation-regulating structure 28 is aligned with the direction of orientation regulation by an inclined electric field produced around the unit solid portion 14b' or the sub-unit solid portion 14d.

Figure 19A:
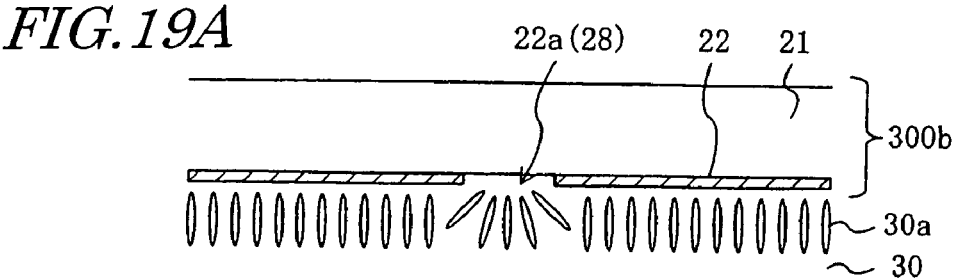

The orientation-regulating structure 28 illustrated in FIG. 19A is formed by an opening 22a defined in the counter electrode 22. A vertical alignment film (not shown) is provided on the surface of the counter substrate 300b that is closer to the liquid crystal layer 30, over the counter electrode 22 so that the vertical alignment film is between the electrode 22 and the liquid crystal layer.

The orientation-regulating structure 28 exerts an orientation-regulating force only in the presence of an applied voltage in this example embodiment. Since the orientation-regulating structure 28 is only required to exert an orientation-regulating force upon the liquid crystal molecules in each liquid crystal domain formed by the solid portion 14b of the picture element electrode 14, the size of the opening 22a is smaller than the opening 14a provided in the corresponding picture element electrode 14, and smaller than the unit solid portion 14b' (see, for example, FIG. 1A). For example, a sufficient effect can be obtained only with an area less than or equal to one half of that of the opening 14a or the unit solid portion 14b'. When the opening 22a of the counter electrode 22 is provided so as to oppose the central portion of the unit solid portion 14b' of the picture element electrode 14, the continuity of the orientation of the liquid crystal molecules increases, and it is possible to fix the position of the central axis of the radially-inclined orientation.

As described above, when a structure exerting an orientation-regulating force only in the presence of an applied voltage is employed as the orientation-regulating structure, substantially all of the liquid crystal molecules 30a of the liquid crystal layer 30 take a vertical alignment (relative to the vertical alignment film) in the absence of an applied voltage. Therefore, when employing a normally black mode, substantially no light leakage occurs in a black display, thereby realizing a display with a desirable contrast ratio.

However, in the absence of an applied voltage, the orientation-regulating force is not exerted and thus the radially-inclined orientation is not formed. Moreover, when the applied voltage is low, there is only a weak orientation-regulating force, whereby an after image may be observed when a considerable stress is applied upon the liquid crystal panel.

Figure 19B:
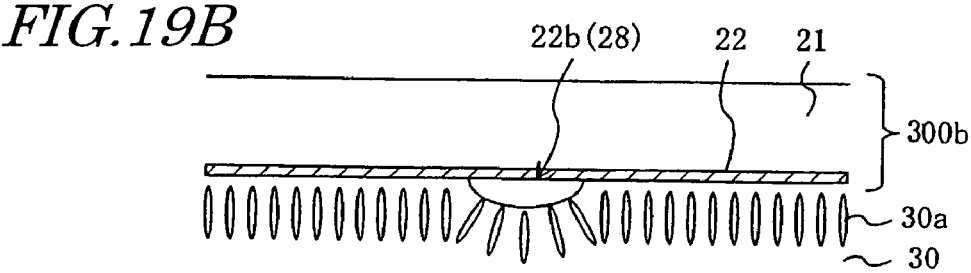
Figure 19C:
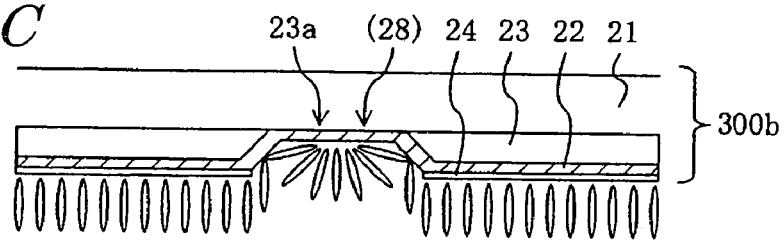
Figure 19D:
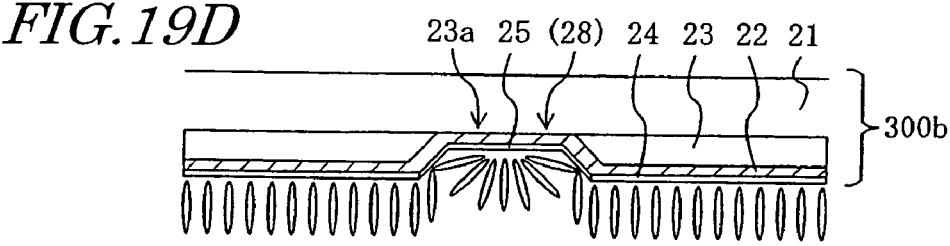

Each of the orientation-regulating structures 28 illustrated in FIG. 19B to FIG. 19D exerts an orientation-regulating force regardless of the presence/absence of an applied voltage, whereby it is possible to obtain a stable radially-inclined orientation at any display gray level, and there is provided a high resistance to a stress.

First, the orientation-regulating structure 28 illustrated in FIG. 19B includes a protrusion 22b that is provided on the counter electrode 22 so as to protrude into or toward the liquid crystal layer 30. While there is no particular limitation on the material of the protrusion 22b, the protrusion 22b can be easily provided by using a dielectric material such as a resin. A vertical alignment film (not shown) is provided on one surface of the counter substrate 300b that is closer to the liquid crystal layer 30, so that the vertical alignment film is formed over the protrusion and is located between the protrusion 22b and the liquid crystal layer. The protrusion 22b orients the liquid crystal molecules 30a into a radially-inclined orientation by virtue of the configuration of the surface thereof (with a vertical alignment power). It is preferred to use a resin material that deforms by heat, in which case it is possible to easily form the protrusion 22b having a slightly-humped cross section as illustrated in FIG. 19B through a heat treatment after patterning. The protrusion 22b having a slightly-humped cross section with a vertex (e.g., a portion of a sphere) as illustrated in the figure or a conical protrusion provides a desirable effect of fixing the central position of the radially-inclined orientation.

The orientation-regulating structure 28 illustrated in FIG. 19C is provided as a surface having a horizontal alignment power facing the liquid crystal layer 30 that is provided in an opening (or a depressed portion) 23a defined in a dielectric layer 23 formed under the counter electrode 22 (i.e., on one side of the counter electrode 22 that is closer to the substrate 21). A vertical alignment film 24 is provided so as to cover one side of the counter substrate 300b that is closer to the liquid crystal layer 30 while leaving a region corresponding to the opening 23a uncovered, whereby the surface in the opening 23a functions as a horizontal alignment surface. Alternatively, a horizontal alignment film 25 may be provided only in the opening 23a as illustrated in FIG. 19D.

The horizontal alignment film illustrated in FIG. 19D can be provided by, for example, once providing the vertical alignment film 24 across the entire surface of the counter substrate 300b, and then selectively irradiating a portion of the vertical alignment film 24 in the opening 23a with UV light so as to reduce or remove the vertical alignment power thereof. The horizontal orientation power required for the orientation-regulating structure 28 does not have to be so high that the resulting pretilt angle is as small as that resulting from an alignment film used in a TN type liquid crystal display device. For example, a pretilt angle of 45° or less is sufficient in the bottom of opening 23a in FIG. 19D.

As illustrated in FIG. 19C and FIG. 19D, on the horizontal orientation surface in the opening 23a, the liquid crystal molecules 30a are urged to be horizontal with respect to the substrate plane. As a result, the liquid crystal molecules 30a form an orientation that is continuous with the orientation of the surrounding, vertically aligned liquid crystal molecules 30a on the vertical alignment film 24, thereby obtaining a radially-inclined orientation as illustrated in the figure.

A radially-inclined orientation can be obtained by selectively providing a horizontal orientation surface (e.g., the surface of the electrode, or a horizontal alignment film) on the flat surface of the counter electrode 22 without providing a depressed portion (that is formed by the opening in the dielectric layer 23) on the surface of the counter electrode 22. However, the radially-inclined orientation can be further stabilized by virtue of the surface configuration of the depressed portion.

It is preferred to use a color filter layer or an overcoat layer of a color filter layer as the dielectric layer 23, for example, to form the depressed portion in the surface of the counter substrate 300b that is closer to the liquid crystal layer 30, because it adds substantially nothing to the process. In the structures illustrated in FIG. 19C and FIG. 19D, there is little decrease in light efficiency because there is no region where a voltage is applied across the liquid crystal layer 30 via the protrusion 22b as in the structure illustrated in FIG. 19A.

FIG. 20A is a cross-sectional view illustrating the liquid crystal display device 300 having the orientation-regulating structure 28 as described above. FIG. 20A is a cross-sectional view taken along line 20A–20A' of FIG. 18.

The liquid crystal display device 300 includes the TFT substrate 100a having the picture element electrode 14 including the solid portion 14b, and the counter substrate 300b having the orientation-regulating structure 28. While a structure that exerts an orientation-regulating force even in the absence of an applied voltage (FIG. 19B to FIG. 19D) will be used as the orientation-regulating structure 28, the orientation-regulating structure 28 illustrated in FIG. 19A may alternatively be used. While FIG. 20A illustrates the orientation-regulating structure 28 provided in a region corresponding to the unit solid portion 14b', the same description applies to the orientation-regulating structure 28 provided in a region corresponding to the sub-unit solid portion 14d.

The orientation-regulating structure 28 provided on the counter substrate 300b is provided in a region corresponding to the unit solid portion 14b' of the picture element electrode 14 and in a region corresponding to the sub-unit solid portion 14d.

With such an arrangement, in the presence of an applied voltage across the liquid crystal layer 30, i.e., in the presence of an applied voltage between the picture element electrode 14 and the counter electrode 22, the direction of orientation regulation by an inclined electric field produced around the unit solid portion 14b' is aligned with the direction of orientation regulation by the orientation-regulating force exerted by the orientation-regulating structure 28, thereby stabilizing the radially-inclined orientation. This is schematically shown in FIG. 20A to FIG. 20C. FIG. 20A illustrates a state in the absence of an applied voltage, FIG. 20B illustrates a state where the orientation has just started to change (initial ON state) after application of a voltage, and FIG. 20C schematically illustrates a steady state during the voltage application.

As illustrated in FIG. 20A, the orientation-regulating force exerted by the orientation-regulating structure (FIG. 19B to FIG. 19D) acts upon the liquid crystal molecules 30a in the vicinity thereof even in the absence of an applied voltage, thereby forming a radially-inclined orientation.

When voltage application begins, an electric field represented by equipotential lines EQ shown in FIG. 20B is produced (by the solid portion 14b), and a liquid crystal domain in which the liquid crystal molecules 30a are in a radially-inclined orientation is formed in each region corresponding to the opening 14a and each region corresponding to the unit solid portion 14b', and the liquid crystal layer 30 reaches a steady state as illustrated in FIG. 20C. The inclination direction of the liquid crystal molecules 30a in each liquid crystal domain coincides with the direction in which the liquid crystal molecules 30a are inclined by the orientation-regulating force exerted by the orientation-regulating structure 28 that is provided in a corresponding region.

As described above, the radially-inclined orientation formed by the picture element electrode 14 can be made more stable by providing the orientation-regulating structure 28 on the counter substrate 300b. While an arrangement where the orientation-regulating structure 28 is provided not only in a region corresponding to the sub-unit solid portion 14d but also in a region corresponding to the unit solid portion 14b' has been described above, the orientation-regulating structure 28 in a region corresponding to the unit solid portion 14b' may alternatively be omitted. A sufficiently stable orientation can be realized by providing the orientation-regulating structure 28 at least in a region corresponding to the sub-unit solid portion 14d in certain instances. While the orientation-regulating structure 28 corresponding to the unit solid portion 14b' is preferably provided around the central portion of the region corresponding to the unit solid portion 14b', the orientation-regulating structure 28 corresponding to the sub-unit solid portion 14d does not need to be entirely included within the region corresponding to the sub-unit solid portion 14d. The orientation of the liquid crystal domain formed corresponding to the sub-unit solid portion 14d can be stabilized as long as a portion (e.g., about one half or about one quarter) of the orientation-regulating structure 28 is included within the region corresponding to the sub-unit solid portion 14d, as illustrated in FIG. 18.

Moreover, by providing the orientation-regulating structure 28 also in a region corresponding to the unit solid portion 14b', it is possible to realize an even more stable orientation and to suppress the deterioration in the display quality due to the application of a stress upon the liquid crystal cell.

When a stress is applied upon the liquid crystal display device 300 in a steady state, the radially-inclined orientation of the liquid crystal layer 30 once collapses, but upon removal of the stress, the radially-inclined orientation is restored because of the orientation-regulating forces from the picture element electrode 14 and the orientation-regulating structure 28 acting upon the liquid crystal molecules 30a. Therefore, the occurrence of an after image due to a stress is suppressed. When the orientation-regulating force from the orientation-regulating structure 28 is excessively strong, retardation occurs even in the absence of an applied voltage due to the radially-inclined orientation, whereby the display contrast ratio may decrease. However, the orientation-regulating force from the orientation-regulating structure 28 does not have to be strong because it is only required to have an effect of stabilizing a radially-inclined orientation formed by the picture element electrode 14 and fixing the central axis position thereof. Therefore, an orientation-regulating force that would not cause such a degree of retardation as to deteriorate the display quality is sufficient.

For example, when the protrusion 22b illustrated in FIG. 19B is employed, each protrusion 22b may have a diameter of about 15 μm and a height (thickness) of about 1 μm for the unit solid portion 14b' having a diameter of about 30 μm to about 35 μm, thereby obtaining a sufficient orientation-regulating force and suppressing the reduction in the contrast ratio due to retardation to a practical level.

Note that the shape of the picture element electrode 14 that can be used in combination with the orientation-regulating structure 28 is not limited to those illustrated in FIG. 11 and FIG. 12, but may alternatively be those illustrated in FIG. 9 and FIG. 10, or any other suitable shape.

Embodiment 4

A liquid crystal display device 400 according to Embodiment 4 will now be described with reference to FIG. 21. FIG. 21 is a plan view schematically illustrating four adjacent picture element regions in the liquid crystal display device 400.

The picture element electrodes 14 for each corresponding picture element region of the liquid crystal display device 400, are substantially equivalent to the picture element electrode 14 of Embodiment 1, which includes the openings 14a and the solid portion 14b (including the unit solid portions 14b'), and the outer shape thereof is defined so that an inclined electric field is produced around the unit solid portion 14b' in the presence of an applied voltage to form a liquid crystal domain taking a radially-inclined orientation. Thus, a wide viewing angle characteristic is realized. Note that the branch portion (connection electrode) for connecting together adjacent unit solid portions 14b' in the same picture element region is not shown in FIG. 21 for purposes of simplicity. The unit solid portion 14b' includes four acute angle corner portions 14c pointing respectively in the upward, downward, leftward and rightward directions of the display plane, whereby it is possible to produce a bright display.

Moreover, as illustrated in FIG. 21, the liquid crystal display device 400 includes the scanning lines 2 and the signal lines 4 provided on the TFT substrate. Each scanning line 2 supplies scanning signals to a TFT (not shown) as a switching element. The signal lines 4, crossing the scanning lines 2, supply display signals to the TFTs. Each TFT is electrically connected to a corresponding picture element electrode 14, and each corresponding picture element electrode 14 is switched ON and OFF by the TFT.

In a typical liquid crystal display device, the scanning lines and the signal lines are each formed in a straight line pattern in the up-down direction or the left-right direction of the display plane. In contrast, in the liquid crystal display device 400, each of the scanning lines 2 and the signal lines 4 extends while being bent a plurality of times in each picture element region so that any segment thereof is inclined with respect to the up-down direction and the left-right direction of the display plane. In other words, each of the scanning lines 2 and the signal lines 4 extends in a zigzag pattern (or a triangular wave pattern).

In the present embodiment, each segment of each of the scanning line 2 and the signal line 4 is inclined by from about 30 to 60 degrees (more preferably about 45°) with respect to the up-down direction and the left-right direction of the display plane. While the unit solid portions 14b' are arranged along the periphery of the picture element region at a predetermined pitch P in the up-down direction and the left-right direction of the display plane, a given scanning line 2 includes a plurality of bent portions 2a arranged in the left-right direction of the display plane at about one half of the pitch P (i.e., P/2), and the signal line 4 includes a plurality of bent portions 4a arranged in the up-down direction of the display plane at about one half of the pitch P (P/2).

As described above, in the liquid crystal display device 400, each of the scanning line 2 and the signal line 4 provided on the TFT substrate 100a extends while being bent a plurality of times so that any segment thereof adjacent to a picture element electrode 14 is inclined with respect to the up-down direction and the left-right direction of the display plane, whereby the unit solid portions 14b' with the corner portions 14c thereof pointing in the upward, downward, leftward and rightward directions of the display plane can be arranged near the periphery of the picture element region at a density generally equal to that in the central portion of the picture element region. Therefore, in the presence of an applied voltage, liquid crystal domains corresponding to the solid portion 14b can be formed near the periphery of the picture element region at a density generally equal to that in the central portion of the picture element region, thereby obtaining a stable orientation entirely across the picture element region. Moreover, since the unit solid portions 14b' can be arranged near the periphery of the picture element region at a density generally equal to that in the central portion of the picture element region, it is possible to increase the area ratio of the solid portion 14b in the picture element region. Therefore, it is possible to increase the area (as viewed in the substrate normal direction) of the liquid crystal layer 30 that is directly influenced by the electric field produced by the picture element electrode 14, thereby improving the effective aperture ratio (transmittance). Thus, a brighter display is realized.

In order to efficiently utilize the picture element region, i.e., to efficiently arrange the unit solid portions 14b' near the periphery of the picture element region, it is preferred that each of the scanning line 2 and the signal line 4 extends closely parallel to the outer periphery of the picture element electrode 14, which is defined by some of the unit solid portions 14b' that are present along the periphery of the picture element region.

In the present embodiment where the unit solid portions 14b' along the periphery of the picture element region are arranged in the up-down direction and in the left-right direction of the display plane each at a predetermined pitch (the pitch P in either direction in the present embodiment), the scanning line 2 includes the bent portions 2a arranged in the left-right direction of the display plane at about one half of the pitch P (i.e., P/2), and the signal line 4 includes the bent portions 4a arranged in the up-down direction of the display plane at about one half of the pitch P (P/2), whereby each of the scanning line 2 and the signal line 4 extends closely parallel to the outer periphery of the picture element electrode 14. Needless to say, the scanning lines 2 and signal lines 4 illustrated in FIG. 21 are repeated across the display as will be appreciated by those skilled in the art. Moreover, the terminal portions of the scanning and/or signal lines may or may not be in a zigzag shape in different embodiments of this invention, since the terminal portions may be outside of the image displaying area of the device.

With a 13-inch VGA panel, for example, the size of each picture element region is about 136 µm×414 µm, and a stable radially-inclined orientation can be obtained if the unit solid portions 14b' are arranged at a pitch of about 20 µm to about 80 µm. Accordingly, the bent portions 2a and 4a of the scanning line 2 and the signal line 4 can be arranged at about one half of the pitch, i.e., a pitch of about 10 µm to about 40 µm.

Note that while each segment of each of the scanning line 2 and the signal line 4 is inclined by about 45° with respect to the up-down direction and the left-right direction of the display plane in the present embodiment, the inclination angle is not limited thereto. The outer periphery of the picture element electrode 14 is substantially defined by some of the unit solid portions 14b' that are present along the periphery of the picture element region. Therefore, the inclination angle can be determined according to the shape of the unit solid portions 14b' so that each of the scanning line 2 and the signal line 4 extends closely parallel to the outer periphery of the picture element electrode 14. In a case where the shape of the unit solid portion 14b' is a generally star shape having four-fold rotational symmetry as in the present embodiment, the unit solid portions 14b' can suitably be arranged near the periphery of the picture element region if the inclination angle is about 45°.

While certain example embodiments of the present invention have been described with respect to cases where TFTs are used as switching elements, the present invention is not limited to a liquid crystal display device using three-terminal active elements as the switching elements, but may suitably be used with a liquid crystal display device using two-terminal active elements such as MIM elements. In a case where two-terminal active elements such as MIM elements are used, one of the scanning line and the signal line is provided on the active matrix substrate and the other may be provided on a substrate opposing the active matrix substrate (the counter substrate). Therefore, functions and effects similar to those described above can be obtained by bending the line(s) provided on the active matrix substrate as described above.

In order to increase the aperture ratio and thus the brightness, a black matrix may also be bent in a manner similar to that for the scanning line 2 and the signal line 4, and the periphery of the color filter(s) may also extend closely parallel to the outer periphery of the picture element electrode 14. Note, however, that these arrangements may not be necessary in the present invention. Alternatively, a black matrix having a stripe pattern (or a lattice pattern) may be provided so as to overlap with a portion (e.g., an outer half) of the unit solid portion 14b' along the periphery of the picture element region. Also with such an arrangement, the unit solid portions 14b' can be arranged near the periphery of the picture element region at a density equal to that in the central portion of the picture element region, whereby the orientation of the liquid crystal molecules can be stabilized entirely across the picture element region.

The liquid crystal display device 400 as described above may employ the same arrangement as a liquid crystal display device known in the art, and may be produced by a known production method, except that the picture element electrode 14 includes a plurality of unit solid portions 14b' and that the scanning line 2 and the signal line 4 are bent.

Embodiment 5

A liquid crystal display device 500 according to Embodiment 5 will now be described with reference to FIG. 22. The liquid crystal display device 500 illustrated in FIG. 22 is different from the liquid crystal display device 400 in that the orientation-regulating structure 28 is provided on the counter substrate.

The counter substrate of the liquid crystal display device 500 includes the orientation-regulating structure 28 in each region corresponding to the unit solid portion 14b' of the picture element electrode 14, as illustrated in FIG. 22, whereby the orientation stability can be improved. The structure of the orientation-regulating structure 28 is substantially the same as that described above with reference to FIG. 19, and thus will not be further described below.

FIG. 23A is a cross-sectional view illustrating the liquid crystal display device 500 including the orientation-regulating structure 28. FIG. 23A is a cross-sectional view taken along line 23A1–23A1' or line 23A2–23A2' of FIG. 22.

The liquid crystal display device 500 includes a TFT substrate having the picture element electrode 14 including the solid portion 14b, and the counter substrate 500b having the orientation-regulating structure 28. While a structure that exerts an orientation-regulating force even in the absence of an applied voltage (FIG. 19B to FIG. 19D) will be used as the orientation-regulating structure 28, the orientation-regulating structure 28 illustrated in FIG. 19A may alternatively be used.

The orientation-regulating structure 28 on the counter substrate 500b is provided in a region corresponding to the unit solid portion 14b' of the picture element electrode 14, more specifically in a region corresponding to a central portion of the unit solid portion 14b'. With such an arrangement, in the presence of an applied voltage across the liquid crystal layer 30, i.e., in the presence of an applied voltage between the picture element electrode 14 and the counter electrode 22, the direction of orientation regulation by an inclined electric field produced around the unit solid portion 14b' is aligned with the direction of orientation regulation by the orientation-regulating force exerted by the orientation-regulating structure 28, thereby stabilizing the radially-inclined orientation. This is schematically shown in FIG. 23A to FIG. 23C. FIG. 23A illustrates a state in the absence of an applied voltage, FIG. 23B illustrates a state where the orientation has just started to change (initial ON state) after application of a voltage, and FIG. 23C schematically illustrates a steady state during the voltage application.

Thus, by providing the orientation-regulating structure 28 on the counter substrate 500b, it is possible to make the radially-inclined orientation formed by the picture element electrode 14 more stable and to suppress the deterioration in the display quality due to the application of a stress upon the liquid crystal cell, etc.

Embodiment 6

With the electrode structures described above where openings are provided in the picture element electrodes, a sufficient voltage may not be applied across the liquid crystal layer in regions corresponding to the openings and a sufficient retardation change may not be obtained, thereby decreasing the light efficiency. In view of this, a dielectric layer may be provided on one side of the electrode with openings (an upper electrode) that is away from the liquid crystal layer, with an additional electrode (a lower electrode) being provided so as to at least partially oppose the openings of the upper electrode via the dielectric layer therebetween (i.e., a two-layer electrode may be employed), whereby it is possible to apply a sufficient voltage across the liquid crystal layer in regions corresponding to the openings, thereby improving the light efficiency and the response characteristic.

FIG. 24A to FIG. 24C are cross-sectional views schematically illustrating one picture element region of a liquid crystal display device 600 having a picture element electrode 16 (a two-layer electrode) including a lower electrode 12, an upper electrode 14, and a dielectric layer 13 provided therebetween. The upper electrode 14 of the picture element electrode 16 is substantially equivalent to the picture element electrode 14 described above, and includes openings and a solid portion of any of various shapes and arrangements described above. Moreover, the scanning line and/or the signal line of the liquid crystal display device 600 may extend while being bent a plurality of times so that any segment thereof adjacent a picture element electrode in the display region of the device is inclined with respect to the up-down direction and the left-right direction of the display plane, as does the scanning line 2 or the signal line 4 of Embodiment 4. The function of the picture element electrode 16 having a two-layer structure will now be described.

The picture element electrode 16 of the liquid crystal display device 600 includes a plurality of openings 14a (including openings 14a1 and 14a2). FIG. 24A schematically illustrates an orientation of the liquid crystal molecules 30a in the liquid crystal layer 30 in the absence of an applied voltage (OFF state). FIG. 24B schematically illustrates a state where the orientation of the liquid crystal molecules 30a has just started to change (initial ON state) according to the voltage applied across the liquid crystal layer 30. FIG. 24C schematically illustrates a state where the orientation of the liquid crystal molecules 30a has changed and become steady according to the applied voltage. In FIG. 24A to FIG. 24C, the lower electrode 12, which is provided so as to oppose the openings 14a1 and 14a2 via the dielectric layer 13, overlaps both of the openings 14a1 and 14a2 and also extends in a region between the openings 14a1 and 14a2 (a region where the upper electrode 14 exists). However, the arrangement of the lower electrode 12 is not limited to this, but the arrangement may alternatively be such that the area of the lower electrode 12=the area of the opening 14a, or the area of the lower electrode 12<the area of the opening 14a, for each of the openings 14a1 and 14a2. Thus, the structure of the lower electrode 12 is not limited to any particular structure as long as the lower electrode 12 opposes at least a portion of the opening 14a via the dielectric layer 13. However, when the lower electrode 12 is provided within the opening 14a, there is a region (gap region) in which neither the lower electrode 12 nor the upper electrode 14 is present in a plane as viewed in the direction normal to the substrate 11. A sufficient voltage may not be applied across the liquid crystal layer 30 in the region opposing the gap region. Therefore, in order to stabilize the orientation of the liquid crystal layer 30, it is preferred that the width of the gap region is sufficiently reduced. Typically, it is preferred that the width of the gap region does not exceed about 4 $\mu$m. Moreover, the lower electrode 12 that is provided at a position such that it opposes the region where the conductive layer of the upper electrode 14 exists via the dielectric layer 13 has substantially no influence on the electric field applied across the liquid crystal layer 30. Therefore, such a lower electrode 12 may or may not be patterned. Accordingly, it will be appreciated that the lower electrode 12 of this embodiment may be added to any of the aforesaid embodiments of this invention below the picture element electrode 14 via dielectric 13.

As illustrated in FIG. 24A, when the picture element electrode 16 and the counter electrode 22 are at the same potential (a state where no voltage is applied across the liquid crystal layer 30), the liquid crystal molecules 30a in the picture element region are aligned substantially vertical to the surfaces of the substrates 11 and 21. It is assumed that the upper electrode 14 and the lower electrode 12 of the picture element electrode 16 are at the same potential for the sake of simplicity, although this embodiment is not so limited.

When a voltage is applied across the liquid crystal layer 30, a potential gradient represented by equipotential lines EQ shown in FIG. 24B is produced. A uniform potential gradient represented by equipotential lines EQ parallel to the surfaces of the upper electrode 14 and the counter electrode 22 is produced in the liquid crystal layer 30 in a region between the upper electrode 14 of the picture element electrode 16 and the counter electrode 22. A potential gradient according to the potential difference between the lower electrode 12 and the counter electrode 22 is produced in regions of the liquid crystal layer 30 located above the openings 14a1 and 14a2 of the upper electrode 14. The potential gradient produced in the liquid crystal layer 30 is influenced by a voltage drop due to the dielectric layer 13, whereby the equipotential lines EQ in the liquid crystal layer 30 drop in regions corresponding to the openings 14a1 and 14a2 (creating a plurality of "troughs" in the equipotential lines EQ). Since the lower electrode 12 is provided in a region opposing the openings 14a1 and 14a2 via the dielectric layer 13, the liquid crystal layer 30 around the respective central portions of the openings 14a1 and 14a2 also has a potential gradient that is represented by a portion of the equipotential lines EQ parallel to the plane of the upper electrode 14 and the counter electrode 22 ("the bottom of the trough" of the equipotential lines EQ). An inclined electric field represented by an inclined portion of the equipotential lines EQ is produced in the liquid crystal layer 30 above an edge portion EG of each of the openings 14a1 and 14a2 (the peripheral portion of and within the opening including the boundary thereof).

As is clear from a comparison between FIG. 24B and FIG. 2A, since the liquid crystal display device 600 has the lower electrode 12, a sufficient electric field can act also upon the liquid crystal molecules in the liquid crystal domain formed in a region corresponding to the opening 14a.

A torque acts upon the liquid crystal molecules 30a having a negative dielectric anisotropy so as to direct the axial orientation of the liquid crystal molecules 30a to be parallel to the equipotential lines EQ. Therefore, the liquid crystal molecules 30a above the right edge portion EG in FIG. 24B incline (rotate) clockwise and the liquid crystal molecules 30a above the left edge portion EG incline (rotate) counterclockwise as indicated by arrows in FIG. 24B. As a result, the liquid crystal molecules 30a above the edge portions EG are oriented parallel to the corresponding portions of the equipotential lines EQ.

When an electric field represented by a portion of the equipotential lines EQ inclined with respect to the axial orientation of the liquid crystal molecules 30a (an inclined electric field) is produced at the edge portions EG of the openings 14a1 and 14a2 of the liquid crystal display device 600, as illustrated in FIG. 24B, the liquid crystal molecules 30a incline in whichever direction (the counterclockwise direction in the illustrated example) that requires less rotation for the liquid crystal molecules 30a to be parallel to the equipotential line EQ, as illustrated in FIG. 3B. The liquid crystal molecules 30a in a region where an electric field represented by an equipotential line EQ perpendicular to the axial orientation of the liquid crystal molecules 30a is produced incline in the same direction as the liquid crystal molecules 30a located on the inclined portion of the equipotential lines EQ so that the orientation thereof is continuous (in conformity) with the orientation of the liquid crystal molecules 30a located on the inclined portion of the equipotential lines EQ as illustrated in FIG. 3C.

The change in the orientation of the liquid crystal molecules 30a, starting from those that are located on the inclined portion of the equipotential lines EQ, proceeds as described above and reaches a steady state, i.e., an inclined orientation (radially-inclined orientation) that is symmetric about the center SA of each of the openings 14a1 and 14a2, as schematically illustrated in FIG. 24C. The liquid crystal molecules 30a in a region of the upper electrode 14 located between the two adjacent openings 14a1 and 14a2 also take an inclined orientation so that the orientation thereof is continuous (in conformity) with the orientation of the liquid crystal molecules 30a at the edge portions of the openings 14a1 and 14a2. The liquid crystal molecules 30a in the middle between the edge of the opening 14a1 and the edge of the opening 14a2 are subject to substantially the same influence from the liquid crystal molecules 30a at the respective edge portions, and thus remain in a substantially vertical alignment as the liquid crystal molecules 30a located around the central portion of each of the openings 14a1 and 14a2. As a result, the liquid crystal layer above the upper electrode 14 between the adjacent two openings 14a1 and 14a2 also takes a radially-inclined orientation. Note that the inclination direction of the liquid crystal molecules differs between the radially-inclined orientation of the liquid crystal layer in each of the openings 14a1 and 14a2 and that of the liquid crystal layer between the openings 14a1 and 14a2. Observation of the orientation around the liquid crystal molecule 30a at the center of each region having the radially-inclined orientation illustrated in FIG. 24C shows that the liquid crystal molecules 30a in the regions of the openings 14a1 and 14a2 are inclined so as to form a cone that spreads toward the counter electrode, whereas the liquid crystal molecules 30a in the region between the openings are inclined so as to form a cone that spreads toward the upper electrode 14. Since both of these radially-inclined orientations are formed so as to conform with the inclined orientation of the liquid crystal molecules 30a at an edge portion, the two radially-inclined orientations are continuous with each other (i.e., no disclination line therebetween).

As described above, when a voltage is applied across the liquid crystal layer 30, the liquid crystal molecules 30a incline, starting from those above the respective edge portions EG of the openings 14a1 and 14a2 provided in the upper electrode 14. Then, the liquid crystal molecules 30a in the surrounding regions incline so as to conform with the inclined orientation of the liquid crystal molecules 30a above the edge portion EG. Thus, a radially-inclined orientation is formed. Therefore, as the number of openings 14a to be provided in each picture element region increases, the number of liquid crystal molecules 30a that initially start inclining in response to an applied electric field also increases, thereby reducing the amount of time that is required to achieve the radially-inclined orientation across the entire picture element region. Thus, by increasing the number of openings 14a to be provided in the picture element electrode 16 for each picture element region, it is possible to improve the response speed of a liquid crystal display device. Moreover, by employing a two-layer electrode including the upper electrode 14 and the lower electrode 12 as the picture element electrode 16, a sufficient electric field can act also upon the liquid crystal molecules in a region corresponding to the opening 14a, thereby improving the response characteristic of the liquid crystal display device.

The dielectric layer 13 provided between the upper electrode 14 and the lower electrode 12 of the picture element electrode 16 may include an opening (aperture) or a depressed portion in the opening 14a of the upper electrode 14. In other words, in the two-layer picture element electrode 16, the whole of a region of the dielectric layer 13 located in the opening 14a of the upper electrode 14 may be removed (thereby forming an opening therein) or a portion of such a region may be removed (thereby forming a depressed portion).

First, the structure and operation of a liquid crystal display device 700 having such a picture element electrode 16 which includes an opening in the dielectric layer 13 will be described with reference to FIG. 25A to FIG. 25C. A single opening 14a provided in the upper electrode 14 will be described below for the sake of simplicity, although the illustrated pattern may be repeated across the display screen as will be appreciated by those skilled in the art.

In the liquid crystal display device 700, the upper electrode 14 of the picture element electrode 16 includes the opening 14a, and the dielectric layer 13 provided between the lower electrode 12 and the upper electrode 14 includes an opening 13a formed so as to substantially correspond to the opening 14a of the upper electrode 14, with the lower electrode 12 being at least partially exposed through the opening 13a. The side wall of the opening 13a of the dielectric layer 13 is typically tapered. The liquid crystal display device 700 has substantially the same structure as that of the liquid crystal display device 600 except that the dielectric layer 13 includes the opening 13a, and the two-layer picture element electrode 16 functions in substantially the same manner as the picture element electrode 16 of the liquid crystal display device 600, to form a liquid crystal domain in the liquid crystal layer 30 that takes a radially-inclined orientation in the presence of an applied voltage.

The operation of the liquid crystal display device 700 will be described with reference to FIG. 25A to FIG. 25C. FIG. 25A to FIG. 25C respectively correspond to FIG. 24A to FIG. 24C illustrating the liquid crystal display device 600.

As illustrated in FIG. 25A, the liquid crystal molecules 30a in each picture element region are aligned substantially vertical to the surfaces of the substrates 11 and 21 in the absence of an applied voltage (OFF state). In the following description, the orientation-regulating force from the side wall of the opening 13a will be ignored for the sake of simplicity.

When a voltage is applied across the liquid crystal layer 30, a potential gradient represented by equipotential lines EQ shown in FIG. 25B is produced. As can be seen from the drop of the equipotential lines EQ (creating a "trough" therein) in a region corresponding to the opening 14a of the upper electrode 14, an inclined electric field is produced in the liquid crystal layer 30 of the liquid crystal display device 700 as in the potential gradient illustrated in FIG. 24B. However, since the dielectric layer 13 of the picture element electrode 16 includes the opening 13a in a region corresponding to the opening 14a of the upper electrode 14, the voltage applied across the region of the liquid crystal layer 30 corresponding to the opening 14a (the opening 13a) is exactly the potential difference between the lower electrode 12 and the counter electrode 22, and the voltage drop (capacitance division) due to the dielectric layer 13 does not occur. In other words, all of the seven equipotential lines EQ drawn in FIG. 25B between the upper electrode 14 and the counter electrode 22 stay between the upper electrode 14 and the counter electrode 22 across the entire liquid crystal layer 30 (as opposed to FIG. 24B where one of the five equipotential lines EQ is drawn into the dielectric layer 13), thereby applying a constant voltage across the entire picture element region.

Thus, by providing the opening 13a in the dielectric layer 13, it is possible to apply substantially the same voltage across the region of the liquid crystal layer 30 corresponding to the opening 13a as that applied across the other regions of the liquid crystal layer 30. However, the thickness of the liquid crystal layer 30, across which a voltage is applied, varies depending upon the location in each picture element region, whereby the change in retardation in the presence of an applied voltage also varies depending upon the location. If the degree of variation is significant, the display quality may deteriorate.

In the structure illustrated in FIG. 25A to FIG. 25C, the thickness d1 of the liquid crystal layer 30 on the upper electrode (the solid portion excluding the opening 14a) 14 and the thickness d2 of the liquid crystal layer 30 on the lower electrode 12 exposed through the opening 14a (and the opening 13a) differ from each other by the thickness of the dielectric layer 13. When the portion of the liquid crystal layer 30 having the thickness d1 and the other portion of the liquid crystal layer 30 having the thickness d2 are driven with the same voltage range, the amount of retardation change caused by the orientation change in the liquid crystal layer 30 varies therebetween by the influence of the difference in thickness between the respective portions of the liquid crystal layer 30. When the relationship between the applied voltage and the amount of retardation of the liquid crystal layer 30 considerably varies depending upon the location, the following problem arises. That is, in a design where the display quality is given a higher priority, the transmittance is sacrificed, and when the transmittance is given a higher priority, the color temperature of the white display shifts, thereby sacrificing the display quality. Therefore, when the liquid crystal display device 700 is used as a transmission type liquid crystal display device, the thickness of the dielectric layer 13 is preferably small.

FIG. 26 is a cross-sectional view illustrating a structure of one picture element region of a liquid crystal display device 800 in which the dielectric layer of the picture element electrode includes a depressed portion.

The dielectric layer 13 of the picture element electrode 16 of the liquid crystal display device 800 includes a depressed portion 13b corresponding to the opening 14a of the upper electrode 14. Other than this, the structure of the liquid crystal display device 800 is substantially the same as that of the liquid crystal display device 700 illustrated in FIG. 25A to FIG. 25C.

In the liquid crystal display device 800, a portion of the dielectric layer 13 located in the opening 14a of the upper electrode 14 of the picture element electrode 16 is not completely removed, whereby the thickness d3 of a portion of the liquid crystal layer 30 located in the opening 14a is smaller than the thickness d2 of the corresponding portion of the liquid crystal layer 30 located in the opening 14a of the liquid crystal display device 700 by the thickness of the dielectric layer 13 in the depressed portion 13b. Moreover, the voltage applied across the region of the liquid crystal layer 30 in the opening 14a is subject to the voltage drop (capacitance division) due to the dielectric layer 13 in the depressed portion 13b, and thus is lower than the voltage applied across the region of the liquid crystal layer 30 on the upper electrode (the region thereof excluding the opening 14a) 14. Therefore, by adjusting the thickness of the dielectric layer 13 in the depressed portion 13b, it is possible to control the relationship between the variations in retardation amount due to the difference in thickness of the liquid crystal layer 30 and the variations in the applied voltage across the liquid crystal layer 30 depending upon the location (the amount of decrease in the voltage applied across the liquid crystal layer in the opening 14a), so as to ensure that the relationship between the applied voltage and the retardation does not depend upon the location in the picture element region. More strictly, the relationship between the applied voltage and the retardation can be controlled to be uniform across the picture element region, thereby realizing a high-quality display, by adjusting the birefringence of the liquid crystal layer, the thickness of the liquid crystal layer, the dielectric constant and the thickness of the dielectric layer, and the thickness (or depth) of the depressed portion of the dielectric layer. Particularly, as compared to a transmission type liquid crystal display device having a flat-surface dielectric layer, there is an advantage that the decrease in transmittance due to a decrease in the voltage applied across the region of the liquid crystal layer 30 corresponding to the opening 14a of the upper electrode 14 (the decrease in the light efficiency) is suppressed.

In the above description, the same voltage is applied to the upper electrode 14 and the lower electrode 12 of the picture element electrode 16. When different voltages are applied to the lower electrode 12 and the upper electrode 14, it is possible to increase the variety of structures of liquid crystal display devices capable of displaying an image without display non-uniformity. For example, in the structure where the dielectric layer 13 is provided in the opening 14a of the upper electrode 14, a voltage higher than the voltage applied to the upper electrode 14 is applied to the lower electrode 12, whereby it is possible to prevent the voltage applied across the liquid crystal layer 30 from varying depending upon the location in the picture element region. Note, however, that if electric fields of the same strength are produced in the liquid crystal layer above the upper electrode 14 and in the liquid crystal layer above the dielectric layer 13 on the lower electrode 12 due to the application of a voltage that is increased by the voltage drop due to the dielectric layer 13, an inclined electric field is not produced at the edge portion of the upper electrode 14, and an appropriate alignment control cannot be provided. Thus, the strength of the electric field acting upon the liquid crystal layer above the upper electrode 14 needs to be greater than that of the electric field acting upon the liquid crystal layer above the dielectric layer 13 on the lower electrode 12 in certain example embodiments of this invention.

The liquid crystal display device having the picture element electrode 16 of the two-layer structure may be a transmission-reflection type liquid crystal display device (see, for example, Japanese Laid-Open Patent Publication No. 11-101992) as well as a transmission or reflection type liquid crystal display device.

A transmission-reflection type liquid crystal display device (hereinafter, referred to simply as a "two-way liquid crystal display device") refers to a liquid crystal display device that includes, in each picture element region, a transmission region T displaying an image in a transmission mode and a reflection region R displaying an image in a reflection mode (see FIG. 24A). Typically, the transmission region T and the reflection region R are defined respectively by a transparent electrode and a reflection electrode. The reflection region can be defined by a structure using a combination of a reflection layer and a transparent electrode instead of the reflection electrode.

In the two-way liquid crystal display device, an image can be displayed in either the reflection mode or the transmission mode which can be switched from one to another, or an image can be displayed in both display modes at the same time. Therefore, for example, the reflection mode display can be used under an environment with bright ambient light, and the transmission mode display can be used under a dark environment. When both of these display modes are used at the same time, it is possible to suppress the decrease in the contrast ratio which is observed when a transmission mode liquid crystal display device is used under an environment with bright ambient light (a state where light from a fluorescent lamp or sun light is directly incident upon the display plane at a certain angle). Thus, the two-way liquid crystal display device can compensate for the drawback of a transmission type liquid crystal display device. The ratio between the area of the transmission region T and that of the reflection region R can be suitably determined according to the application of the liquid crystal display device. For a liquid crystal display device that is used exclusively as a transmission type display device, the area ratio of the reflection region can be reduced to such a degree that an image cannot be displayed in a reflection mode, and it is still possible to compensate for the drawback of a transmission type liquid crystal display device described above.

A two-way liquid crystal display device can be obtained by, for example, employing a reflection electrode and a transparent electrode as the upper electrode 14 and the lower electrode 12, respectively, of the liquid crystal display device 600 as illustrated in FIG. 24A. For example, for a two-way type display (i.e., transflective), electrode 14 in FIG. 24 could be of a reflective material such as aluminum, and electrode 12 of a transparent material such as ITO (whereas both 12 and 14 may be transparent in a transmissive display). The two-way liquid crystal display device is not limited to this example, but may alternatively be obtained by employing a transparent conductive layer as either one of the upper electrode 14 and the lower electrode 12 of the liquid crystal display device while employing a reflection conductive layer as the other. Note that in order for the voltage-transmittance characteristics of a display in the reflection mode and those of a display in the transmission mode to conform with each other, it is preferred that the thickness of the liquid crystal layer 30 in the reflection region R (e.g., d1 in FIG. 25A) is about one half of the thickness of the liquid crystal layer 30 in the transmission region T (e.g., d2 in FIG. 25A). Of course, the voltage to be applied to the upper electrode 14 and the voltage to be applied to the lower electrode 12 may be adjusted, instead of adjusting the thickness of the liquid crystal layer.

As described above, certain example embodiments of the present invention provide a liquid crystal display device having a wide viewing angle characteristic and desirable display characteristics.

According to a first example aspect of the present invention, a liquid crystal domain taking a radially-inclined orientation can be formed stably with a high degree of continuity, thereby further improving the display quality of a conventional liquid crystal display device having a wide viewing angle characteristic.

Moreover, in each picture element region, each of a plurality of unit solid portions (conductive portions) has four acute angle corner portions, whereby a high directionality can be introduced in the existence probabilities of the liquid crystal molecules, and thus a bright display can be realized. The four acute angle corner portions are pointing respectively in the upward, downward, leftward and rightward directions of the display plane, whereby it is possible to realize a bright display while employing a polarization plate arrangement with which there is only a little deterioration in the black display quality from an inclined viewing angle. Furthermore, since the four corner portions are acute angle corner portions, the response characteristic is also improved.

According to an example second aspect of the present invention, at least one of the scanning line(s) and the signal line(s) that is provided on a substrate on which the picture element electrode is provided extends while being bent a plurality of times so that any segment thereof proximate a picture element electrode in a display area of the device is inclined with respect to the up-down direction and the left-right direction of the display plane, whereby it is possible to obtain a stable orientation entirely across the picture element region and to improve the effective aperture ratio (transmittance).

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

This application is based on Japanese Patent Application Nos. 2003-139156 filed on May 16, 2003, and 2003-139157 filed on May 16, 2003, the entire contents of which are herein incorporated by reference. The entire contents of U.S. patent application Ser. No. 09/923,344 filed on Aug. 8, 2001, and Ser. No. 09/983,665 filed on Oct. 25, 2001, are also herein incorporated by reference.

What is claimed is:

1. A liquid crystal display device, comprising:
a first substrate;
a second substrate; and
a liquid crystal layer provided between the first substrate and the second substrate, wherein:
a picture element region is defined by a first electrode provided on one side of the first substrate that is closer to the liquid crystal layer and a second electrode provided on the second substrate so as to oppose the first electrode via the liquid crystal layer therebetween;
the first electrode includes, in the picture element region, a solid portion including a plurality of unit solid portions, whereby the liquid crystal layer takes a substantially vertical alignment in the absence of an applied voltage between the first electrode and the second electrode, and forms a liquid crystal domain taking a radially-inclined orientation in a region corresponding to each of the plurality of unit solid portions of the first electrode by an inclined electric field produced around the unit solid portion in response to a voltage applied between the first electrode and the second electrode; and
each of the plurality of unit solid portions includes four acute angle corner portions that are pointing respectively in upward, downward, leftward and rightward directions of a display plane.

2. The liquid crystal display device according to claim 1, further comprising a pair of polarization plates opposing each other via the liquid crystal layer therebetween, wherein a transmission axis of one of the pair of polarization plates is generally parallel to an up-down direction of the display plane, and a transmission axis of the other one of the pair of polarization plates is generally parallel to a left-right direction of the display plane.

3. The liquid crystal display device according to claim 1, wherein a shape of each of the plurality of unit solid portions has rotational symmetry.

4. The liquid crystal display device according to claim 1, wherein a shape of each of a plurality of the unit solid portions is a generally star shape having four-fold rotational symmetry.

5. The liquid crystal display device according to claim 1, wherein a plurality of unit solid portions have substantially the same shape and substantially the same size, and form at least one unit lattice having rotational symmetry.

6. The liquid crystal display device according to claim 1, wherein:
the solid portion of the first electrode further includes a plurality of sub-unit solid portions each having substantially the same shape as a portion of the unit solid portion except that a portion of the unit solid portions is not present in the sub-unit solid portions; and
the plurality of sub-unit solid portions are arranged along at least part of a periphery of each of a plurality of picture element regions.

7. The liquid crystal display device according to claim 6, wherein the plurality of sub-unit solid portions include at least one first sub-unit solid portion having a shape generally corresponding to one half of the unit solid portion.

8. The liquid crystal display device according to claim 6, wherein the plurality of sub-unit solid portions include at least one second sub-unit solid portion having a shape generally corresponding to one quarter of the unit solid portion.

9. The liquid crystal display device according to claim 6, wherein the plurality of sub-unit solid portions form at least one unit lattice having rotational symmetry in a complementary manner together with at least one of the plurality of unit solid portions.

10. The liquid crystal display device according to claim 6, wherein the plurality of sub-unit solid portions together form an integral multiple of the shape of the unit solid portion.

11. The liquid crystal display device according to claim 6, wherein:
the second substrate includes, in a region corresponding to each of a plurality of the sub-unit solid portions, an orientation-regulating structure that exerts an orientation-regulating force upon liquid crystal molecules of the liquid crystal layer at least in the presence of an applied voltage between the first electrode and the second electrode; and
a direction of orientation regulation by the orientation-regulating structure is aligned with a direction of orientation regulation by an inclined electric field produced around at lest some of the plurality of sub-unit solid portions.

12. The liquid crystal display device according to claim 11, wherein the orientation-regulating structure exerts an orientation-regulating force even in the absence of an applied voltage between the first electrode and the second electrode.

13. The liquid crystal display device according to claim 11, wherein the orientation-regulating structure comprises a protrusion protruding from the second substrate toward the liquid crystal layer.

14. The liquid crystal display device according to claim 1, wherein the first electrode further includes at least one opening, and the liquid crystal layer forms a liquid crystal domain taking a radially-inclined orientation also in a region corresponding to the at least one opening by the inclined electric field in response to a voltage applied between the first electrode and the second electrode.

15. The liquid crystal display device according to claim 14, wherein the at least one opening includes a plurality of openings having substantially the same shape and substantially the same size, and at least one of the plurality of openings forms at least one unit lattice having rotational symmetry.

16. The liquid crystal display device according to claim 15, wherein a shape of each of the at least one of the plurality of openings has rotational symmetry.

17. The liquid crystal display device according to claim 1, wherein:
the first substrate further includes a switching element provided corresponding to each of the plurality of picture element regions; and
the first electrode is a picture element electrode provided for each of the plurality of picture element regions and switched ON and OFF by a corresponding switching element, and the second electrode is at least one counter electrode opposing a plurality of the picture element electrodes.

18. A liquid crystal display device, comprising:
a first substrate;
a second substrate; and
a liquid crystal layer provided between the first substrate and the second substrate, wherein:
a picture element region defined by a first electrode provided on one side of the first substrate that is closer to the liquid crystal layer and a second electrode provided on the second substrate so as to oppose the first electrode via the liquid crystal layer therebetween;
the liquid crystal layer takes a substantially vertical alignment in the absence of an applied voltage between the first electrode and the second electrode;
the first electrode includes a plurality of generally star-shaped conductive portions each having four acute angle corner portions; and
the four corner portions of each of the plurality of conductive portions are pointing respectively in upward, downward, leftward and rightward directions of a display plane.

19. The liquid crystal display device according to claim 18, further comprising a pair of polarization plates opposing each other via the liquid crystal layer therebetween, wherein a transmission axis of one of the pair of polarization plates is generally parallel to an up-down direction of the display plane, and a transmission axis of the other one of the pair of polarization plates is generally parallel to a left-right direction of the display plane.

20. A liquid crystal display device, comprising:
a first substrate;
a second substrate; and
a liquid crystal layer provided between the first substrate and the second substrate,
wherein at least one picture element region is defined in the liquid crystal display device, the liquid crystal display device further comprising:
a picture element electrode provided on one side of the first substrate that is closer to the liquid crystal layer for each of the plurality of picture element regions;
a counter electrode provided on the second substrate so as to oppose the picture element electrode via the liquid crystal layer therebetween;
a switching element electrically connected to the picture element electrode; and
a scanning line and a signal line at least one of which is provided on the first substrate, wherein:
the picture element electrode includes a solid portion including a plurality of unit solid portions, whereby the liquid crystal layer takes a substantially vertical alignment in the absence of an applied voltage between the picture element electrode and the counter electrode, and forms a liquid crystal domain taking a radially-inclined orientation in a region corresponding to each of the plurality of unit solid portions by an inclined electric field produced around each of the plurality of unit solid portions of the picture element electrode in response to a voltage applied between the picture element electrode and the counter electrode;
each of the plurality of unit solid portions includes four acute angle corner portions that are pointing respectively in upward, downward, leftward and rightward directions of a display plane; and
the at least one of the scanning line and the signal line provided on the first substrate extends while being bent a plurality of times in the picture element region so that any segment thereof adjacent the picture element electrode is inclined with respect to an up-down direction and a left-right direction of the display plane.

21. The liquid crystal display device according to claim 20, wherein each segment of the at least one of the scanning line and the signal line adjacent the picture element electrode is inclined by about 45° with respect to the up-down direction and the left-right direction of the display plane.

22. The liquid crystal display device according to claim 20, wherein both of the scanning line and the signal line are provided on the first substrate.

23. The liquid crystal display device according to claim 20, wherein:
at least some of the plurality of unit solid portions that are arranged along a periphery of each of the plurality of picture element regions are arranged in the up-down direction and/or the left-right direction of the display plane at a predetermined pitch; and
the at least one of the scanning line and the signal line includes a plurality of bent portions arranged in the up-down direction and/or the left-right direction of the display plane at about one half of the predetermined pitch.

24. The liquid crystal display device according to claim 23, wherein the at least one of the scanning line and the signal line extends closely parallel to an outer periphery of the picture element electrode defined by the at least some of the plurality of unit solid portions.

25. The liquid crystal display device according to claim 20, further comprising a pair of polarization plates opposing each other via the liquid crystal layer therebetween, wherein a transmission axis of one of the pair of polarization plates is generally parallel to the up-down direction of the display plane, and a transmission axis of the other one of the pair of polarization plates is generally parallel to the left-right direction of the display plane.

26. The liquid crystal display device according to claim 20, wherein a shape of each of a plurality of the unit solid portions has rotational symmetry.

27. The liquid crystal display device according to claim 20, wherein a shape of each of a plurality of the unit solid portions is a generally star shape having four-fold rotational symmetry.

28. The liquid crystal display device according to claim 20, wherein a plurality of the unit solid portions have substantially the same shape and substantially the same size, and form at least one unit lattice having rotational symmetry.

29. The liquid crystal display device according to claim 20, wherein the picture element electrode further includes at least one opening, and the liquid crystal layer forms a liquid crystal domain taking a radially-inclined orientation also in a region corresponding to the at least one opening by the inclined electric field in response to a voltage applied between the picture element electrode and the counter electrode.

30. The liquid crystal display device according to claim 29, wherein the at least one opening includes a plurality of openings having substantially the same shape and substantially the same size, and at least one of the plurality of openings forms at least one unit lattice having rotational symmetry.

31. The liquid crystal display device according to claim 30, wherein a shape of each of the at least one of the plurality of openings has rotational symmetry.

32. The liquid crystal display device according to claim 20, wherein the second substrate includes, in a region corresponding to each of the plurality of unit solid portions, an orientation-regulating structure that exerts an orientation-regulating force for orienting liquid crystal molecules of the liquid crystal layer into a radially-inclined orientation at least in the presence of an applied voltage between the picture element electrode and the counter electrode.

33. The liquid crystal display device according to claim 32, wherein the orientation-regulating structure is provided in a region in the vicinity of a center of each of the plurality of unit solid portions.

34. The liquid crystal display device according to claim 32, wherein in the liquid crystal domain formed corresponding to each of the plurality of unit solid portions, a direction of orientation regulation by the orientation-regulating structure is aligned with a direction of the radially-inclined orientation formed by the inclined electric field.

35. The liquid crystal display device according to claim 32, wherein the orientation-regulating structure exerts an orientation-regulating force even in the absence of an applied voltage between the picture element electrode and the counter electrode.

36. The liquid crystal display device according to claim 32, wherein the orientation-regulating structure is a protrusion protruding from the counter substrate toward the liquid crystal layer.

37. A liquid crystal display device, comprising:
a first substrate;
a second substrate; and
a liquid crystal layer provided between the first substrate and the second substrate,
wherein a plurality of picture element regions are defined in the liquid crystal display device, the liquid crystal display device further comprising:
a picture element electrode provided on one side of the first substrate that is closer to the liquid crystal layer for each of the plurality of picture element regions;
a counter electrode provided on the second substrate so as to oppose the picture element electrode via the liquid crystal layer therebetween;
a switching element electrically connected to the picture element electrode; and
a scanning line and a signal line at least one of which is provided on the first substrate, wherein:
the liquid crystal layer takes a substantially vertical alignment in the absence of an applied voltage between the picture element electrode and the counter electrode;
the picture element electrode includes a plurality of generally star-shaped conductive portions each having four acute angle corner portions that are pointing respectively in upward, downward, leftward and rightward directions of a display plane; and
the at least one of the scanning line and the signal line provided on the first substrate extends while being bent a plurality of times in each of the plurality of picture element regions so that any segment thereof is inclined with respect to an up-down direction and a left-right direction of the display plane.

38. The liquid crystal display device according to claim 37, wherein each segment of the at least one of the scanning line and the signal line is inclined by about 45° with respect to the up-down direction and the left-right direction of the display plane.

39. The liquid crystal display device according to claim 37, wherein both of the scanning line and the signal line are provided on the first substrate.

40. The liquid crystal display device according to claim 37, wherein:
at least some of the plurality of conductive portions that are arranged along a periphery of each of the plurality of picture element regions are arranged in the up-down direction and/or the left-right direction of the display plane at a predetermined pitch; and
the at least one of the scanning line and the signal line includes a plurality of bent portions arranged in the up-down direction and/or the left-right direction of the display plane at about one half of the predetermined pitch.

41. The liquid crystal display device according to claim 40, wherein the at least one of the scanning line and the signal line extends closely parallel to an outer periphery of the picture element electrode defined by the at least some of the plurality of conductive portions.

42. The liquid crystal display device according to claim 37, further comprising a pair of polarization plates opposing each other via the liquid crystal layer therebetween, wherein a transmission axis of one of the pair of polarization plates is generally parallel to the up-down direction of the display plane, and a transmission axis of the other one of the pair of polarization plates is generally parallel to the left-right direction of the display plane.

43. The liquid crystal display device according to claim 1, wherein a plurality of said picture element regions are provided across a display area of the liquid crystal display device, and wherein each of the picture element regions includes one of said first electrodes.

44. The liquid crystal display device according to claim 18, wherein a plurality of said picture element regions are provided across a display area of the liquid crystal display device, and wherein each of the picture element regions includes one of said first electrodes.

* * * * *